US011436217B2

(12) United States Patent
Hicks et al.

(10) Patent No.: US 11,436,217 B2
(45) Date of Patent: Sep. 6, 2022

(54) ORDERED APPEND-ONLY LOG BASED DATA STORAGE

(71) Applicant: Amazon Technologies, Inc., Seattle, WA (US)

(72) Inventors: Harold Dillon Hicks, Seattle, WA (US); Christopher Denis Scalabrini, Kirkland, WA (US); Adam Julio Villalobos, Mountlake Terrace, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/368,723

(22) Filed: Mar. 28, 2019

(65) Prior Publication Data

US 2020/0311054 A1    Oct. 1, 2020

(51) Int. Cl.
*G06F 16/23* (2019.01)
*G06F 16/18* (2019.01)
(Continued)

(52) U.S. Cl.
CPC ...... *G06F 16/2379* (2019.01); *G06F 16/1805* (2019.01); *G06T 11/60* (2013.01); *H04L 67/10* (2013.01)

(58) Field of Classification Search
CPC .................................................. G06F 16/2379
See application file for complete search history.

(56) References Cited

U.S. PATENT DOCUMENTS 1,097,983 A * 5/1914 Warfield ............... F01K 1/00
122/35
6,173,415 B1   1/2001 Litwin et al.
(Continued)

FOREIGN PATENT DOCUMENTS

CN         106796589 A      5/2017

OTHER PUBLICATIONS

Alsadie et al.; "Dynamic Resource Allocation for an Energy Efficient VM Architecture for Cloud Computing;" Proceedings of the Australasian Computer Science Week Multiconference; (2018); 8 pages; <doi: 10.1145/3167918.3167952 >.
(Continued)

*Primary Examiner* — Van H Oberly
(74) *Attorney, Agent, or Firm* — BakerHostetler

(57) ABSTRACT

Technology is described for computationally intensive distributed computing systems and methods. A storage process for representing data objects in memory using a serialization format that provides low replication cost and thread-safe reads may include receiving a data object by a computing hub. A distributed shared memory of the computing hub may write the data object to a memory device associated with the computing hub using a byte array broken into a plurality of sections. The plurality of sections may describe the in-memory content of the data object and include information on how to read the plurality of sections to obtain a current state of the data object. The distributed shared memory may process requests from processing applications to modify data associated with the data object. The distributed shared memory may write mutations to the data object caused by the requests to the memory device using an ordered, log-based format to provide versioned snapshots of state.

20 Claims, 22 Drawing Sheets

(51) Int. Cl.
*H04L 67/10* (2022.01)
*G06T 11/60* (2006.01)

(56) References Cited

U.S. PATENT DOCUMENTS

| | | | |
|---|---|---|---|
| 6,366,945 | B1 | 4/2002 | Fong et al. |
| 8,219,564 | B1 | 7/2012 | Shao et al. |
| 9,182,913 | B2 | 11/2015 | Flanagan |
| 9,384,060 | B2 | 7/2016 | Hunter et al. |
| 9,471,610 | B1 | 10/2016 | Long et al. |
| 9,519,795 | B2 | 12/2016 | Guarrier et al. |
| 9,898,689 | B2 | 2/2018 | Shamaie |
| 10,979,383 | B1* | 4/2021 | Warfield .............. G06F 16/183 |
| 11,188,557 | B2 | 11/2021 | Yu et al. |
| 2002/0129127 | A1 | 9/2002 | Romero et al. |
| 2004/0162954 | A1 | 8/2004 | Chauvel |
| 2005/0068204 | A1 | 3/2005 | Jeon et al. |
| 2005/0221839 | A1 | 10/2005 | Chan et al. |
| 2006/0140118 | A1 | 6/2006 | Alicherry et al. |
| 2007/0074150 | A1 | 3/2007 | Jolfaei et al. |
| 2007/0238520 | A1 | 10/2007 | Kacmarcik |
| 2008/0140762 | A1 | 6/2008 | Holt |
| 2011/0302390 | A1 | 12/2011 | Copeland et al. |
| 2013/0145047 | A1 | 6/2013 | Short et al. |
| 2013/0222385 | A1 | 8/2013 | Dorsey et al. |
| 2014/0007124 | A1 | 1/2014 | Ashok et al. |
| 2014/0025890 | A1 | 1/2014 | Bert et al. |
| 2014/0379922 | A1 | 12/2014 | Xiao et al. |
| 2015/0324236 | A1 | 11/2015 | Gopalan et al. |
| 2016/0011911 | A1 | 1/2016 | Rangaraju et al. |
| 2016/0019069 | A1 | 1/2016 | Wei et al. |
| 2017/0024315 | A1* | 1/2017 | Leshinsky ........... G06F 12/0238 |
| 2018/0091866 | A1 | 3/2018 | Sun et al. |
| 2019/0138420 | A1 | 5/2019 | Harutyunyan et al. |
| 2019/0205244 | A1* | 7/2019 | Smith .................... G06F 3/065 |

OTHER PUBLICATIONS

McKell et al.; "Charging for Computing Resources;" Computing Surveys; (Jun. 1979): pp. 105-120; vol. 11. No. 2; Association for Computing Machinery.

Mohan et al.; "Resource Allocation Techniques in Cloud Computing-Research Challenges for Applications;" In Fourth International Conference on Computational Intelligence and Communication Networks; (2012); pp. 556-560; IEEE; <doi: 10-1109/CICN.2012.177 >.

Beskow et al.; "Latency reduction in massively multi-player online games by partial migration of game state", Proceedings of the 2nd International Conference on Internet Technologies and Applications; Sep. 18, 2007; 11 pages; ISBN: 978-0-946881-54-3.

Parikh, Swapnil M.; "A Survey on Cloud Computing Resource Allocation Techniques"; IEEE Nimma University International Conf. on Engineering; 2013; 5 pages.

Ardagna et al.; "Energy-Aware Autonomic Resource Allocation in Multitier Virtualized Environments"; IEEE Transactions on Services Computing; vol. 5; Jan.-Mar. 2012; p. 2-19.

Papagianni et al.; "On the Optimal Allocation of Virtual Resources in Cloud Computing Networks"; IEEE Transactions on Computers; vol. 62; Jun. 2013; p. 1060-1071.

Sonnek et al.; "Starling: Minimizing Communication Overhead in Virtualized Computing Platforms Using Decentralized Affinity-Aware Migration"; 39$^{th}$ Int'l Conf. on Parallel Processing; 2010; p. 228-237.

Zhang et al.; "Research on Key Technologies of Cloud Computing"; Physics Procedia; vol. 33; 2012; p. 1791-1797.

Martinez et al.; "Experimental Study of Large-scale Computing on Virtualized Resources"; Proceedings of the 3$^{rd}$ Int'l Workshop on Virtualization Technologies in Distributed Computing; 2009; p. 35-41.

* cited by examiner

ORDERED APPEND-ONLY LOG BASED DATA STORAGE

BACKGROUND

Virtualization technologies for computing resources have provided benefits with respect to managing large-scale computing resources for many customers with diverse needs, and have allowed various computing resources or computing services to be efficiently and securely shared by multiple customers. For example, virtualization technologies may allow a single physical computing machine to be shared among multiple customers by providing each customer with one or more virtualized compute resources (e.g., computing instances and software containers) hosted by the single physical computing machine using a hypervisor. In addition, a user or customer may have access to a large number of dynamic and virtualized compute resources without having to manage the computer hardware upon which those resources execute. A virtualized compute resource may be configured to obtain various additional resources or services via APIs that provide access to the resources and services. Centralized computing resources may be used for the creation of electronic 2D (two-dimensional) virtual environments, 3D (three-dimensional) virtual environments, or multi-dimensional virtual environments such as electronic simulations, electronic worlds, and electronic games, and a large array of centralized computing resources can be used to host such virtual environments. These virtual environments may be accessed by multiple users over a computer network or the internet. For example, virtual worlds, simulations, or electronic games may be accessed by multiple users over the internet. Examples of such virtual worlds may be physics simulators, medical simulations, driving simulators, open adventure worlds, first-person shooter games, sports games, strategy games, or massively multiplayer online (MMO) games, etc. Such virtualized worlds may be hosted using a group of virtualized resources in a service provider environment that include distributed applications, virtualized containers, computing instances (i.e., virtual machines), virtualized data stores, virtualized networks, virtualized services and other virtualized computing resources that execute on underlying hardware devices and substrate computer networks Virtualization technologies for computing resources have provided benefits with respect to managing large-scale computing resources for many customers with diverse needs, and have allowed various computing resources or computing services to be efficiently and securely shared by multiple customers. For example, virtualization technologies may allow a single physical computing machine to be shared among multiple customers by providing each customer with one or more virtualized compute resources (e.g., computing instances and software containers) hosted by the single physical computing machine using a hypervisor. In addition, a user or customer may have access to a large number of dynamic and virtualized compute resources without having to manage the computer hardware upon which those resources execute. A virtualized compute resource may be configured to obtain various additional resources or services via APIs that provide access to the resources and services. Centralized computing resources may be used for the creation of electronic 2D (two-dimensional) virtual environments, 3D (three-dimensional) virtual environments, or multi-dimensional virtual environments such as electronic simulations, electronic worlds, and electronic games, and a large array of centralized computing resources can be used to host such virtual environments. These virtual environments may be accessed by multiple users over a computer network or the internet. For example, virtual worlds, simulations, or electronic games may be accessed by multiple users over the internet. Examples of such virtual worlds may be physics simulators, medical simulations, driving simulators, open adventure worlds, first-person shooter games, sports games, strategy games, or massively multiplayer online (MMO) games, etc. Such virtualized worlds may be hosted using a group of virtualized resources in a service provider environment that include distributed applications, virtualized containers, computing instances (i.e., virtual machines), virtualized data stores, virtualized networks, virtualized services and other virtualized computing resources that execute on underlying hardware devices and substrate computer networks.

DETAILED DESCRIPTION

Figure 1:
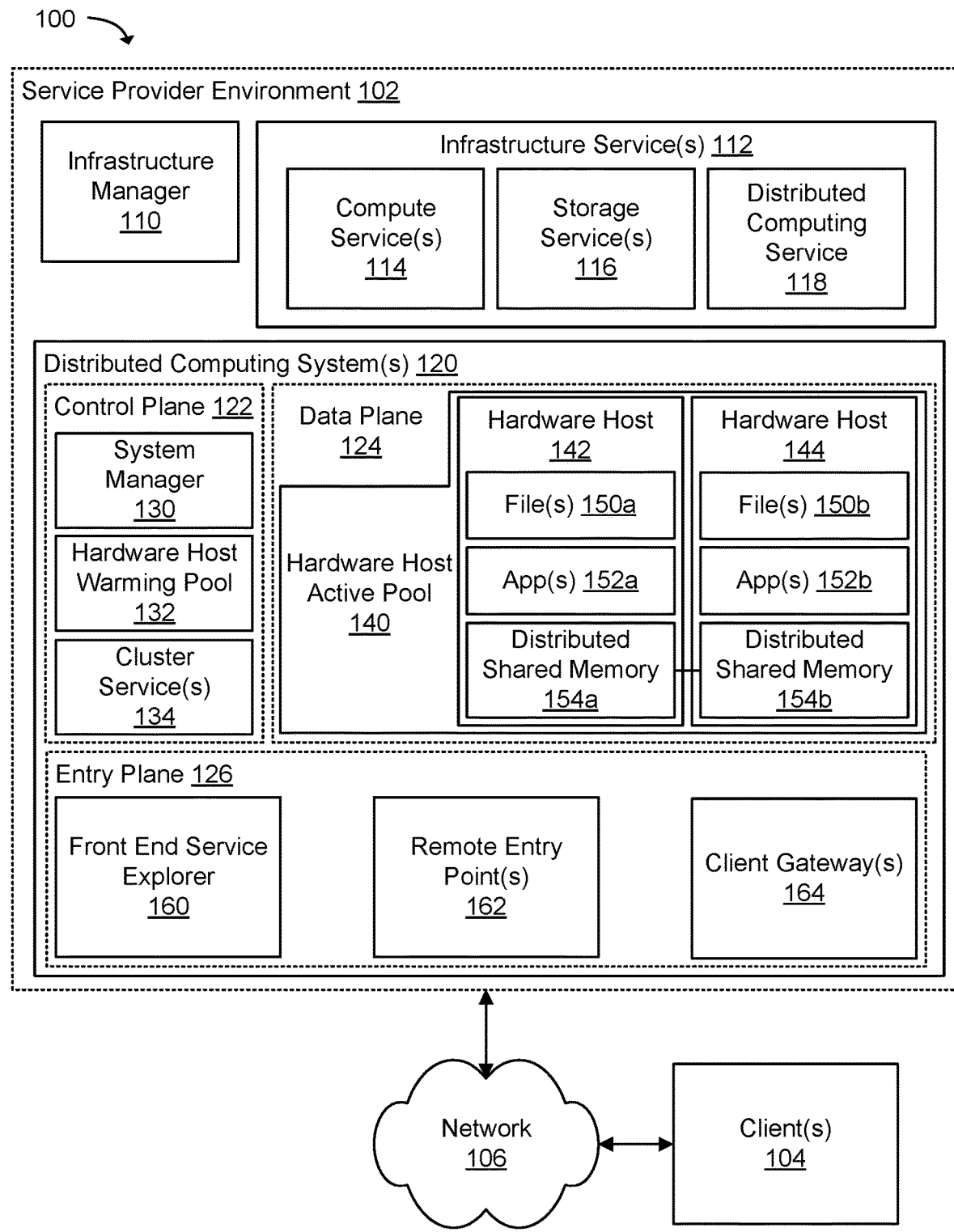
FIG. 1 illustrates a system that may include a service provider environment hosting computationally intensive distributed computing systems which are used to provide a user accessible virtual environment according to an example of the present technology.

This technology provides computationally intensive, distributed computing applications and systems in a service provider environment that may be used for providing virtual worlds, simulations, virtual environments, games, and other multi-dimensional (e.g., 2D and 3D) virtual environments that may be viewed by, interacted with, and accessed by users and other computing services. Examples of such distributed virtual environments may be physics simulations, first person games, medical simulations, television or movie sets, driving simulators, airplane simulators, CAD (computer aided design) or CAM (computer aided manufacturing) applications, space simulators, and other virtual worlds. The distributed computing applications may be large-scale, low-latency, distributed applications used with simulations or persistent interactive virtual worlds that can host millions of concurrent users.

This technology may manage compute resources in the service provider environment, and may elastically scale to support thousands of applications (i.e., for processing various object types). The technology may load-balance application instances across hardware in response to a virtual world load, so developers may spread the costs of large-scale worlds and simulations across a user base. Through partitioning, this technology may manage compute resources so applications or application instances can effectively utilize the CPU cores (central processing unit cores) of large hardware instances and so that developers can effectively use fewer hardware instances. Additionally, this technology also enables developers to use a larger number of hardware hosts to run a complex world, even a world with millions of users connecting to a single world or simulation. The technology may automatically scale compute resources based on use (e.g., scale down when not in use or scale up when load increases), and only charge for compute time while a world, simulation, or game is active.

The technology may include a state fabric that is a high-throughput compute and data service that may support gigabytes of data writes per second of highly partitioned data from applications or application instances co-located with the data. Examples of the applications executed using the technology may include a destruction application, which can simulate mass destruction in a game world, simultaneously manipulating hundreds of thousands of physics entities; an AI (artificial intelligence) application, which enables thousands of competitive AIs in a game; or, a "navmesh" generation application, which enables developers to recalculate navigation meshes for AI vehicles or characters over a multi-kilometer world changing at 30 hz. Custom applications can also have access to the simulation data, data objects, entities, and actors from the state fabric by subscribing to filters for receiving changing data objects and world assets from hardware hosts (e.g., for an area of the world or for an object type).

A distributed computing system in the service provider environment may provide the high throughput, low latency compute and data service (or state fabric) to support millions of puts and gets per second of highly partitioned data using one or more hardware hosts. The hardware hosts may include computers, servers, physical hosts or virtual machine instances that execute containerized applications or application instances and manage memory shared the across containerized applications or application instances. A distributed shared memory (DSM) management system may facilitate client and application interaction with the highly partitioned data as well as enabling distribution of data across many hardware hosts. The DSM enables the highly partitioned data to be read at low-latency and be shared though subscription-based streams. Applications or clients create a stream of data object events that request updates to data objects, which are sent to the DSM, and these changes are replicated to peer hardware hosts, allowing other applications and clients to see the updates. The DSM provides fault tolerance by separating the code from the data state. As a result, starting and stopping applications does not affect data stored in the DSM.

The DSM can also enable the highly partitioned data to be backed up to long-term storage in the service provider environment. The DSM can also replicate the highly partitioned data to a large number (thousands, millions, or tens of millions) of clients. Updates of data to clients may be prioritized using area-of-interest management (e.g., spatial fields or object types) and bandwidth-prioritization systems to maintain client view coherence for massive object worlds or simulations over consumer-grade internet connections.

The DSM can also enable customer code (e.g., containerized applications or application instances) to modify the highly partitioned data on a serverless fabric as close to the data as possible for minimum latency and maximum throughput. Applications and clients read data from the DSM by performing one-time queries that subscribe them to updates to data objects that match the query filter. The filter may be a spatial structure (e.g. axis-aligned bounding box), a tag or tag-list (e.g. "bots") or any other query that can be evaluated on the fields of a data object (e.g. "enemy players with low hit points"). A manager service on a hardware host may manage the lifecycles of the applications and the DSM on the hardware host, and may expose an endpoint that allows for linking DSMs on other hardware hosts together.

In an example use of this technology for games, a developer building a game experience in a service provider environment may have been limited by the compute and storage of a single server process on a single hardware instance. For example, gaming consoles paired with a single server process can manipulate a few thousand physics objects per frame, or a few dozen AIs (artificial intelligences) smart enough to challenge a few players. Developers have been able to deploy a single server process to a computing instance on a hardware host or droplet using existing tools, but it may be difficult to utilize additional compute resources to support more users, physics objects, and AIs without building complex clustering technology that enables developers to distribute their virtual world, game, or simulation across servers. Building technology that distributes compute workloads across servers and is highly stateful, low-latency, and fault tolerant is difficult, risky, and takes years of effort with a large and experienced team.

With the present technology, developers can immediately start building virtual worlds, simulations and games that utilize an increased simulation density (e.g., 10×-10,000×) as compared to single server games. This may result in manipulating hundreds of thousands of physics objects per frame or featuring thousands of competitive AIs. Providing high-performance runtime, distributed game applications, and tools may help game developers build games in a service provider environment that exceed the limitations of the single server model.

In one configuration of the technology, the distributed computing system may use object domains to organize computational units across the hardware hosts. Object domains may define processing partitions (i.e., subdivisions of data objects) using object types of the data objects in an object-based model of a virtual environment. Distributing the load for processing data objects in the distributed computing system using the object types enables large virtual worlds to be processed and presented. The data objects may be geometric objects (e.g., polygons, spheres, cylinders, etc.), player models, opponent models, buildings, vehicles, monsters, aliens, plants, animals, or any other object that can be modeled or animated in 2D or 3D. An object domain may describe object types for data objects that can be assigned to processing groups or processing partitions. Object types may be data associated with a data object that describes the data object conceptually. For example, a data object may be of the object type: person, animal, plant, building, vehicle, particle, weapon, or another object type. Object domains may use one object type or may use a plurality of object types to subdivide the data objects. Object domains may be associated with one processing partition or with a plurality of processing partitions. Mappings can be created between the object domains and the processing applications that process the data objects subdivided within the object domains. An object type may be used to group data objects of the object type together and the groupings may be treated as the processing partition computational units.

Processing applications can be used to process data objects assigned to the processing partition by object type. Accordingly, the object domain can be used to define which application and/or application instances may be used to perform the object domain's computation and which application and/or application instances may have exclusive mutation permission (e.g., write permission) on data objects for associated object types. For example, data objects with a physics data type may be processed by a physics application. A physics object domain may define which object types belong to the physics object domain, define which physics processing applications have permissions on the data objects, and define data dependencies with other object types used for processing the object types belonging to the physics object domain.

As described, an object type may be owned by an object domain, which has a processing application representing at least one compute process to be applied to the object type owned by the object domain. An object domain thus may provide an indexing process to organize the object data into discrete groups of computational units. An object domain may define which applications have permission to write to specific object types (e.g., exclusive mutation permissions). An object domain may define which applications have permissions to use additional object types (e.g., read-only permissions) during processing. This definition of ownership for data objects enables a single-writer-many-reader model to be enforced for applications and/or application instances. This definition of ownership for data objects also enables replication signaling for the additional object types to be read by object domains, allowing the distributed computing system to calculate what data needs to be made available at which hardware hosts and at what priority.

Accordingly, the data objects in the virtual environment may be organized by the distributed computing system into processing partitions according to their object types. The distributed computing system may use the processing partitions to allocate data objects to application instances of the processing applications on the hardware hosts. For example, a number of "particle objects" may be assigned to multiple processing partitions. One or more of the processing partitions may then be assigned to a particle simulation application instance on a first hardware host for processing. Other processing partitions may be assigned to a particle simulation application instance on a second hardware host for processing.

In a high-performance computing system (e.g., a Hadoop cluster), the distribution of the data to be processed in parallel has previously been done by dividing the uniform data into parts and sending the data to separate nodes in a computing cluster. Because the data in such cases is uniform, then uniform types of processing is applied to the data. In contrast, dividing data for parallel processing may be problematic where different types of processing may be desired to be applied to separate parts of the data. In contrast, the present technology may divide up a large data set of data objects with various data types for a virtual world (e.g., a game world) into processing partitions for distributed or parallel processing. This technology enables data objects that are of different types to be separated into groups using the object types. The object types may be assigned to a hardware host that has an application instance programmed specifically to process the object type. Use of the object types enables the processing to be divided up into processing partitions distributed among hardware hosts in the distributed computing system based on the processing type that is to be applied to the object type. In addition, this technology may also detect and manage dependencies between the data object types, and managing dependencies may overcome bottlenecks in processing of data objects divided into processing partitions. Use of the data dependencies defined by object domains further enables the processing to be organized into processing partitions and be distributed among hardware hosts in the distributed computing system to optimize where the data used by the application instance is located in the distributed computing system.

This technology further provides a high throughput, low latency compute and data service that supports millions of puts and gets per second of highly partitioned data divided up into processing partitions and distributed among the hardware hosts in the distributed computing system. The distributed computing system may manage storage of the data objects mapped to the processing partitions at the hardware hosts using distributed shared memory (DSM) services on devices. The distributed shared memory devices may write changes to the data objects using a storage format shared across the distributed shared memory services on devices to provide versioned snapshots of state. The distributed shared memory services may also enable the state of the data objects to be read at low-latency though subscription-based streams. Developers using this technology can achieve higher levels of performance, scalability, persistence, and reliability both on a single server, and across on multiple servers, enabling a stable, spatially infinite or spatially dense, interactive experience for players.

This technology may write orders of magnitude more simulation state (e.g., 300×+) than past single server database solutions and replicate state across the hardware hosts in the distributed computing system and to users across PCs, gaming consoles, and mobile devices. In one configuration of the technology, the distributed computing system may manage storage of the data objects for applications using a serialization format to represent the data objects. As described earlier, the data objects to be stored in the shared memory may be geometric objects (e.g., polygons, spheres, cylinders, etc.), player models, opponent models, buildings, vehicles, monsters, aliens, plants, animals, images, or any other object that can be modeled in 2D or 3D. The distributed computing system may manage state changes to the data objects with an ordered append-only log based storage process using the serialization format. The ordered append-only log based storage process provides low replication cost and thread-safe reads in the distributed computing system. Therefore, data objects may be represented using a format shared across multiple distributed shared memory services on separate devices in the distributed computing system to provide versioned snapshots of state and low replication costs.

A data object may be represented in memory of a distributed shared memory in a hardware host using a set of semantics built on top of a byte array. A representation of a data object may be written to a memory device using the byte array broken into a plurality of sections. The sections may describe the in-memory content of the data object and include information on how to read the in-memory content to obtain a current state of the data object. One of the sections may include a log section containing a series of one or more log records. Mutations to the data object caused by processing applications or application instances may be written to a log section using an ordered, log-based format to provide versioned snapshots of state. A log record may be used to represent a version-ordered set of mutations to the data object.

The distributed shared memory of the hardware host may access the log section from the tail and read log records backwards to get the most up-to-date state of the data object. The distributed shared memory may read the log records backwards to quickly identify the object fields of the data object that may have changed during processing and to collect the most recent version-ordered mutations to the object fields of the data object. The distributed shared memory may also read the representation of the data object originally written to the memory device when a portion of the data object has not been changed in a log record in the log section. The distributed shared memory may determine the most up-to-date state of the data object from collecting the most recent version-ordered mutations to the object fields and, when needed, the original in memory content of the data object.

In a high-performance computing system (e.g., a Hadoop cluster), the format of the data to be processed has generally been a human readable format like JSON or XML, or as a CSV file. These formats generally do not provide an efficient format for distributed computing systems to actually store data, whether in-memory or on disk. Storing data in high level or annotated formats can also be terribly inefficient for storage efficiency, over the wire communication, and/or parallel processing.

This technology enables data objects to be represented in-memory, on a mass storage device, or transferred over a network connection using a storage process and serialization format that provides a low replication cost and thread-safe reads. A storage process according to the present technology enables an in-memory representation of a data object to be copied to another memory location, to another hardware host, or to a storage device without incurring additional serialization processing due to the in-memory representation already being serialized. The storage process further enables the processing of data objects to be quickly and easily distributed among hardware hosts in the distributed computing system. The storage process may ensure that processing applications perform operations with correct versions of data objects and that updates to the data objects are ordered appropriately. In addition, this technology may also manage in-memory changes to the data objects to overcome bottlenecks in processing of the data objects when modified or read by the processing applications. The storage process may further enable the exchange of state between applications and hardware hosts and improve the speed, efficiency, and operation of data storage and replication in the distributed computing system.

According to the present technology, a spatial analysis of data objects associated with a virtual environment may be used to organize computational units in a distributed computing system. The spatial analysis may determine spatial information about the data objects, such as absolute locations, relative locations, proximal locations, spatial dependencies, and the like. The data objects may be grouped together using spatial location information and collections of data objects may be treated as processing partitions (i.e., sub-divisions of the data objects) for applications or application instances that process data objects assigned to a processing partition. The processing partitions may be defined, in part, according to how the data objects are grouped together spatially. The processing partitions may be load-balanced across hardware hosts in the distributed computing system. Distributing the load for processing data objects in the distributed computing system by using the processing partitions and spatial organization enables large virtual worlds to be processed and presented to clients or users.

In one configuration, the technology spatially sub-divides a plurality of data objects into a plurality of processing partitions using one or more object fields that provide spatial location information for the data objects. The spatial location information (e.g., an x, y, and z coordinate) associated with the plurality of data objects may be determined from the object fields in data objects and may be mapped to a processing partition. The processing partition may identify a collection of data objects in the defined locality. The processing partition may be allocated and sent to a hardware host in the distributed computing system for an application to execute code with the data objects. The processing partitions may be sent to the hardware hosts to configure the hardware hosts to allow the application to process the data objects for the identified locality.

Accordingly, data objects that are close together spatially can be grouped for one or more processing applications (e.g. a physics application). In one configuration, this technology may use a tree structure to spatially sub-divide the data objects. The tree structure may be an octree or a quad tree that covers three dimensions of a virtual world or two dimensions of a flat environment. Each node in the tree structure may identify a collection of data objects having spatial proximity or spatial groupings to be processed by an application instance configured to process one object type. The nodes in the tree may be used to allocate the data objects to application instances of the processing applications which process the data objects. For example, a number of "particle objects" may be assigned to multiple processing partitions by spatially sub-dividing the particle objects by location. One or more of the processing partitions may then be assigned to one or more particle simulation application instances on a hardware host or across multiple hardware hosts for processing.

Dividing data for parallel processing may be problematic where different types of processing may be applied to parts of the data. The present technology overcomes this difficulty by dividing a large data set of data objects with various data types for a virtual world (e.g., a game world) into processing partitions for parallel processing. This technology considers the spatial relationship of the data objects in order for the data objects to be separated into groups and be more quickly processed. Use of the spatial analysis enables the processing to be divided up into processing partitions distributed among hardware hosts in the distributed computing system in order to group related data as closely to possible. In addition, this technology may also detect and manage spatial dependencies between the data object types, and managing spatial dependencies may overcome bottlenecks in processing of data objects divided into processing partitions. Use of the data dependencies defined by object domains further enables the processing to be organized among hardware hosts in the distributed computing system into processing partitions to optimize where the data used by the application instance is located in the distributed computing system.

According to the present technology, the distributed computing system may use object domains to identify and control processing applications executing on the hardware hosts. The hardware hosts may be preloaded with processing applications using an application library. The application library may be stored by a hardware host and used by an application manager on the hardware host to launch instances of processing applications according to associated object types. As discussed above, an object domain can be used to define which application and/or application instances may be used to perform the object domain's computation and which application and/or application instances may have exclusive mutation permission (e.g., write permission) on data objects for associated object types. Launching instances of the processing applications in the distributed computing system using the object types enables large virtual worlds to be processed and presented as processing may be allocated to any number of hardware hosts with a copy of the application library. According to one example, a hardware host may receive an assigned processing partition and identify, from the application library, a processing application for the object type associated with (e.g., matched to or able to perform functions on) the processing partition. The hardware host may launch an instance of the processing application to enable the hardware host to process a plurality of data objects grouped by the object type, which are mapped to the processing partition.

In another configuration, the distributed computing system may enable hardware hosts to communicate though subscription-based streams. The processing applications in the application library may define a subscription strategy for obtaining additional data used during the processing of the data objects. The subscription strategy may identify what additional data object types are used during processing and at what sources the additional object types may be located. The hardware hosts may use data dependencies, spatial relationships, object tracking, and queries defined in the subscription strategies to send subscription requests to enable the hardware hosts to communicate and copy the data objects used by the instances of the processing applications during processing.

Accordingly, the distributed computing system may enable hardware hosts to share the data objects used by processing applications distributed across the hardware hosts. In one configuration, this technology may enable a first hardware host to receive a plurality of processing partition assignments and to identify a first processing partition allocated to the first hardware host. The first hardware host may then determine a first object type associated with the first processing partition and use the first object type to launch an instance of a corresponding processing application from the application library. The first hardware host may also determine a second object type upon which processing of data objects of the first object type by the processing application is dependent. The first hardware host may use the plurality of processing partition assignments to determine a second hardware host assigned a second processing partition, which groups data objects by the second object type into the second processing partition. The first hardware host may send a subscription request to the second hardware host to instruct the second hardware host to copy (e.g., make copies of the base data objects or changes to the data objects) the second plurality of data objects to the first hardware host and the instance of the processing application.

In another configuration, this technology may enable the first hardware host to determine a subscription strategy identifying neighbor relationships between spatial sub-divisions associated with a plurality of spatial sub-divisions for a multi-dimensional virtual environment to filter data objects of the second object type satisfying the filter. The first hardware host may identify the second processing partition using a neighbor relationship, which satisfies the subscription strategy, between a first spatial sub-division associated with the first processing partition and a second spatial sub-division associated with the second processing partition.

In yet another example, the first hardware host may determine a subscription strategy identifying query criteria (e.g., vehicles with low hit points or a particular moving object) associated with a query to filter data objects of the second object type. The first hardware host may identify the second processing partition by matching the second plurality of data objects to the query criteria using the subscription strategy. The first hardware host may also determine a list of subscribers to the data objects of the first object type. The first hardware host may send the data objects to the list of subscribers. The first hardware host may further receive an update to the plurality of processing partition assignments. The first hardware host may determine a migration of the second processing partition between the second hardware host and a third hardware host, and send a second subscription request from the first hardware host to the third hardware host.

FIG. 1 illustrates a system 100 that may include a service provider environment 102 hosting computationally intensive distributed computing systems which are used to provide a user accessible and/or viewable virtual environment according to an example of the present technology. The system 100 may include the service provider environment 102 and one or more client(s) 104 in communication with the service provider environment 102 using a network 106. The network 106 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof. The service provider environment 102 may be capable of management and delivery of computing, storage, and networking capacity as a software service for a community of end recipients using the client(s) 104. In this example, the service provider environment 102 may include an infrastructure manager 110, one or more infrastructure service(s) 112, and one or more distributed computing system(s) 120.

The infrastructure manager 110 may manage and control physical machines and other physical devices for use in supplying computationally intensive distributed computing systems. The infrastructure manager 110 may be a service that includes one or more computing systems, such as server computers, configured to control physical and virtualized infrastructure resources of the infrastructure service(s) 112 and the distributed computing system(s) 120. The virtualized infrastructure resources of the infrastructure service(s) 112 and the distributed computing system(s) 120 may include virtualized executable resources, virtualized storage resources, virtual network interfaces, and other virtualized networking components. Some examples of the virtualized executable resources may include computing instances, containers (e.g., Kubernetes), compute functions, hosted applications, and the like. Some examples of the virtualized storage services may include database services, block storage services, content-delivery services, and the like. Some examples of the virtualized networking components may include virtualized networking devices and physical network devices (i.e., routers, firewalls, load-balancers, etc.) configured with logical roles in the infrastructure service(s) 112 and the distributed computing system(s) 120.

The infrastructure manager 110 may instantiate all or part of the infrastructure service(s) 112 and the distributed computing system(s) 120. The infrastructure manager 110 may identify physical hosts and physical networking devices to be managed by the infrastructure manager 110. Some examples of the physical hosts managed by the infrastructure manager 110 are server computers, embedded computers, computing hosts at the edge of the service provider environment 102, and other physical devices. Some examples of the physical networking devices used by the infrastructure manager 110 are routers, switches, firewalls, load-balancers, caching services, server computers, embedded devices, and other physical networking devices.

The infrastructure service(s) 112 may be considered on-demand computing services that are hosted in a server, virtualized machine, grid, cluster, parallel, or distributed computing system. Some examples of the infrastructure service(s) 112 that may be provided by the service provider environment 102 may include one or more compute service(s) 114, one or more storage service(s) 116, networking services, web services, streaming services, network accessible services, software as a service, storage as a service, on-demand applications, services for the execution of code functions, and the like. In this example, the infrastructure service(s) 112 may include a distributed computing service 118 to provide for building and hosting the distributed computing system(s) 120 as large-scale, low-latency, distributed computing systems.

The distributed computing system(s) 120 may be considered on-demand computationally intensive distributed computing systems that are hosted in servers, virtualized machines, grids, clusters, parallel, or distributed computing systems. The distributed computing system(s) 120 may be used to provide virtual environments, e.g., 2D (two-dimensional) or 3D (three-dimensional virtual environments), simulations, and "computationally ridiculous games" that include persistent, interactive virtual worlds that can host millions of concurrent users or game players. The distributed computing system(s) 120 may provide a high throughput, low latency compute and data service that supports millions of puts and gets per second for highly partitioned data and data objects.

The distributed computing system(s) 120 may include a control plane 122, a data plane 124, and an entry plane 126. The control plane 122 may be responsible for orchestrating the creation of distributed computing systems for simulations, virtual environments, games, and the like, and the control plane 122 may be responsible for load balancing across hardware hosts in the distributed computing systems. A hardware host (such as hardware hosts 142 and 144) may be a physical host, a hardware computing device or server that is able to host one or more virtualized computing resources or services. The control plane 122 may manage aspects of the distributed computing systems, such as running simulations and virtual environments, including deploying code for execution, gathering metrics, uploading logs and monitoring clusters of hardware hosts.

The control plane 122 may also provide a dashboard accessible to a user for executing auditable maintenance actions across clusters of hardware hosts, and development teams can use the dashboard to access operating characteristics of running simulations and virtual environments. The control plane 122 may include a system manager 130 that manages resources used in a distributed computing system by simulations and virtual environments, such as a hardware host warming pool 132 and one or more cluster service(s) 134. The hardware host warming pool 132 may include one or more hardware hosts with pre-loaded operating systems, apps, assets, and/or data that are awaiting an assignment from the system manager 130. A warm hardware host may represent a physical host or virtualized infrastructure resource allocated to the simulation for later use. The cluster service(s) 134 may include services that support the operation of the distributed computing system, such as health monitoring, ticketing, logging, metrics, deployment, workflows, and the like.

The data plane 124 may be responsible for processing in the distributed computing systems of the simulations, virtual environments, games, and the like, and the data plane 124 may be responsible for communication across hardware hosts in the distributed computing systems. The data plane 124 may include a hardware host active pool 140 over which computational units of the simulation or virtual world are distributed using one or more hardware hosts, such as the hardware hosts 142 and 144. The hardware hosts 142 and 144 include one or more file(s) 150a-b, one or more application(s) 152a-b, and one or more distributed shared memories 154a-b. The file(s) 150 may be data, resources, data objects, 3D models, 2D models, textures, images, animations, web pages, etc. The application(s) 152 may include a category of user-computation or executing processes that can execute on data associated with the file(s) 150 (e.g., a data object), and an application describes a plurality of application instances in the aggregate. For example, an application may be a physics app that modifies data objects using physically-based numerical methods. The distributed shared memories 154 may manage data in memory that is used and shared across the application(s) 152. The distributed shared memories 154 may also replicate changes to the data in memory across hardware hosts in the hardware host active pool 140. For example, the application(s) 152 may subscribe to streams of data object events by requesting that updates to the data in memory be delivered from the distributed shared memories 154a-b to the application(s) 152. In another example, the application(s) 152 may create streams of data object events that include modifications to the data in memory, which are sent to the distributed shared memories 154a-b. The distributed shared memories 154a-b may replicate changes in state of the data in the memory between the distributed shared memories (DSMs) of the hardware hosts 142 and 144.

The entry plane 126 may be responsible to facilitate communication with the distributed computing systems of the simulations, virtual environments, games, and the like. For example, the entry plane 126 may manage connections from outside of the distributed computing system(s) 120. The entry plane 126 may include a front-end service explorer 160, one or more remote entry point(s) 162, and one or more client gateway(s) 164. The client(s) 104 may utilize an application programming interface (API) to connect to the client gateway(s) 164, which authenticate credentials and authorize connections to the remote entry point(s) 162. The remote entry point(s) 162 may include a multi-tenant fleet of physical hosts that replicate data from the virtual worlds or simulations to the client(s) 104. The front-end service explorer 160 may provide a graphical user interface for accessing, managing, monitoring, updating, or developing the distributed applications, data objects, and/or assets executing in the service provider environment 102.

This technology can provide a serverless virtual world or simulation service for building and operating computationally large worlds, such as massively multiplayer games with millions of connected players and city-scale simulations with millions of persistent objects. Developers can create millions of data objects and launch applications (e.g., compute processes) that modify the data objects at a variable rate (e.g., 10-60 Hz). This technology may automatically manage where and when the millions of data objects and applications are allocated to hardware hosts. The technology may load-balance application instances across the hardware hosts in response to a variety of conditions, such as a load on the virtual world, or collocate data processed by the application to reduce replication costs.

Figure 2:
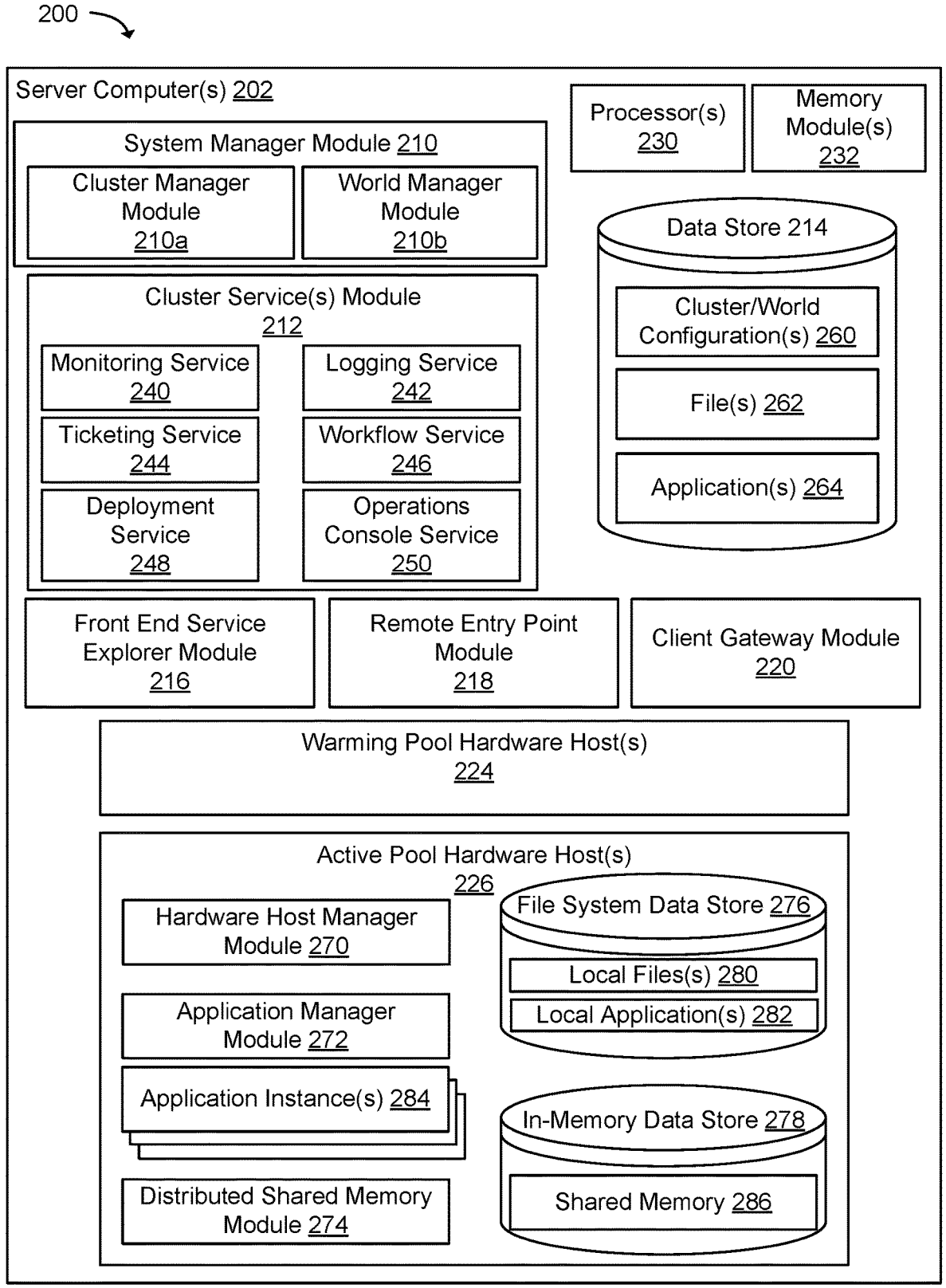
FIG. 2 illustrates various example components included in a service provider environment hosting computationally intensive distributed computing systems which are used to provide a user accessible virtual environment according to one example of the present technology.

FIG. 2 illustrates various example components included in a service provider environment 200 for computationally intensive distributed computing systems which are used to provide a user viewable virtual environment according to one example of the present technology. In this example, the service provider environment 200 may be capable of delivery of computing, storage, and networking capacity as a software service to a community of end recipients. In one example, the service provider environment 200 may be established for an organization by or on behalf of the organization. That is, the service provider environment 200 may offer a "private cloud environment." In another example, the service provider environment 200 may support a multi-tenant environment, wherein a plurality of customers may operate independently (i.e., a public cloud environment). Generally speaking, the service provider environment 200 may provide the following models: Infrastructure as a Service ("IaaS") and/or Software as a Service ("SaaS"). Other models may be provided. For the IaaS model, the service provider environment 200 may offer computers as physical or virtual machines and other physical devices for use as virtualized infrastructure resources in the virtual infrastructures.

Application developers may develop and run their applications on the service provider environment 200 without incurring the cost of buying and managing the underlying hardware and software. The SaaS model allows installation and operation of applications in the service provider environment 200. End customers may access the service provider environment 200 using networked client devices, such as desktop computers, laptops, tablets, smartphones, game consoles, etc., running web browsers or other standalone client applications, for example. The service provider environment 200 may include a number of computing devices that are arranged, for example, in one or more server banks or computer banks or other arrangements. The computing devices may support a computing environment using hypervisors, virtual machine managers (VMMs), and other virtualization software. In this example, the service provider environment 200 may include one or more server computer(s) 202. The server computer(s) 202 may include a system manager module 210, a cluster manager module 210a, a world manager module 210b, a cluster service(s) module 212, a data store 214, a front-end service explorer module 216, a remote entry point module 218, a client gateway module 220, one or more warm hardware host(s) 224, one or more active hardware host(s) 226, one or more processor(s) 230, and one or more memory module(s) 232.

The system manager module 210 may include hardware and software configured to create, deploy, and manage high throughput low latency distributed computing systems. The system manager module 210 may use the cluster manager module 210a and the world manager module 210b to orchestrate the creation of the distributed computing systems for simulations, virtual environments, and the like using a cluster of hardware hosts. The cluster manager module 210a may manage aspects of running infrastructures associated with the distributed computing systems, including deploying code for execution, gathering metrics, uploading logs, and monitoring cluster resources. The world manager module 210*b* may manage aspects of running multi-dimensional virtual environments, worlds, or simulations hosted by the distributed computing systems, including allocating files and applications to hardware hosts and monitoring changes in the processing of data on the hardware hosts by the applications. The system manager module 210 may also use the cluster manager module 210*a* and the world manager module 210*b* to load-balance computational operations across the hardware hosts.

The cluster service(s) module 212 may include hardware and software elements configured to provide services that support the operation of the distributed computing systems, such as a monitoring service 240, a logging service 242, a ticketing service 244, a workflow service 246, a deployment service 248, and an operations console service 250. The monitoring service 240 may be used to monitor resources used by the distributed computing systems. The monitoring service 240, for example, may collect metrics associated with the active hardware host(s) 226 to determine utilization of one or more hardware or software resources. The logging service 242 may be used to manage and analyze logs and operational data points from the distributed computing system. The ticketing service 244 may be used for ticketing of problems or ticketing of check-in or check-out source code, executable code or data. The workflow service 246 may be used manage and execute workflows in the distributed computing systems. For example, the workflow service 246 may initialize, structure, or load virtual computing resources, data objects, hardware hosts, etc. The deployment service 248 may be used to configure and deploy hardware hosts in the distributed computing systems. The operations console service 250 may be used to interact with a control plane, data plane, and entry plane associated with the distributed computing system. The operations console service 250 may provide one or more user interfaces (textural or graphical), application programming interfaces (APIs), and the like through which a user may enter commands or retrieve data associated with the distributed computing systems.

The data store 214 may include hardware and software elements configured to provide data services to the distributed computing systems managed by the cluster manager module 210*a* and the multi-dimensional virtual environments managed by the world manager module 210*b*. The data store 214 may include one or more world/cluster configuration(s) 260, one or more file(s) 262, and one or more application(s) 264. The world/cluster configuration(s) 260 may define the distributed computing system used for a world or a simulation. For example, a world may be defined using an object-based model of a virtual environment. The virtual environment may be a 2-dimensional, 3-dimensional, or multi-dimensional virtual world. An object-based model may use data objects to represent entities within the virtual environment. The file(s) 262 may include the data, resources, data objects, 3D models, 2D models, textures, images, animations, web pages, etc. used by the distributed computing systems. In one example, data objects in the file(s) 262 may represent entities within the virtual environment. These entities may be characters, animations, geometric objects, actors, non-player characters, vehicles, buildings, plants, rocks, animals, monsters, etc. Data objects in the file(s) 262 may be represented in the data store 214 using attributes having key-value or name-value pairs and object fields having field identifiers and field values. The application(s) 264 may include executable code that processes the file(s) 262. For example, the application(s) 264 may process data objects used to represent entities within the virtual environment. Some examples of the application(s) 264 may include simulations, collision detection, physics engines, rendering, and the like.

The front-end service explorer module 216 may include hardware and software elements configured to provide access, management, monitoring, updating, or developing of the world/cluster configuration(s) 260, the file(s) 262, and the application(s) 264. The front-end service explorer module 216 may include one or more graphical user interfaces to construct virtual worlds, define data objects, write applications, and the like. The remote entry point module 218 may include a multi-tenant fleet of physical hosts that replicate data from the data store 214 and/or the active hardware host(s) 226 to remote clients. Further, the clients may utilize an API to connect to the client gateway module 220, which authenticate credentials and authorize connections to the remote entry point module 218.

The warming pool hardware host(s) 224 may include hardware and software elements configured in a standby mode to execute the application(s) 264 using the file(s) 262. The cluster manager module 210*a* may allocate a number of hardware hosts to the warming pool hardware host(s) 224 in a standby or suspended mode of operation in anticipation of future need. The cluster manager module 210*a* may migrate a hardware host between the warming pool hardware host(s) 224 and the active pool hardware host(s) 226 to scale compute resources when the need arises. The active pool hardware host(s) 226 may include hardware and software elements configured in an active mode to execute the application(s) 264 using the file(s) 262. The active pool hardware host(s) 226 may include a hardware host manager module 270, an application manager module 272, one or more application instance(s) 284, a distributed shared memory module 274, a file system data store 276, and an in-memory data store 278.

The hardware host manager module 270 may include hardware and software elements configured to manage data processing by one or more hardware hosts. The hardware host manager module 270 may include a runtime module that receives instructions from the cluster manager module 210*a* and the world manager module 210*b* executes the instructions on the hardware host. The instructions may configure the hardware host in the active mode to execute the application(s) 264 using the file(s) 262. The instructions may identify the file(s) 262 that are assigned to the hardware host and which of the application(s) 264 to use to process the assigned file(s) 262. The hardware host manager module 270 may receive one or more of the file(s) 262 for processing and store the files in the file system data store 276 as local file(s) 280. According to one example of the present technology, the hardware host manager module 270 may receive, from the world manager module 210*b*, one or more index structures that are assigned to the hardware host. The index structures may be used by the world manager module 210*b* to organize the file(s) 262 into computation units, herein known as processing partitions discussed in more detail below. The index structures may be used by the hardware host manager module 270 to manage storage of the local file(s) 280 in the file system data store 276.

The instructions may further identify the application instance(s) 264 to use to process one or more of the local file(s) 280. The hardware host manager module 270 may receive one or more of the application(s) 264 and store the applications in the file system data store 276 as local application(s) 282. According to one example of the present technology, the hardware host manager module 270 may receive an application library that includes the application(s) 264. The application library may be stored by the hardware host manager module 270 and used by the application manager module 272 to launch instances of the local application(s) 282 in the file system data store 276.

The application manager module 272 may include hardware and software elements configured to manage one or more application instance(s) 284 on the hardware host. Examples of the application instance(s) 284 may be instances of physics applications, rendering applications, collision applications, transformation applications, occlusion applications, sound applications, or other types of applications. The application manager module 272 may identify the local file(s) 280 assigned to the hardware host and determine which of the local application(s) 282 to instantiate. The application manager module 272 may determine the number of instances of the local application(s) 282 to be instantiated as the application instance(s) 284. The application manager module 272 may scale the number of the application instance(s) 284 according to demand.

The distributed shared memory module 274 may include hardware and software elements configured to manage the in-memory data store 278. The in-memory data store 278 of the hardware host may be used for storage by the application instance(s) 284 and changes to the in-memory data store 278 may be shared across the active pool hardware host(s) 226. The distributed shared memory module 274 may load one or more of the local file(s) 280 into the in-memory data store 278 as shared memory 286. The distributed shared memory module 274 may receive requests from the application instance(s) 284 to access the shared memory 286. The distributed shared memory module 274 may send data from the shared memory 286 for example by processing the requests from the application instance(s) 284 to read the data. The distributed shared memory module 274 may also receive requests from the application instance(s) 284 to modify the shared memory 286. The distributed shared memory module 274 may store data to the shared memory 286 for example by processing the requests from the application instance(s) 284 to write the data. The distributed shared memory module 274 may further replicate changes to the shared memory 286 across the active hardware host(s) 226.

The various processes and/or other functionality contained within the service provider environment 200 may be executed on one or more processor(s) 230 that are in communication with one or more memory module(s) 232. The service provider environment 200 may include a number of computing devices that are arranged, for example, in one or more server banks or computer banks or other arrangements. The computing devices may support a computing environment using hypervisors, virtual machine monitors (VMMs), and other virtualization software.

The term "data store" may refer to any device or combination of devices capable of storing, accessing, organizing and/or retrieving data, which may include any combination and number of data servers, relational databases, object-oriented databases, cluster storage systems, data storage devices, data warehouses, flat files, and data storage configuration in any centralized, distributed, or clustered environment. The storage system components of the data stores 214, 276, and 278 may include storage systems such as a SAN (Storage Area Network), cloud storage network, volatile or non-volatile RAM, optical media, or hard-drive type media. The data stores 214, 276, and 278 may be representative of a plurality of data stores as can be appreciated.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
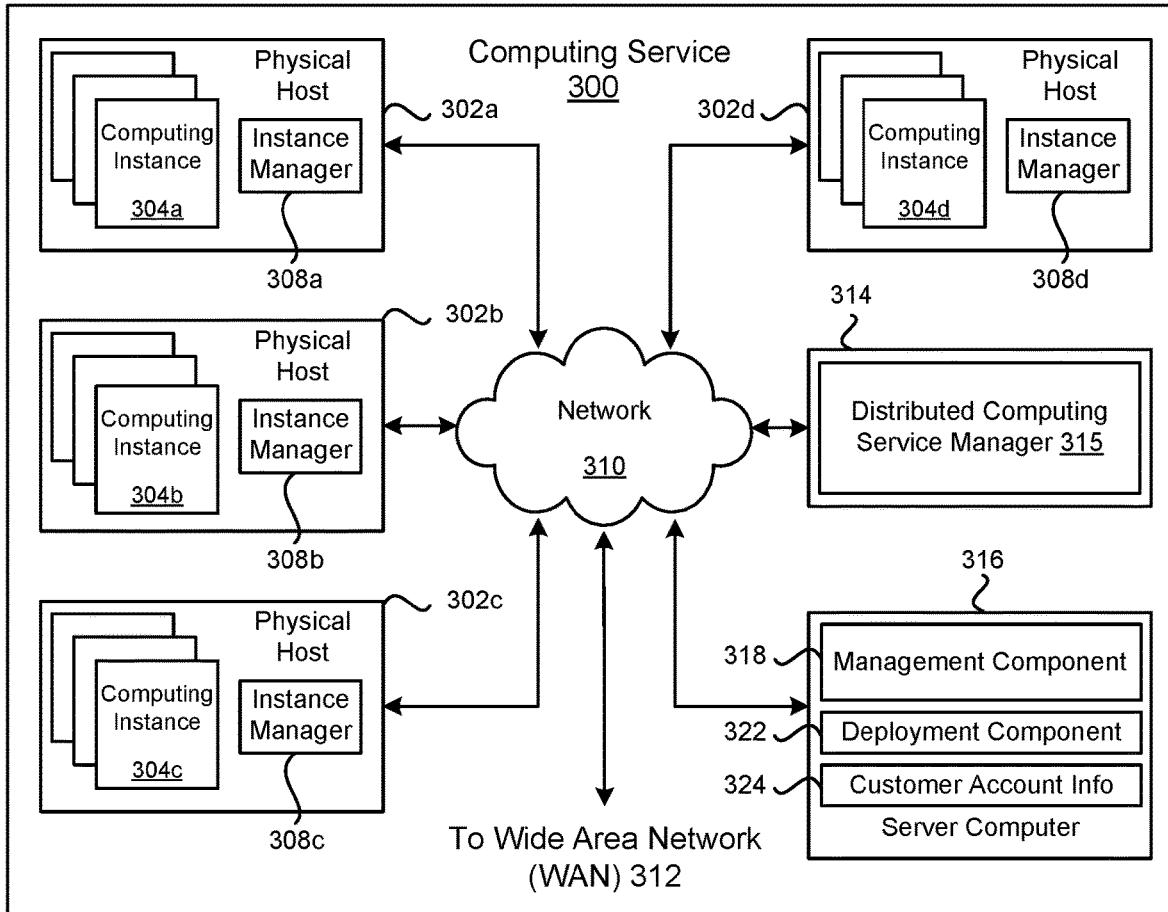
FIG. 3 is a block diagram that illustrates an example computing service that provides computationally intensive distributed computing systems using a distributed computing service manager according to one example of the present technology.

FIG. 3 is a block diagram that illustrates an example computing service 300 that provides computationally intensive distributed computing systems using a distributed computing service manager according to one example of the present technology. The computing service 300 may be used to execute and manage a number of computing instances 304*a-d* upon which the present technology may execute. In particular, the computing service 300 depicted illustrates one environment in which the technology described herein may be used. The computing service 300 may be one type of environment that includes various virtualized service resources that may be used, for instance, to host computing instances 304*a-d*.

The computing service 300 may be capable of delivery of computing, storage, and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), and/or Software as a Service ("SaaS"). Other models may be provided. For the IaaS model, the computing service 300 may offer computers as physical or virtual machines and other resources. The virtual machines may be run as guests by a hypervisor, as described further below. In another configuration, the services model delivers computing that may include an operating system, programming language execution environment, database, and web server.

Application developers may develop and run their software solutions on the computing service without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers, or other lightweight client applications, for example. Those familiar with the art will recognize that the computing service 300 may be described as a "cloud" environment.

The particularly illustrated computing service 300 may include a plurality of server computers 302*a-d*. The server computers 302*a-d* may also be known as physical hosts. While four server computers are shown, any number may be used, and large data centers may include thousands of server computers. The computing service 300 may provide computing resources for executing computing instances 304*a-d*. Computing instances 304*a-d*, for example, may be virtual machines. A virtual machine may be an instance of a software implementation of a machine (i.e. a computer) that executes applications like a physical machine. In the example of a virtual machine, each of the server computers 302*a-d* may be configured to execute an instance manager 308*a-d* capable of executing the instances. The instance manager 308*a-d* may be a hypervisor, virtual machine manager (VMM), or another type of program configured to enable the execution of multiple computing instances 304*a-d* on a single server. Additionally, each of the computing instances 304*a-d* may be configured to execute one or more applications.

A server computer 314 may be reserved to execute software components for implementing the present technology or managing the operation of the computing service 300 and the computing instances 304*a-d*. For example, the server computer 314 may execute a distributed computing service manager 315 to provide a high throughput, low latency compute and data service that supports millions of puts and gets per second of highly partitioned data.

A server computer 316 may execute a management component 318. A user may access the management component 318 to configure various aspects of the operation of the computing instances 304*a-d* purchased by a customer. For example, the user may setup computing instances 304*a-d* and make changes to the configuration of the computing instances 304*a-d*.

A deployment component 322 may be used to assist customers in the deployment of computing instances 304*a-d*. The deployment component 322 may have access to account information associated with the computing instances 304*a-d*, such as the name of an owner of the account, credit card information, country of the owner, etc. The deployment component 322 may receive a configuration from a user that includes data describing how computing instances 304*a-d* may be configured. For example, the configuration may include an operating system, provide one or more applications to be installed in computing instances 304*a-d*, provide scripts and/or other types of code to be executed for configuring computing instances 304*a-d*, provide cache logic specifying how an application cache is to be prepared, and provide other types of information. The deployment component 322 may utilize the user provided configuration and cache logic to configure, prime, and launch computing instances 304*a-d*. The configuration, cache logic, and other information may be specified by a user accessing the management component 318 or by providing this information directly to the deployment component 322.

Customer account information 324 may include any desired information associated with a customer of the multi-tenant environment. For example, the customer account information 324 may include a unique identifier for a customer, a customer address, billing information, licensing information, customization parameters for launching instances, scheduling information, etc. As described above, the customer account information 324 may also include security information used in encryption of asynchronous responses to API requests. By "asynchronous," it is meant that the API response may be made at any time after the initial request and with a different network connection.

A network 310 may be utilized to interconnect the computing service 300 and the server computers 302*a-d*, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the server computers 302*a-d*. The network topology illustrated in FIG. 3 has been simplified, as many more networks and networking devices may be utilized to interconnect the various computing systems disclosed herein.

Figure 4A:
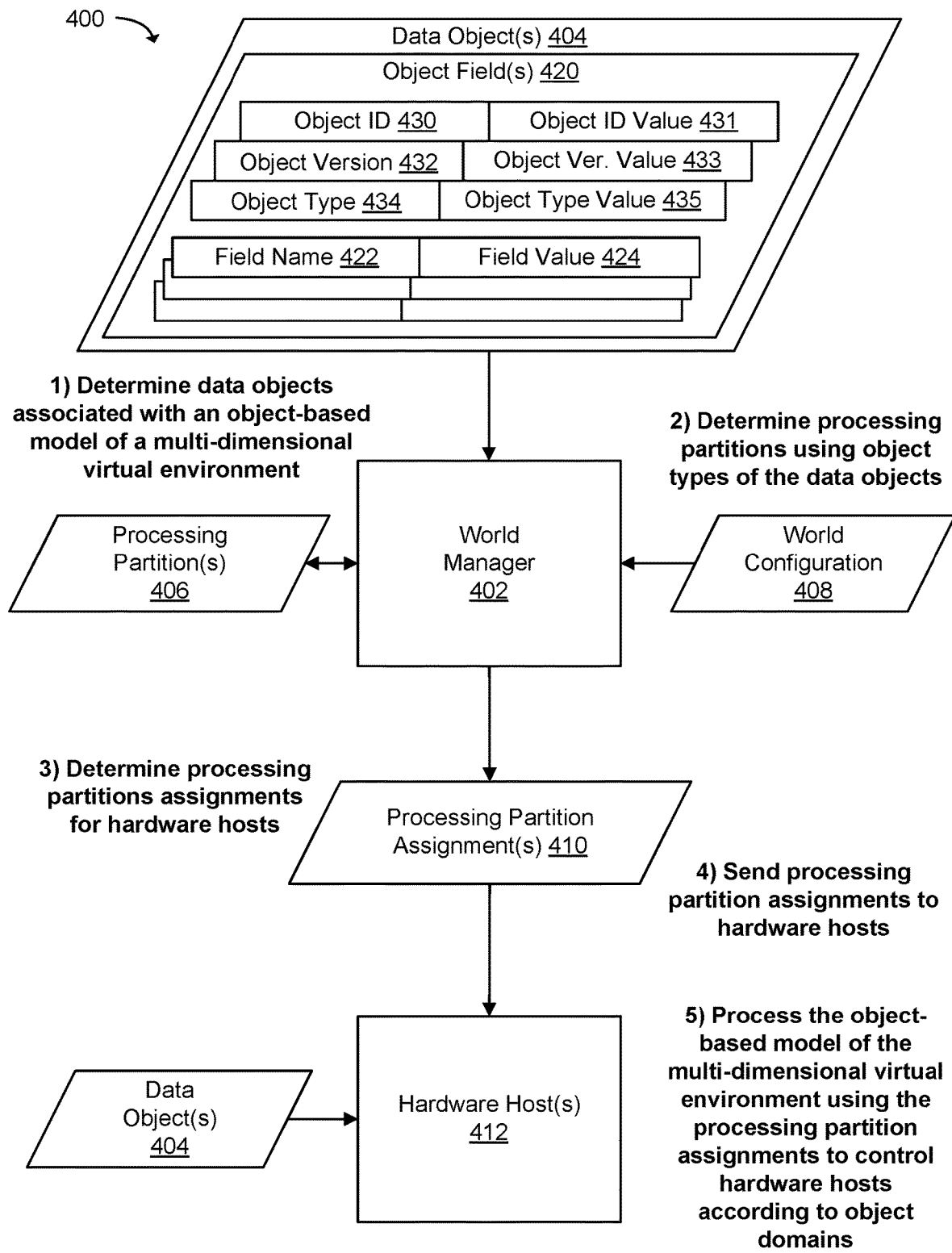
FIG. 4A illustrates a system and related operations for assigning computational units in a distributed computing system using processing partitions organized by object domains according to an example of the present technology.

FIG. 4A illustrates a system 400 and related operations for assigning computational units in a distributed computing system using processing partitions organized by object domains according to an example of the present technology. The system 400 may include a world manager 402. Some examples of the world manager 402 may include the system manager 130 described with respect to FIG. 1 and the world manager module 210*b* described with respect to FIG. 2.

The world manager 402 may identify one or more data object(s) 404 associated with an object-based model of a multi-dimensional virtual environment (e.g., a 3D simulation, 3D game, etc.). The world manager 402 may retrieve the data object(s) 404 from an object data store. The data object(s) 404 may include one or more object field(s) 420. The object field(s) 420 may include a set of fields, attributes, or properties represented by a field name 422, which may act as an identification label or key, and a field value 424. The field value 424 may include a data value, string, an X, Y, Z coordinate, etc., which may be referenced by a processing application using the object identifier 430 in order to process a data object.

In this example, the data object(s) 404 may include metadata using one or more of the object field(s) 420 to provide an object identifier (ID) 430, an object ID value 431, an object version 432, object version value 433, an object type 434, and object type value 425. An example object ID value 431 for the object identifier 430 field may be "forest_tree_object" and an example object ID value 431 of the object version 432 field may be "version 4.214." The object type 434 may map to an object domain and have an object type value 435 of "Particle," "Tree", "Water", etc. The object domain describes which object types form part of the domain thereby enforcing permissions on what processing application has exclusive mutation permission, as well as data dependencies (e.g., read-only permission) for object types used in the processing of the object types that form part of the domain. An object type may be owned by one domain, which has a processing application representing its compute. The types of processing may include any types of processing on data objects that may occur for a virtual world, simulation, or game.

The world manager 402 may then determine one or more processing partition(s) 406 using the object type 434 of the data object(s) 404. In addition to the data object(s) 404 themselves, the world manager 402 may use a world configuration 408 to determine the processing partition(s) 406, as discussed in more detail later. The processing partition(s) 406 may define computational units in a distributed computing system hosting the multi-dimensional environment, which may be allocated to hardware hosts in the distributed computing system. The data object(s) 404 may be organized or grouped by the object type value 435 of the object type 434 into the processing partition(s) 406 to create the computational units for the hardware hosts. Thus, the processing partition(s) 406 may group the data object(s) 404 into the computational units according to object domains represented by object types. Metadata in a processing partition can reference a collection or set of data objects, which are mapped to the processing partition, as a computational unit for processing.

According to one example of the present technology, the world manager 402 may determine the processing partition(s) 406 using the object field(s) 420 of the data object(s) 404. As the processing partition(s) 406 represent groups of data objects organized into computational units to be processed by processing applications, the world manager 402 may organize the data object(s) 404 according to one or more of the object field(s) 420. According to one example of the present technology, this data object management by the world manager 402 may include the creation of one or more index structures, known as a domain index, which map collections of the data object(s) 404 to the processing partition(s) 406 by object domain using the object type 434, as will be discussed in a later section. The index structures may index the data object(s) 404 into the processing partition(s) 406. According to a further example of the present technology, this data object management by the world manager 402 may include the creation of one or more index structures, known as a spatial index, which can be used to divide up the processing of the data object(s) 404 by spatial location information (e.g., spatial position, bounding box, etc.) in the object field(s) 420, as will be discussed in a later section. The world manager 402 may use the object field(s) 420 to create multiple tiers in the groupings of the data object(s) 404 into computational units, thereby further organizing the data object(s) 404 by multiple fields, attributes, and properties represented by the object field(s) 420.

The world manager 402 may then determine one or more processing partition assignment(s) 410 to assign the processing partition(s) 406 to one or more hardware host(s) 412. The processing partition assignment(s) 410 may be made based on the object type and an application instance that can process the object type, based on data dependencies, and based the metrics for the processing load on the hardware or software (e.g., to avoid overloading, etc.). The world manager 402 may use the processing partition assignment(s) 410 to send the processing partition(s) 410 to the hardware host(s) 412 to allocate the processing of the data object(s) 404 in the distributed computing system. The processing partition assignment(s) 410 may be used to configure the hardware host(s) 412 for processing of the data object(s) 404.

The hardware host(s) 412 may process the data object(s) 404 using the processing partition assignment(s) 410. Examples of processing may include data object movements, data object collisions, rendering, explosions, physics simulations, in-world credit transactions, or other types of processing. The data object(s) 404 for a specific processing partition in the processing partition(s) 406 may be loaded at one of the hardware host(s) 412 and then processed by a processing application. For example, an instance of the processing application may be set up on the hardware host to process an explosion of the data object(s) 404. The instance of the processing application can iterate across one or more the data object(s) mapped the processing partitions assigned to the hardware host to simulate what occurs to the data object(s) 404 during an explosion. The changes for the data object(s) 404 may then be written to memory in the hardware host (using the DSM). The changes written to memory can also be shared with other hardware hosts.

Figure 4B:
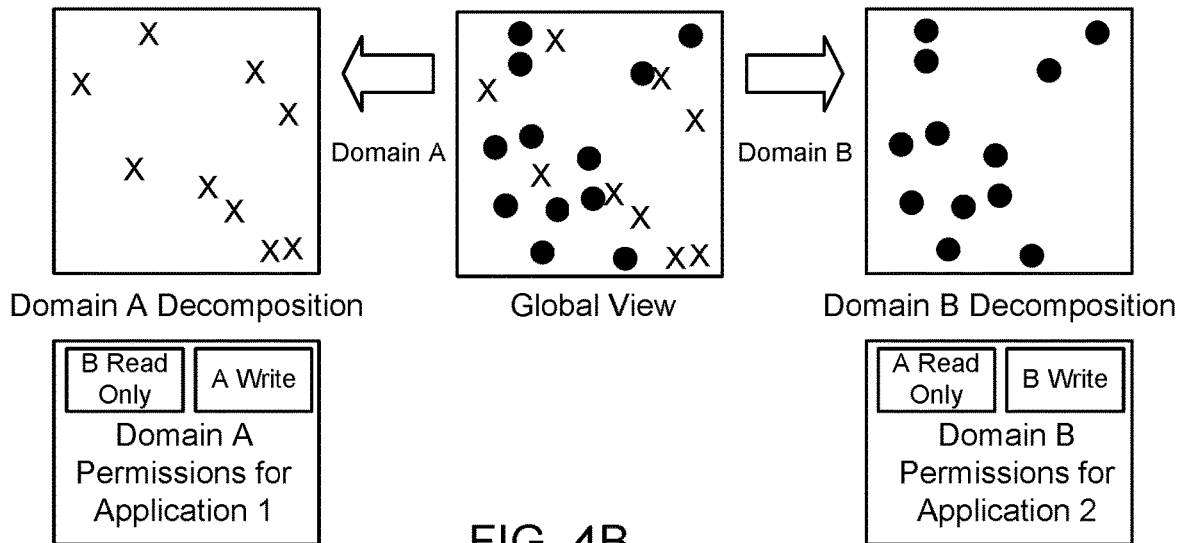
FIG. 4B illustrates a graphical example of creating processing partitions to assign to hardware hosts in a distributed computing system using object domains according to an example of the present technology.
Figure 4C:
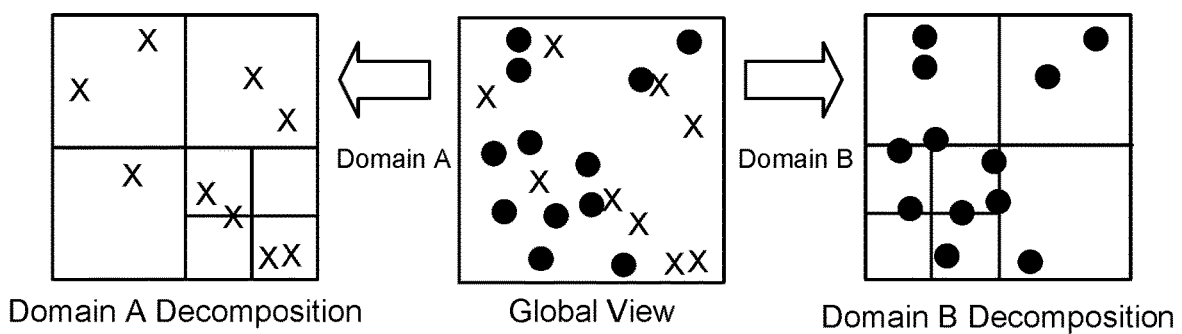
FIG. 4C illustrates a graphical example of creating processing partitions to assign to hardware hosts in a distributed computing system using object domains and spatial locality according to an example of the present technology.

This technology may use multiple tiers of indexing to organize data objects into the processing partition(s) 406 representing computational units in the distributed computing system. For example, the world manager 402 may create the multiple tiers as a hierarchy. A multi-tier index scheme may be used with the object domain grouping being the most-significant tier. FIG. 4B illustrates the separation of a global view of the multi-dimensional virtual environment into more than one group or processing partition according to object domain. The multi-dimensional environment may include data objects with two object domains, a first object domain "Domain A" represented by crosses and a second object domain "Domain B" represented by solid dots in the global view. The world manager 402 may decompose the global view into a "Domain A Decomposition" and a "Domain B Decomposition," which become the most-significant tiers grouping data objects by object type associated with "Domain A" and "Domain B." This decomposition process also allows less-significant tiers in the multi-tier index scheme to use similar semantics, while being different in terms of instance. For example, in FIG. 4C, if each of the "Domain A" and "Domain B" include a large number of data objects densely packed into different spaces, this decomposition process may add another tier, such as a spatial index, to further index the data objects into processing partitions using spatial location information. As spatial index components of the two domains may be in different states, as depicted, the world manager 402 may organize the data objects into processing partition(s) 406 and determine whether to allocate data objects in the different states to different hardware hosts.

FIG. 4B also illustrates a permission model that may be used with the object domains. More specifically, a domain allows a developer to declare which application owns each of the object types and which additional object types depend on any particular domain. While other applications may read data objects not owned by their domain, they might not mutate them (e.g., may not write to the data objects). As illustrated, "Domain A" permissions for a first application may include read only permissions for data objects associated with "Domain B" and exclusive write permission for data objects associated with "Domain A." "Domain B" permissions for a second application may include read only permissions for data objects associated with "Domain A" and exclusive write permission for data objects associated with "Domain B."

FIG. 4B further illustrates how the permission model may be used with the object domains for replication signaling. More specifically, as a domain allows a developer to declare which application owns each of the object types and which additional object types depend on any particular domain, the permission model may signal whether data object are to be shared by applications or replicated across the distributed computing system. For example, the first application associated with "Domain A" may declare that the first application owns the data objects associated with the object types for "Domain A." The first application may further subscribe to streams of data object events by requesting delivery of updates to the data objects associated with the object types for "Domain B." This replication signaling mechanism may act as an object filtering mechanism to reduce the number of objects that need to be replicated across hardware hosts. For example, a domain requiring object types of another domain does not imply an inverse relationship.

Figure 5:
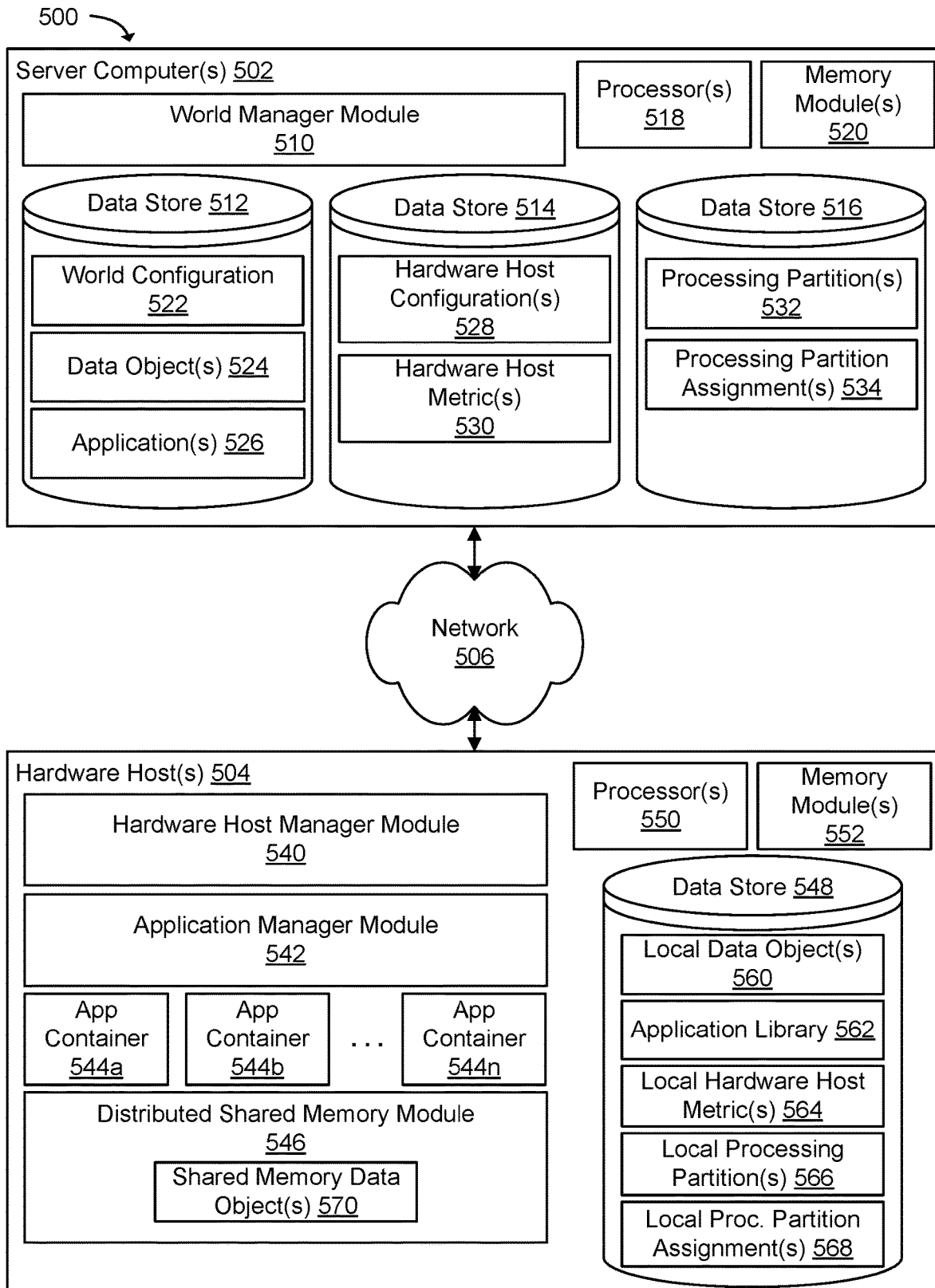
FIG. 5 illustrates various example components included in a service provider environment for managing hardware hosts in a distributed computing system using processing partitions organized by object domains according to one example of the present technology.

FIG. 5 illustrates various example components included in a service provider environment 500 for managing hardware hosts in a distributed computing system using processing partitions organized by object domains according to one example of the present technology. The service provider environment 500 may include one or more server computer(s) 502 in communication with one or more hardware host(s) 504 using a network 506. The network 506 may include any useful computing network, including an intranet, the Internet, a local area network, a wide area network, a wireless data network, or any other such network or combination thereof.

The server computer(s) 502 may include a world manager module 510, a first data store 512, a second data store 514, a third data store 516, one or more processor(s) 518, and one or more memory module(s) 520. The world manager module 510 may be configured to create, deploy, and manage high throughput low latency distributed computing systems. The world manager module 510 may orchestrate the creation of the distributed computing systems for virtual worlds, games, simulations, virtual environments, and the like using the hardware host(s) 504. The world manager module 510 may manage aspects of running the distributed computing systems, including deploying code for execution (e.g., application instances), gathering metrics, uploading logs, and monitoring resources. The world manager module 510 may access the first data store 512 to create, and manage, a world configuration 522 for a virtual world, one or more data object(s) 524 stored for the virtual world, and one or more application(s) 526. The world configuration 522 may identify the virtual world and define the assets and applications used by the virtual world. The world configuration 522 may specify one or more indexes to use in partitioning the assets into processing partitions. One example of the world configuration 522 may use a world schema as follows:

```
World Schema {
    World Identifier: <Name>
    Assets: [<Asset Identifier>]
    Applications: [<Application Identifier>]
    Indexes: [<Index Type>]
    <Index Configuration JSON>]
}
```

The data object(s) 524 may identify the objects and entities in the virtual world and define attributes and properties of the assets. A data object may define a set of object fields and a set of indexable fields that map to its existing fields. The data object(s) 425 may use, for example, an object definition and an object schema definition as follows:

```
Object Definition {
    Object Name: <Name>
    <Type> <Name>
    <Type> <Name>
},
Object Schema Definition {
    Object Type: <Name>
    <Index Type>: (<Name>,...)
}
```

With the above, some examples of the data object(s) 524 may include:

```
Object Definition {
    Object Type: Person
    Vector3 position
    Vector6 bounds
},
Object Schema Definition {
    Object Name: Person
    Spatial Octree: (position, bounds)
}
```

The application(s) 526 may identify and store a copy of the processing applications and application instances that handle the computing and processing in the virtual world. An application may specify the object domain handled during the computing and processing in the virtual world. The application may identify or be linked to an object type to indicate a given object domain. The application may further specify an index that may be used by the world manager module 510 to partition the data object(s) 524 into processing partitions or chunks. For example, the application may specify the maximum number of data objects that can be written to by an application instance in a particular application epoch or processing cycle.

The application may also define a subscription strategy for obtaining additional data used during the processing of the data objects. The subscription strategy may identify what additional data object types are used during processing and at what sources the additional object types may be located. Additionally, the subscription strategy may specify a maximum latency that application instances can tolerate for obtaining the additional object types from the specified sources. The application(s) 526 may use, for example, an application definition as follows:

```
App Definition {
    Object Type: Foo // Name of object type to be updated
    ARUs: <(String, Int)> // List of types of ARUs (App Resource Units) used and amount
    Index: <Index Type> // Name of index used
    Max Objects: <Int> // Max number of objects written to supported
    Subscription Types: <String> // Object types that will be subscribed to
    Subscription Strategy: <String> // Strategy for read-only subscriptions
    Subscription Max Latency: <Int> // Maximum latency for read only objects given in Simulation Ticks
}
```

With the above, some examples of the application(s) 526 may include:

```
App Definition {
    Object Type: Foo
    Index: Spatial Octree
    Max Objects: 300
    Subscription Types: All
    Subscription Strategy: Neighbors
    Max Subscription Latency: 100ms
}
```

The world manager module 510 may also access the second data store 514 to create and manage one or more hardware host configuration(s) 528 and store one or more hardware host metric(s) 530. For example, the world manager module 510 may store a configuration for a computing instance type to be used as a hardware host, the configurations of containers on the hardware host, the capacity of one or more hardware or software resources of the computing instance, and a type or types of processing partitions the computing instance can process. In addition, the world manager module 510 may obtain and track one or more hardware host metric(s) 530. These hardware host metric(s) 530 may identify and track an online/offline status of a hardware host, utilization of hardware or software resources of the hardware host, and other performance metrics associated with a hardware host.

The world manager module 510 may access the third data store 516 to create and manage one or more processing partition(s) 532 and one or more processing partition assignment(s) 534. The processing partition(s) 532 may include data structures that act as indexes to map the data object(s) 524 into computational units that can be assigned to a hardware host. The processing partition(s) 532 may include metadata that identifies a processing partition and one or more of the data object(s) 524 mapped to the processing partition.

As discussed earlier, object domains may be used to distribute the processing of data objects in a distributed computing system hosting a virtual environment. In this example, the world manager module 510 may access the first data store 512 to identify the object types for the data object(s) 524. The world manager module 510 may create a list of object types used in the virtual world. The world manager module 510 may then use the list of object types to create the processing partition(s) 532 to provide a mapping between the data object(s) 524 and the processing partition(s) 532. For example, a first object type (e.g., people) may be mapped to a first processing partition(s) and a second object type (e.g., vehicles) may be mapped to a second processing partition(s).

The world manager module 510 may also create the processing partition(s) 532 using the world configuration 522 and the application(s) 526. For example, the world manager module 510 may use the world configuration 522 to determine an overall number of processing partitions that may be supported in a virtual environment. In another example, the world manager module 510 may use a configuration of the application(s) 526 to determine a maximum or minimum number of data objects that may be allocated to a processing partition. The world manager module 510 may further create the processing partition(s) 532 using the hardware host configuration(s) 528 and the hardware host metric(s) 530. For example, the world manager module 510 may use the hardware host configuration(s) 528 to determine a number of hardware hosts available, the type of the hardware hosts, the hardware and software resources allocated to the hardware hosts, and the like, in order to determine the overall number of processing partitions. In another example, the world manager module 510 may use the hardware host configuration(s) 528 to determine the capacity of resources defined in the hardware host configuration(s) 528 to determine to a total number of processing partitions in the processing partition(s) 532 or a total number of the data object(s) 524 mapped into one of the processing partition(s) 532. In a further example, the world manager module 510 may use the hardware host metric(s) 530 to determine whether utilization of hardware or software resources affect the number of processing partitions in the processing partition(s) 532 or a supported number of the data object(s) 524 mapped into one of the processing partition(s) 532.

After determining the processing partition(s) 532 using the data object(s) 524, the world manager module 510 may determine one or more processing partition assignment(s) 534. The processing partition assignment(s) 534 may include data structures that act as indexes to assign the processing partition(s) 532 to the hardware host(s) 504. The processing partition assignment(s) 534 may include metadata that identifies one or more processing partitions and at least one of the hardware host(s) 504 assigned to the processing partitions. The world manager module 510 may use the world configuration 522 and the application(s) 526 to determine processing partition assignment(s) 534. For example, the world manager module 510 may use the assigned number of hardware hosts defined in the world configuration 522 to determine the processing partition assignment(s) 534. In another example, the world manager module 510 may use a number of objects supported or a subscription strategy defined for the application(s) 526 to determine the processing partition assignment(s) 534.

The world manager module 510 may further use the hardware host configuration(s) 528 and the hardware host metric(s) 530 to determine the processing partition assignment(s) 534. For example, the world manager module 510 may use the capacity of resources defined in the hardware host configuration(s) 528 to determine the processing partition assignment(s) 534. In another example, the world manager module 510 may use the hardware host metric(s) 530 to determine whether utilization of hardware or software resources affect the processing partition assignment(s) 534.

After determining the processing partition(s) 532 using the data object(s) 524, the world manager module 510 may send the processing partition(s) 532 to the hardware host(s) 504 to prepare the hardware host(s) 504 to process the data object(s) 524. For example, the world manager module 510 may send the processing partition assignment(s) 534 to the hardware host(s) 504. A first hardware host in the hardware host(s) 504 may determine which of the processing partition(s) 532 are assigned to the first hardware host. The first hardware host may process one or more of the data object(s) 524 that are mapped to those processing partition(s) 532 assigned to the first hardware host.

The hardware host(s) 504 may include a hardware host manager module 540, an application manager module 542, one or more application container(s) 544*a-n*, a distributed shared memory (DSM) module 546, a data store 548, one or more processor(s) 550, and one or more memory module(s) 552. The data store 548 may include one or more local data object(s) 560, an application library 562, one or more local hardware host metric(s) 564, one or more local processing partition(s) 566, and one or more local processing partition assignment(s) 568.

The hardware host manager module 540 may be configured to manage operation of a hardware host 504 to process the data object(s) 524. The hardware host manager module 540 may store one or more the data object(s) 524 in the file system data store 548 as the local data object(s) 560. The hardware host manager module 540 may also receive one or more of the application(s) 526 for storage in the data store 548 using an application library 562. The hardware host manager module 540 may configure the application library 562 with all or a portion of the application(s) 526. Accordingly, the application library 562 may be used to provide on-demand access to one or more of the application(s) 526 on the hardware host 504 without additional configuration.

The hardware host manager module 540 may also monitor utilization of hardware and software resources and store one or more local hardware host metric(s) 564 in the data store 548. The hardware host manager module 540 may monitor the application manager module 542, the application container(s) 544a-n, and the distributed shared memory module 546 or operation of the hardware host 504 overall. The hardware host manager module 540 may report the local hardware host metric(s) 564 back to the world manager module 510 for storage as the hardware host metric(s) 530.

The hardware host manager module 540 may manage storage of the local processing partition(s) 566. The hardware host manager module 540 may receive the processing partition(s) 532 from the world manager module 510, and the hardware host manager module 540 may store a copy of the processing partition(s) 532 in the data store 548 using the local processing partition(s) 566. In addition, the hardware host manager module 540 may report changes to the local processing partition(s) 566 back to the world manager module 510, which the world manager module 510 may use to update the processing partition(s) 532 and the processing partition assignment(s) 534.

The hardware host manager module 540 may manage storage of the local processing partition assignment(s) 568. The hardware host manager module 540 may receive one or more of the processing partition assignment(s) 534 from the world manager module 510. The hardware host manager module 540 may store a copy of the processing partition assignment(s) 534 in the data store 548 using the local processing partition assignment(s) 568, and the hardware host manager module 540 may use the copy to determine assigned processing partitions. Further, the hardware host manager module 540 may also maintain the copy of the processing partition assignment(s) 534 for other hardware hosts 504 to facilitate communication and data routing with the other hardware host 504.

According to one example of the present technology, the hardware host manager module 540 may analyze the local processing partition assignment(s) 568 to determine assigned processing partitions in the local processing partition(s) 566. The hardware host manager module 540 may request one or more of the processing partition(s) 532 from the world manager module 510 or the hardware host manager module 540 may receive the processing partition(s) 532 from the world manager module 510 together with the processing partition assignment(s) 534.

The application manager module 542 may be configured to manage the lifecycle of the applications on the hardware host 504 using the application library 562. For example, the application manager module 542 may read the local processing partition(s) 566 to determine which of the application(s) 526 are used during processing of the local data object(s) 560 mapped to the local processing partition(s) 566. The application manager module 542 may retrieve one or more of the application(s) 526 from the application library 562 and instantiate the applications to process the local data object(s) 560 according to object type. The application manager module 542 may load application instances into the app containers 544a-n and track processing of the local data objects 560 by the application instances.

The distributed shared memory module 546 may manage the data object(s) 524 using a shared memory in a memory device. The distributed shared memory module 546 may read the local processing partition(s) 566 to identify the local data object(s) 560. For example, metadata referencing the local data object(s) 560 may be in the local processing partition(s) 566 and may be used to obtain and locally store the data object(s) 524 at the hardware host 504. The distributed shared memory module 546 may then load the local data object(s) 560 into the shared memory as shared memory data object(s) 570 for use when needed by the application instances executing in the app containers 544a-n.

The distributed shared memory module 546 may also process requests to access the shared memory data object(s) 570 from the application instances executing in the app containers 544a-n. The requests to access the shared memory data object(s) 570 may include create, read, update, and delete operations by the application instances executing in the app containers 544a-n. As the shared memory data object(s) 570 are processed by the application instances executing in the app containers 544a-n, the distributed shared memory module 546 may record state changes to the shared memory data object(s) 570 using a thread-safe and low replication cost storage process and a serialization format understood by the distributed shared memory module 546, as will be discussed in a later section.

The distributed shared memory module 546 may further replicate state changes made to the shared memory data object(s) 570 to other application instances and across other hardware hosts in the hardware host(s) 504. The distributed shared memory module 546 may determine a list of subscribers, which identify application instances on the hardware host or on other hardware hosts registered to receive streams of data object events associated with the shared memory data object(s) 570. As the shared memory data object(s) 570 are processed by the application instances executing in the app containers 544a-n, the distributed shared memory module 546 may send state changes to the shared memory data object(s) 570 to the list of subscribers. The distributed shared memory module 546 may also subscribe to streams of data object events associated with the distributed shared memory modules on other hardware hosts. The distributed shared memory module 546 may receive state changes from the other hardware hosts to reflect in the shared memory data object(s) 570.

According to one example operation of the present technology, the distributed shared memory module 546 may determine changes to the local processing partition(s) 566 as the shared memory data object(s) 570 are processed by the application instances executing in the app containers 544a-n. The distributed shared memory module 546 may change a mapping between the local data object(s) 560 and the local processing partition(s) 566, for example, when a data object is created (i.e., resulting in the addition of a mapping between the data object and one of the local processing partition(s) 566) and when a data object is deleted or removed from the virtual environment (i.e., resulting in the removal of a mapping between the data object and one of the local processing partition(s) 566). The distributed shared memory module 546 may change a mapping between the local data object(s) 560 and the local processing partition(s) 566, for example, as the shared memory data object(s) 570 are processed by the application instances executing in the app containers 544a-n resulting in changes to object type, spatial location, states and other object attributes used to group the data object(s) 524 into the processing partition(s) 532. The distributed shared memory module 546 may use a change to a mapping between the local data object(s) 560 and the local processing partition(s) 566 to update the local processing partition(s) 566. The distributed shared memory module 546 may send any updates to the local processing partition(s) 566 to the world manager module 510.

The world manager module 510 may receive updates from the hardware host(s) 504 reflecting a change to a mapping between one or more of the data object(s) 524 and the processing partition(s) 532. For example, one of the hardware host(s) 504 may create data objects and add the data objects to one of the local processing partition(s) 566. The world manager module 510 may obtain the local processing partition(s) 566 from the hardware host(s) for comparison with the processing partition(s) 532 to detect the change. In another example, one of the hardware host(s) 504 may perform operations to update or delete data objects, which cause a change in the mapping between the data object(s) 524 and the processing partition(s) 532. In yet another example, one of the hardware host(s) 504 may split or merge one or more of the local processing partition(s) 566. For example, a processing application may specify a capacity of the processing application to process a number of data objects of a given object type. A threshold may be established for the processing application (e.g., 60%), which once neared, causes the data objects handled by a first instance of the processing application to be split and redistributed among the first instance and a second instance of the processing application. Processing partitions may be merged when there is underutilization of hardware or software resources. The world manager module 510 may use the updates from the hardware host(s) to update the processing partition(s) 532.

In response to updates to the processing partition(s) 532, the world manager module 510 may also determine whether to update the processing partition assignment(s) 534. The world manager module 510 may update the processing partition assignment(s) 534 to load balance processing of the data object(s) 524 among the hardware host(s) 504. The world manager module 510 may also update the processing partition assignment(s) 534 to ensure that frequently used data may be aggregated or collocated to hardware host. The world manager module 510 may then send the updates to the processing partition assignment(s) 534 to the hardware host(s) 504. Accordingly, the world manager module 510 may control and optimize performance of the hardware host(s) 504 during processing of the data object(s) 524.

According to another example operation of the present technology, the world manager module 510 may also monitor metrics associated with the hardware host(s) 504 to manage performance of the hardware host(s) 504. The world manager module 510 may receive data associated with the metrics from the hardware host(s) 504 and use the data to determine an initial configuration for the processing partition assignment(s) 534 or to determine whether to update the processing partition assignment(s) 534. The world manager module 510 may use the data associated with the metrics to determine whether to migrate a processing partition from a first of the hardware host(s) 504 to a second of the hardware host(s) 504. For example, utilization of a hardware or software resource of the first hardware host may exceed a threshold and affect performance of the first hardware host during processing of the data object(s) 524. The world manager module 510 may determine to change assignments for some of the processing partition(s) 534 to balance processing load, to control hardware or software utilization, to reduce network bandwidth and latency, and the like. The world manager module 510 may send the updated processing partition assignment(s) 534 to the hardware host(s) 504. Again, the world manager module 510 may manage performance of the hardware host(s) 504 during processing of the data object(s) 524 by modifying the allocations of the processing partition(s) 532.

The various processes and/or other functionality contained within the service provider environment 500 may be executed on the processor(s) 518 and 550 that are in communication with the memory module(s) 520 and 552, respectively. The service provider environment 500 may include a number of computing devices that are arranged, for example, in one or more server banks or computer banks or other arrangements. The computing devices may support a computing environment using hypervisors, virtual machine monitors (VMMs), and other virtualization software.

The term "data store" may refer to any device or combination of devices capable of storing, accessing, organizing and/or retrieving data, which may include any combination and number of data servers, relational databases, object-oriented databases, cluster storage systems, data storage devices, data warehouses, flat files, and data storage configuration in any centralized, distributed, or clustered environment. The storage system components of the data stores 512, 514, 516, and 548 may include storage systems such as a SAN (Storage Area Network), cloud storage network, volatile or non-volatile RAM, optical media, or hard-drive type media. The data stores 512, 514, 516, and 548 may be representative of a plurality of data stores as can be appreciated.

FIG. 5 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 5 illustrates an example of a system that may implement the techniques above, many other similar or different environments are possible. The example environments discussed and illustrated above are merely representative and not limiting.

Figure 6A:
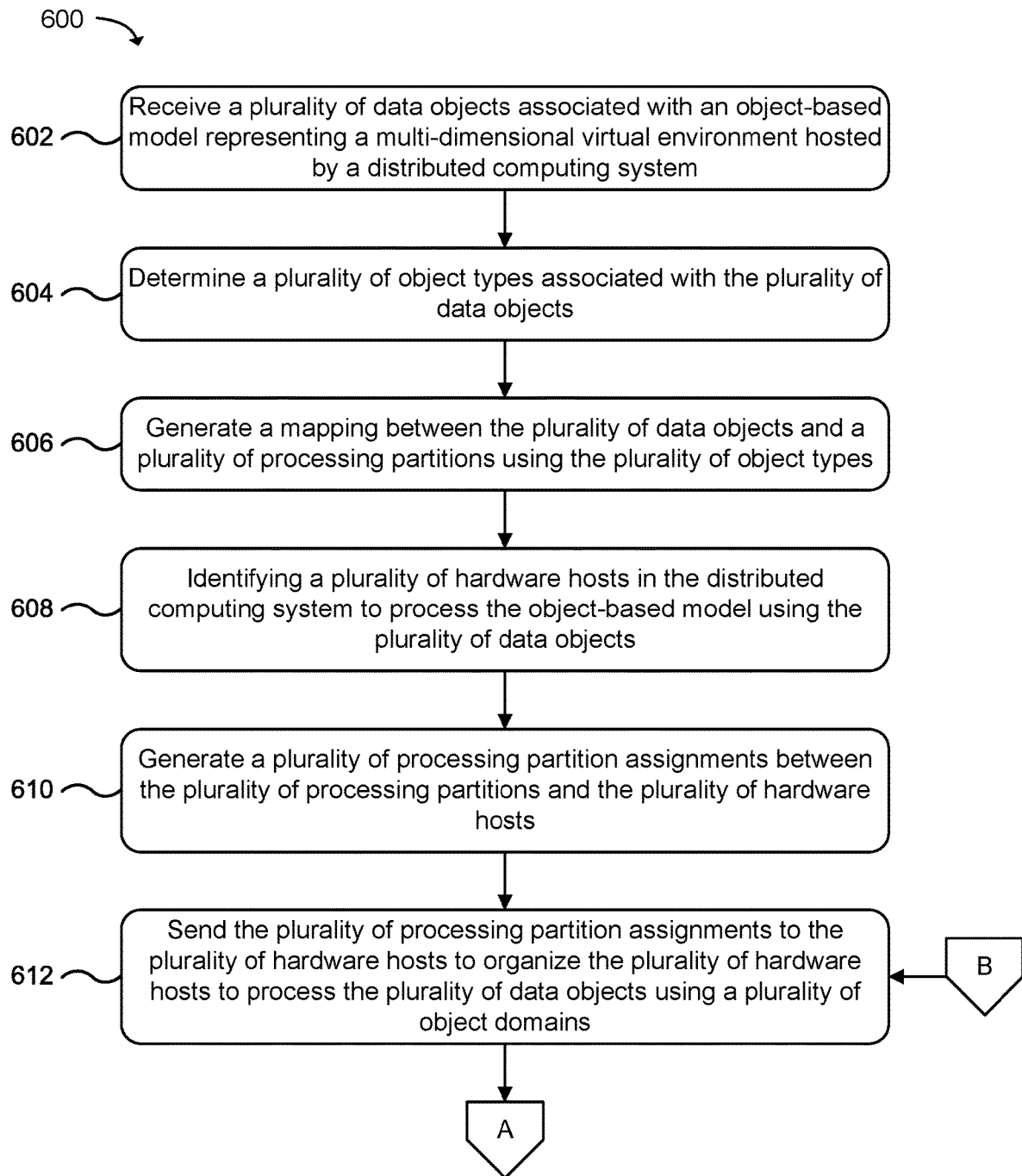
FIGS. 6A-6B are flow diagrams that illustrate example methods for managing hardware hosts in a distributed computing system using processing partitions organized by object domains according to examples of the present technology.
Figure 6B:
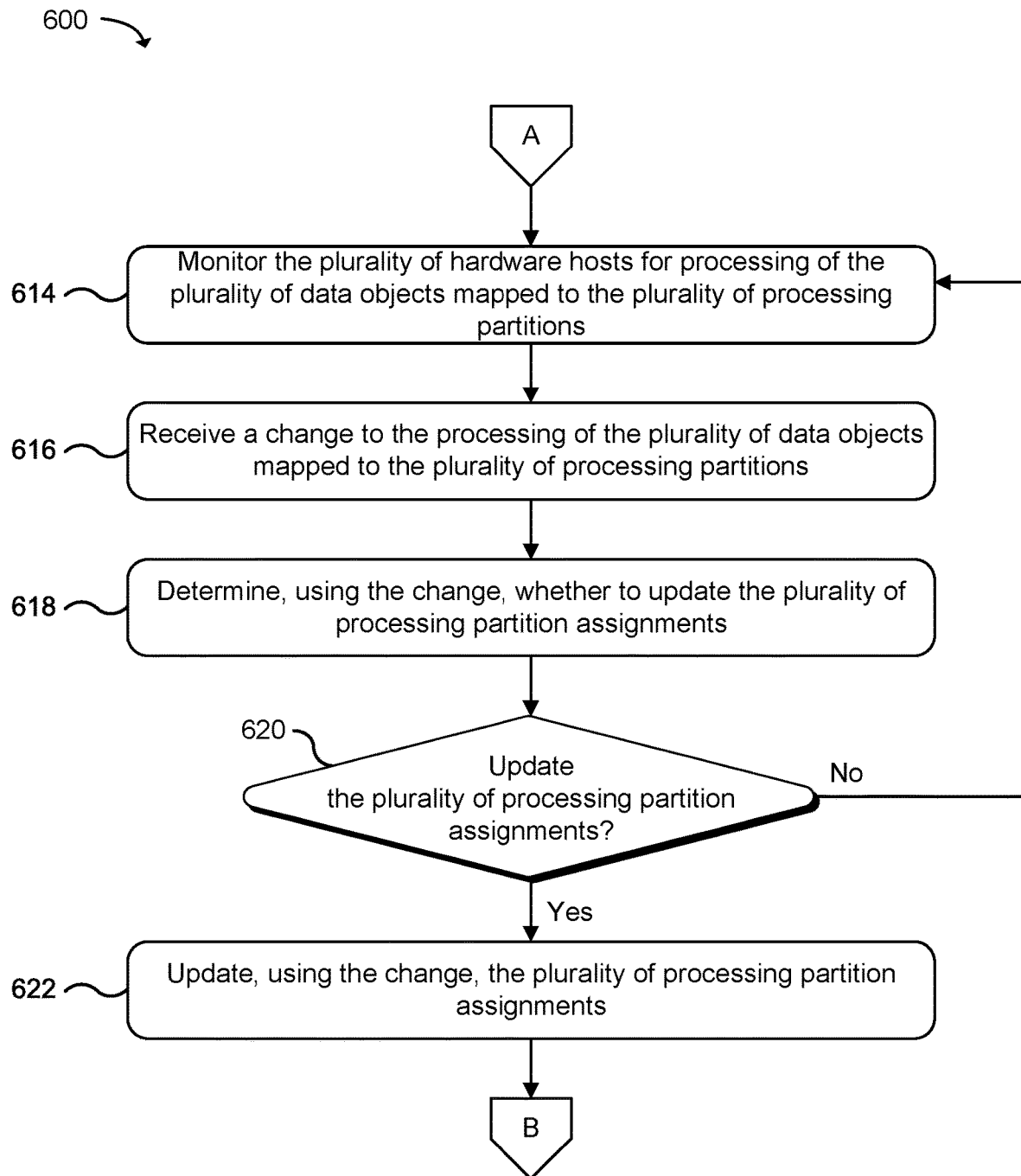

FIGS. 6A-6B are flow diagrams that illustrate an example method for allocating processing partitions using object domains according to one example of the present technology. The method 600 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 602, a world manager may receive a plurality of data objects associated with an object-based model representing a multi-dimensional virtual environment hosted by a distributed computing system. In operation 604, the world manager may determine a plurality of object types associated with the plurality of data objects. An example of object types may be that set for object_1 is type "vehicle" and object_2 may be of type "building." Thus, these two groups of objects may be separated by their types. In operation 606, the world manager may generate a mapping between the plurality of data objects and a plurality of processing partitions using the plurality of object types. As in the example, the objects of type "vehicle" and the objects of type "building" may be mapped to processing partition 1 and processing partition 2, respectively. The world manager may generate data structures that index the plurality of data objects into the plurality of processing partitions using the plurality of object types. The data structures may include metadata about a processing partition and the data objects grouped by an object type, which are mapped to the processing partition.

In operation 608, the world manager may identify a plurality of hardware hosts in the distributed computing system to process the object-based model using the plurality of data objects. The world manager may identify hardware hosts from a pool of hardware hosts awaiting assignments, active hardware hosts that have spare computing capacity, and the like. The active hardware hosts may be executing application instances in a container or in a computing instance that may operate on the processing partitions. This means that processing partitions may be allocated for processing to a hardware host that has an application instance for an application that can process the type of data objects mapped to the processing partitions. In one example, a first hardware host may have an application instance which can process the "vehicle" type and a second application instance which can process the "building" when a physics event (e.g., a collision or explosion occurs).

In operation 610, the world manager may generate a plurality of processing partition assignments between the plurality of processing partitions and the plurality of hardware hosts. The world manager may generate data structures that allocate the plurality of processing partition assignments to the plurality of hardware hosts. The data structures may include metadata about a hardware host and the processing partitions allocated for processing to the hardware host. In operation 612, the world manager may send the plurality of processing partition assignments to the plurality of hardware hosts to organize the plurality of hardware hosts to process the plurality of data objects using the plurality of object domains. Thus, the data objects may be processed based on the type of the object.

The method 600 continues using reference "A" from FIG. 6A onto FIG. 6B. In operation 614, the world manager may monitor the plurality of hardware hosts for processing of the plurality of data objects mapped to the plurality of processing partitions. The world manager may receive data associated with utilization of hardware and software resources, changes to the data objects, and changes to the processing partitions. In operation 616, the world manager may receive a change to the processing of the plurality of data objects mapped to the plurality of processing partitions. The change may include an update to a processing partition, which may include mapping a newly created data object to the processing partition, modifying a data object mapped to the processing partition, or removing the mapping between a data object and the processing partition. For example, the number of data objects mapped to a processing partition may increase for other reasons (e.g., players entering an area) and load balancing may need to occur by revising the assignments. In another example, the object type may change from "building" to "exploded_building" which may affect the processing partition assignment of the data object. The change to the processing of the plurality of processing partitions may also include changes due to overutilization of hardware and software resources on a hardware host.

In operation 618, the world manager may determine, using the change, whether to update the plurality of processing partition assignments. The world manager may determine to update the plurality of processing partitions to manage or optimize performance of the hardware hosts. The world manager may load balance processing of data objects across the plurality of hardware hosts, for example, in response to underutilization or overutilization of a hardware or software resource. The world manager may also redistribute processing partitions due to changes to the data objects or to the processing partitions. If the world manager determines, using the change, not to update the plurality of processing partition assignments in step 620, the method 600 continues in operation 614 where the world manager returns to monitoring the plurality of hardware hosts.

If the world manager determines, using the change, to update the plurality of processing partition assignments in step 620, the method 600 continues in operation 622 where the world manager updates, using the change, the plurality of processing partition assignments. The world manager may update the plurality of processing partition assignments, for example, to migrate a processing partition assignment from a first hardware host to a second hardware host due to exceeding a threshold for CPU usage associated with the first hardware host. The world manager may migrate a processing partition from a first hardware host to a second hardware host to collocate data more frequently used by the second hardware host. The world manager may also create new processing partition assignments for hardware hosts transferred from a warming pool to an active pool. The method 600 continues using reference "B" from FIG. 6B and returns back to FIG. 6A where in operation 614 the world manager may send the plurality of processing partition assignments (including any updates) to the plurality of hardware hosts.

Figure 7:
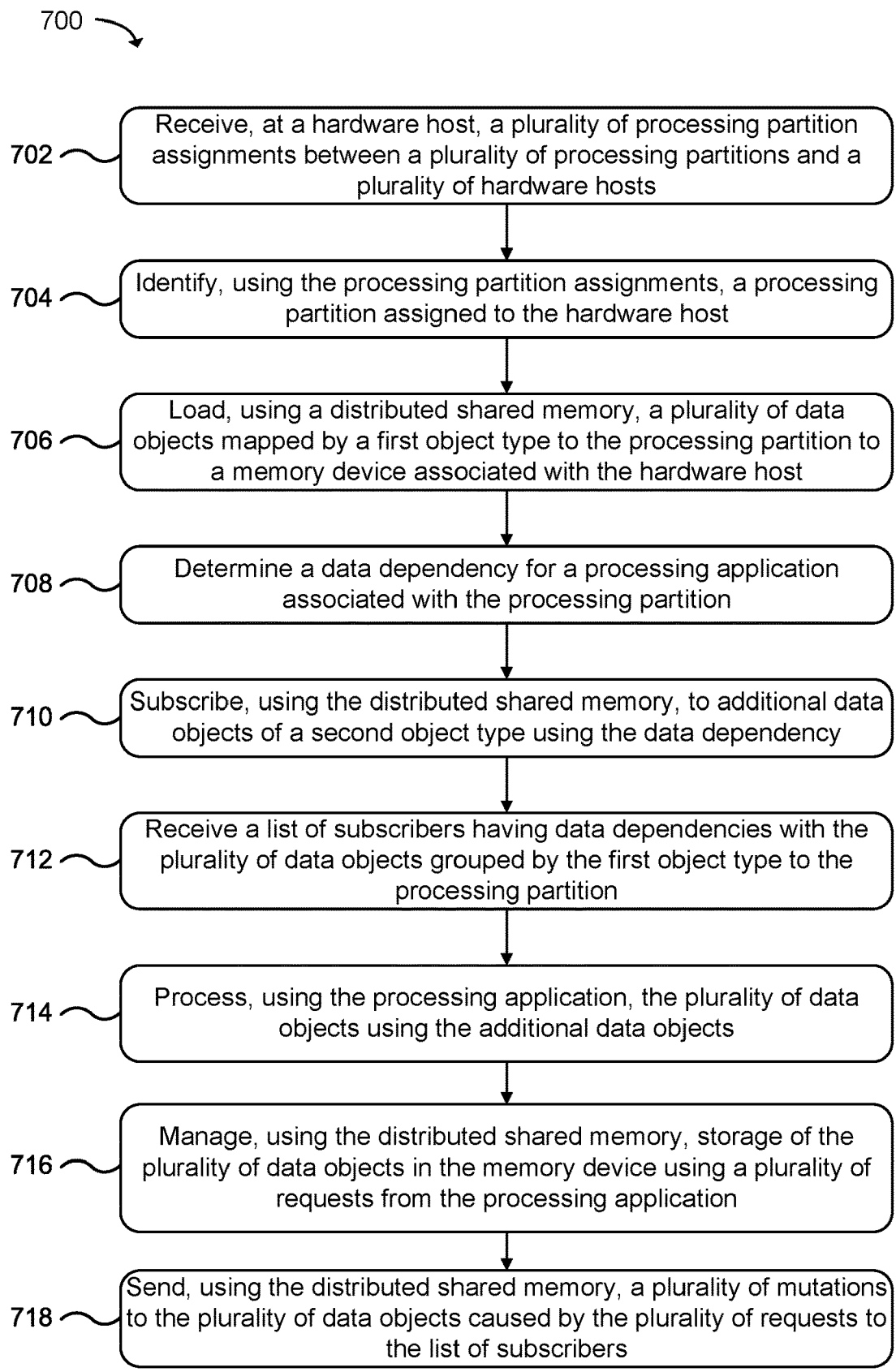
FIG. 7 is a flow diagram that illustrates an example method for processing data objects assigned to a hardware host using processing partitions organized by object domains according to examples of the present technology.

FIG. 7 is a flow diagram that illustrates an example method 700 for processing data objects grouped by object domains into processing partitions according to one example of the present technology. The method 700 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 702, a hardware host may receive a plurality of processing partition assignments, which are assignments between a plurality of processing partitions and a plurality of hardware hosts. The hardware host may receive the plurality of processing partition assignments from a world manager. In operation 704, the hardware host may identify, using the processing partition assignments, a processing partition assigned to the hardware host. In one configuration, a single processing partition may be assigned to the hardware host. In another configuration, many processing partitions may be assigned to the hardware host (e.g., dependent, independent, related, or unrelated processing partitions).

In operation 706, the hardware host, using a distributed shared memory, may load a plurality of data objects mapped by a first object type into the processing partition in a memory device associated with the hardware host. In operation 708, the hardware host may determine a data dependency used by a processing application associated with the processing partition. The data dependency may indicate additional object types used by the processing application upon which the data objects mapped to the processing partition are dependent. The data dependency may indicate that the processing application may subscribe to receive streams of data object events associated with the additional object types. The data dependency may further indicate a subscription strategy used to filter the sources from where the additional object types are obtained. The application instances on the hardware host may communicate, with the distributed shared memory, using the permission model for object types of data objects that are currently being used in processing. The read-only permissions in the permission model may be used to determine data dependencies.

In operation 710, the hardware host, using the distributed shared memory, may subscribe to additional data objects of a second object type using the data dependency. A subscription may be used to identify and filter sources of streams of data object events associated with the additional data objects of the second object type. The distributed shared memories of multiple hardware hosts may be sources to use for streams of data object events associated with the additional data objects of the second object type. Multiple distributed shared memories may communicate with each other to exchange the data objects or exchange updates for the data objects as part of a subscription strategy identified for data dependencies.

In operation 712, the hardware host may receive a list of subscribers having data dependencies on the plurality of data objects grouped by the first object type into the processing partition. A list of subscribers may be used to identify and filter destinations for streams of data object events associated with the plurality of data objects of the first object type. Processing applications on the same hardware host and the distributed shared memories of multiple hardware hosts may be destinations for the streams of data object events associated with the plurality of data objects of the first object type. As discussed above, the application instances on the hardware host may communicate with the distributed shared memory for data objects that are currently being used in processing. Additionally, multiple distributed shared memories may communicate with each other to exchange the data objects or exchange updates for the data objects among the list of subscribers.

In operation 714, the hardware host may process, using the processing application, the plurality of data objects grouped by the first object type to the processing application using the addition data objects. The application instances may read data associated with the data objects from the distributed shared memory. The application instances may perform operations or calculations on the data objects, some of which may result in changes to the data objects. In operation 716, the hardware host may manage, using the distributed shared memory, storage of the plurality of data objects in the memory device using a plurality of requests from the processing application. The plurality of requests may include requests to modify data associated with the plurality of data objects mapped to the processing partition. The application instances may submit requests to modify data associated with the data objects to the distributed shared memory. The distributed shared memory may process the requests to record mutations to the data objects caused or implemented by the requests.

In operation 718, the hardware host may send, using the distributed shared memory, a plurality of mutations to the plurality of data objects, which were caused by the plurality of requests, to the list of subscribers. As discussed above, the application instances on the hardware host may communicate with the distributed shared memory for data objects that are currently being used in processing. Additionally, multiple distributed shared memories may communicate with each other to exchange the data objects or exchange updates for the data objects among the list of subscribers.

Figure 8:
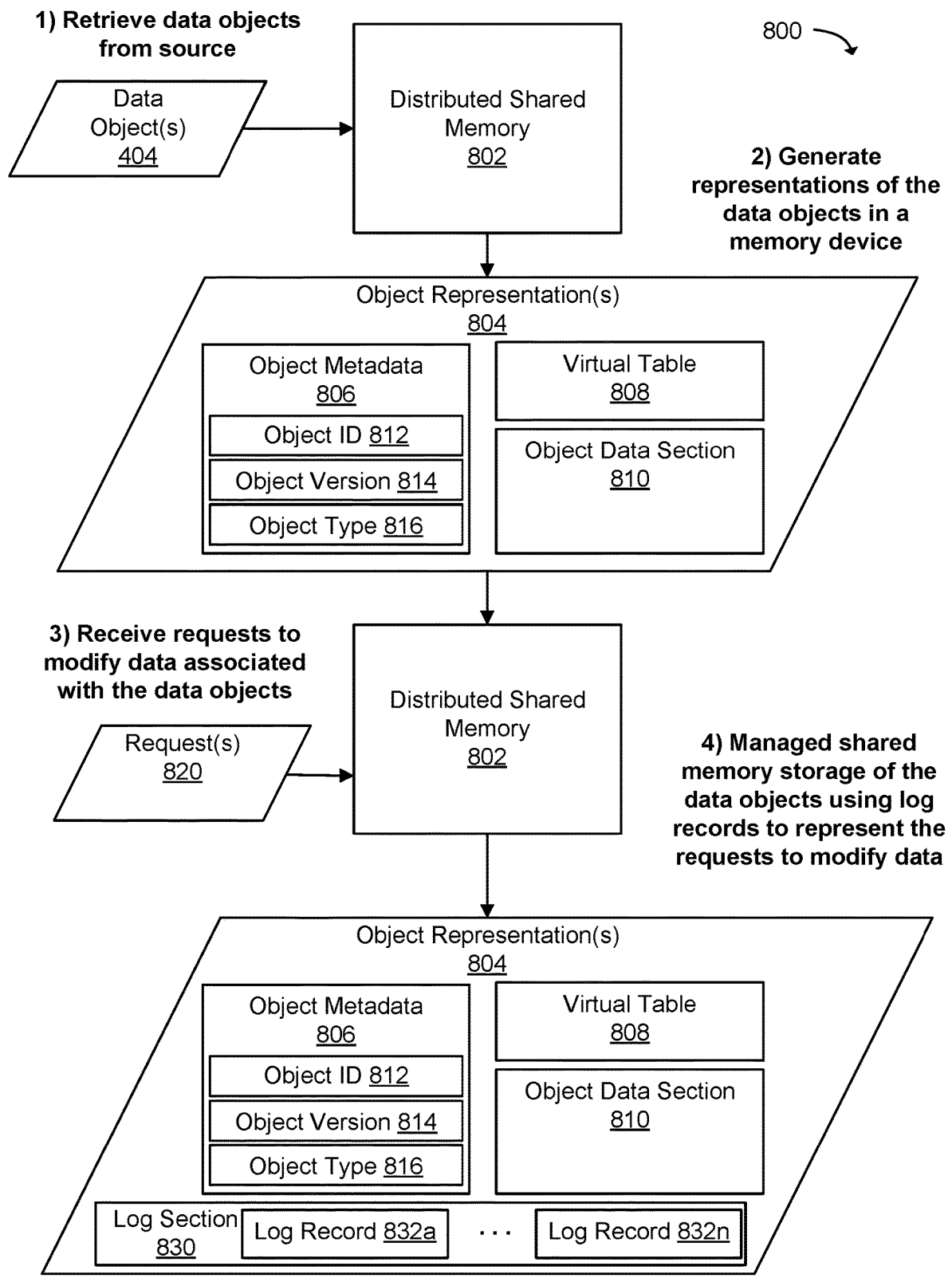
FIG. 8 illustrates a hardware host and related operations for storing and replicating states of data objects in a distributed computing system according to an example of the present technology.

FIG. 8 illustrates a system 800 and related operations for storing and replicating state of data objects in a distributed computing system according to an example of the present technology. The system 800 may include a distributed shared memory 802. Some examples of the distributed shared memory 802 may include the distributed shared memory module 274 described with respect to FIG. 2 and the distributed shared memory module 546 described with respect to FIG. 5. The distributed shared memory 802 may manage storage of the data object(s) 404 for the system 800. The distributed shared memory 802 may manage storage of the data objects(s) 404 using a storage process to create or load the data object(s) 404 into one or more memory devices using in-memory representations of the data object(s) 404. The distributed shared memory 802 may also manage storage of the data object(s) 404 using the storage process to handle requests to read and write to the in-memory representations of the data object(s) 404.

According to the present technology, the distributed shared memory 802 may use a storage process that includes a serialization format for the data object(s) 404. The distributed shared memory 802 may use the storage process to represent the data object(s) as hierarchical data in-memory and on disk using a plurality of sections. The distributed shared memory 802 may further utilize log records in one of the plurality of sections to represent modifications to the data object(s) 404 to minimize the time cost to reflect state changes in highly distributed, real-time, computations.

For example, the distributed shared memory 802 may use the storage process and implement the serialization format for the data object(s) 404 to minimize the time cost to reflect state changes for epoch based simulations, where each epoch provides an execution interval. The epoch-based simulation may use a scenario with 1 Writer/N Reader processes for the data object(s) 404, and with each process potentially containing multiple threads, where the processes may have epochs or execution intervals lasting ~30 ms. Typical RPC (remote procedure call) frameworks, such as grpc/protobuf, start to fall behind as the epoch frequency increases and the size of messages used to reflect state changes increases. This may be due to CPU time spent de-serializing data objects and the cost of synchronizing the entire data object when an update to the data object is made. The distributed shared memory 802 can meet performance requirements using the storage process according to the present technology because the storage process provides a platform independent and language independent data format specification to use with the data object(s) 404.

The distributed shared memory 802 may provide a small, predictable amount of overhead because code written to use the storage process with the serialization format should perform as close to a native storage process as possible for CRUD (create, read, update, delete) operations. The distributed shared memory 802 may include an overhead for using storage process with the serialization format that may maintain an amortized O(1) cost. The distributed shared memory 802 also incurs no serialization costs using the storage process by keeping the memory layout the same as the storage/wire format. Additionally, the distributed shared memory 802 may use the storage process to enable updates to the data object(s) 404 in the form of log records. The distributed shared memory 802 may group one or more modifications to the data object(s) 404 together within an epoch or execution interval as a log record.

The distributed shared memory 802 may provide mechanisms for processing applications and other distributed shared memories to retrieve and consume log records for the data object(s) 404. Therefore, the distributed shared memory 802 may be highly concurrent because there is a separation between how the storage process implements the storage of the data object(s) and the storage of metadata used to track changes to the state of the data object(s) 404. Finally, the distributed shared memory 802 is highly efficient because the storage process may use a binary encoding to represent data for the data object(s), thus, reading a data field from the encoding simply uses the binary encoding schema.

In this example, the distributed shared memory 802 may retrieve the data object(s) 404 from one or more sources (not shown), such a file, an object data store, another distributed shared memory, and the like. As discussed above, the data object(s) 404 may be associated with an object-based model of a virtual environment (e.g., a 3D simulation, 3D game, etc.). At the beginning of the lifecycle of the data object(s) 404 in the virtual environment, the distributed shared memory 802 may manage storage of the data object(s) 404 in memory devices using the storage process according to the present technology during object creation and loading. For example, the distributed shared memory 802 may generate one or more object representation(s) 804 for the data object(s) 404 in a memory device. The distributed shared memory 802 may copy the data object(s) 404 directly to the memory device when keeping the memory layout the same as the storage/wire format. Alternatively, the distributed shared memory 802 may parse the data object(s) 404 to write the data object(s) to the memory device using the storage process. The object representation(s) 804 may include one or more sections in the memory device. Some examples of a section may include a metadata section, a virtual table section, an object data section, a log section, and the like. At the time of creation, for example, the object representation(s) 804 may include an object metadata section 806, a virtual table 808, and an object data section 810. At other times during the lifecycle of the data object(s) 404, the distributed shared memory 802 may use the storage process to add one or more sections and portions of sections to the object representation(s) 804.

The distributed shared memory 802 may use the object metadata section 806 to describe the in-memory/on disk/over the wire content of the data object(s) 404, as well as how to read the object representation(s) 804. The object metadata section 806 may include one or more metadata fields. The object metadata section 806 may include a length field, which indicates the length of the object metadata section 806 (e.g., in bytes) and an object length field, which indicates a total combined length of the object metadata section 806, the virtual table 808, and the object data section 810. The object metadata section 806 may also include an object identifier (ID) 812 field, which provides a unique identifier to identify a data object, and a base version field, which indicates the version of the data object represented by the object data section 810. The object metadata section 806 may include a virtual table offset field, which provides the memory offset (e.g., from the start of the object metadata section 806) to the start of the virtual table 808, and an object data offset field, which provides the memory offset (from the start of the object metadata section 806) to the start of the object data section 810.

The distributed shared memory 802 may use the virtual table 808 to describe one or more portions of the object data section 810. The virtual table 808 may include one or more table fields and table entries. For example, the virtual table 808 may include an array of offsets from the start of the object data section 810 that point to the portions of the object data section 810. In one example, a desired memory location in the object data section 810 may be found by using the offset found in the corresponding table entry of the virtual table 808. In another example, the Nth data field of a data object may be found by using the offset found in the Nth index of the virtual table 808. The virtual table 808 may include a length field, which indicates the length of the virtual table 808 (e.g., in bytes), and one or more table entries or field offsets, which provide an array representing the table entries or field offsets for each of the data entries or data fields in the object data section 810. The distributed shared memory 802 may use the object data section 810 to include the data entries, data fields, data values, etc. of the data object(s) 404. The object data section 810 may include a length field, which provides the length of the object data section 810 (e.g., in bytes) and a byte array representing data values in a data object.

According to another example of the present technology, during the lifecycle of the data object(s) 404 in the virtual environment, the distributed shared memory 802 may manage the storage of state changes to the data object(s) 404. For example, the distributed shared memory 802 may provide mechanisms for processing applications and other distributed shared memories to retrieve and process the data object(s) 404. The distributed shared memory 802 may receive one or more request(s) 820. The request(s) 820 may be issued by one or more processing applications. The request(s) 820 may instruct the distributed shared memory 802 to create or delete the object representation(s) 804 in the memory device, read the object representation(s) 804 from the memory device, and write changes to the data object(s) 404 represented by the object representation(s) 804.

In one example, the distributed shared memory 802 may analyze the request(s) 820 to identify a read request associated with the data object(s) 404 to be handled using the object representation(s) 804 in the memory device. The distributed shared memory 802 may read the object metadata section 806 of the object representation(s) 804 to determine whether the request(s) 820 match, for example, a particular object ID 812, object version 814 and object type 816. Upon satisfying this initial validation check, the distributed shared memory 802 may obtain the memory location of the virtual table 808 from the object metadata section 806. The distributed shared memory 802 may read the virtual table 808 to determine the field offsets in the object data section 810 to obtain the in-memory contents of the data object(s) 404. The distributed shared memory 802 may the read the object data section 810 using the field offsets to obtain the in-memory contents of the data object(s) 404 from the object representation(s) 804. The distributed shared memory 802 may include the in-memory contents of the data object(s) 404 obtained from the object representation(s) 804 and may send responses to one or more requestors associated with request(s) 820.

In another example, the distributed shared memory 802 may analyze the request(s) 820 to identify a write request associated with the data object(s) 404 and data to be written to the data object(s) 404 using the object representation(s) 804 in the memory device. The distributed shared memory 802 may again read the object metadata section 806 of the object representation(s) 804 to determine whether the request(s) 820 match, for example, a particular object ID and object version. Upon satisfying this initial validation check, the distributed shared memory 802 may append a version-ordered set of mutations to the object representation(s) 804 in the memory device.

The distributed shared memory 802 may use a series of log records in a log section to reflect state changes to the object representation(s) 804 in the memory device. As illustrated in FIG. 8, the object representation(s) 804 may further include a log section 830. The distributed shared memory 802 may use the log section 830 to represent state changes to the data object(s) 404 represented in the object representations 804. The distributed shared memory 802 may access a current state of the data object(s) 404 by reading the log section 830 from the tail, and reading backwards to get the most up-to-date information for the data object(s) 404 contained in the object representation(s) 804 in the memory device. The distributed shared memory 802 may manage the current state of the data object(s) 404 by appending one or more log record(s) 832 (e.g., log records 832*a-n*) to the object representation(s) 804 to reflect the version-ordered set of mutations or writes. The distributed shared memory 802 may use the log record(s) 832 to describe a set of mutations to the data object(s) 404 and to which version of the data object(s) the mutations apply. The distributed shared memory 802 may append the log record(s) 832 to the object representation(s) 804 in reverse order to facilitate the tail-to-head reading mechanism, as well as single-pass writes and thread-safe reads.

Figure 9:
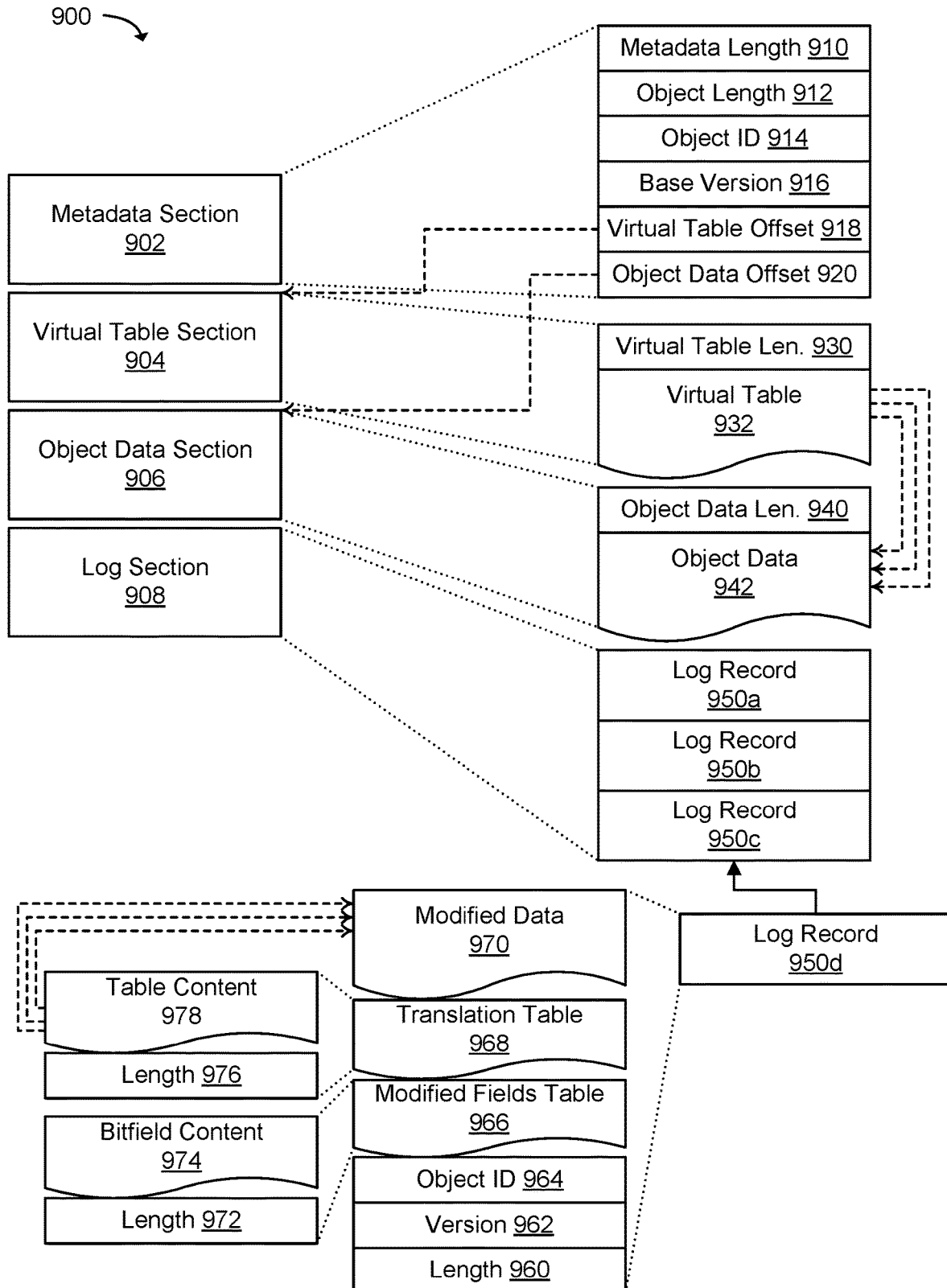
FIG. 9 illustrates a graphical schematic example of a serialization format for data objects in a distributed computing system that provides low replication cost and thread-safe reads according to an example of the present technology.

FIG. 9 illustrates a graphical example of an object representation 900 used by a distributed shared memory for managing storage of data objects in a distributed computing system that provides low replication cost and thread-safe reads according to an example of the present technology. The distributed shared memory may implement the object representation 900 using a set of semantics built on top of a byte array. The object representation 900 may provide low replication costs as the byte array can be copied "as is" to another memory location, to a file on disk, across a network to another hardware host, and the like, because the serialization format of the object representation 900 reduces the extra processing to format the data for different storage or transport media.

The distributed shared memory may segment the object representation 900 into one or more sections in-memory, over the wire, and on disk as a file. The object representation 900 may include a metadata section 902, a virtual table section 904, an object data section 906, and a log section 908. The object representation 900 may provide thread-safe reads because the organization of the sections in the object representation 900 prevents reading from a section that can be written to at the same. The object representation 900 may include a resizable byte array (RBArray) which provides an abstraction around a resizable array of bytes that allows for atomic "reservations" of bytes. The object representation 900 may enable a request to resize the array to allocate additional bytes to be completed as an atomic process prior to servicing another pending request to resize the array. Accordingly, the object representation 900 enables atomic reservations to allow a queue of appending writes to the object representation 900 to be thread safe.

The distributed shared memory may use the metadata section 902 of the object representation 900 to describe the byte array, as well as to provide information on how to read the byte array. The metadata section 902 may include one or more metadata fields, such as a metadata length 910, an object length 912, an object identifier 914, a base version 916, a virtual table offset 918, and an object data offset 920. The metadata length 910 may specify the length of the metadata section 902 in bytes. The object length 912 may specify a total length of the byte array without the log section 908. The object identifier 914 may specify a unique identifier to identify this object. Some examples of the object identifier 914 may include a UUID or GUID.

The base version 916 may specify a version of the data object represented by the object data section 906. The virtual table offset 918 may specify an offset (from the start of the byte array) to the start of the virtual table section 904. The object data offset 920 may specify an (from the start of the byte array) to the start of the object data section 906.

The distributed shared memory may use the virtual table section 904 of the object representation 900 to describe offsets into specific portions of the object data section 906. The virtual table section 904 may include a virtual table length 930, which specifies a length of a virtual table 932 in bytes. The virtual table 932 may include an array of offsets that begin from the start of the object data section 906. The Nth field of a data object represented by the byte array can be found by using the offset found in the Nth index of the array in the virtual table 932.

The distributed shared memory may use the object data section 906 of the object representation 900 to store a data object. The object data section 906 may include an object data length 940, which specifies a length of the object data 942 in bytes. Data associated with a data object may be retrieved from a file, object store, etc., and copied into the object data 942. The object data 942 may include a byte array representing the data object. The object data 942 may include: integers, floats, characters, strings, blobs, and the like, as well as combinations thereof. As indicated above, the object identifier 914 identifies the data object represented in the object data section 906. The base version 916 specifies a version of the data object represented in the object data section 906.

The distributed shared memory may use the log section 908 of the object representation 900 to represent state changes to the data objects. The distributed shared memory may use the log section 908 to write a version-ordered set of mutations to the data objects whose contents are represented in the object data section 906. The log section 908 may include a series of one or more log records 950 (e.g., log records 950*a-d*). The distributed shared memory may read the log section 908 starting from the tail and reading backwards to get the current state of the data objects. The distributed shared memory may use the log records 950 to describe a set of mutations to the data objects. The distributed shared memory may write the log records 950 to the log section 908 by appending the log records 950 in reverse order to facilitate the tail-to-head reading mechanism, single-pass writes and thread safe-reads.

In this example, the log record 950*d* may include one or more log fields, such as a length 960, which specifies a length of the log record 950*d* in bytes. The log record 950*d* may include a version field 962. The distributed shared memory may use the version field 962 to specify a version of the data object to which the log record 950*d* applies. The distributed shared memory also may use the version field 962 to specify a version of a portion of the data records or a particular data field to which the log record 950*d* applies. The log record 950*d* may also include an object identifier 964, which provides the object identifier of the data object to which the log record 950*d* applies, and a modified fields table 966.

According to one example of the present technology, the distributed shared memory may use the modified fields table 966 to indicate where a change has occurred in the state of the data object. The modified fields table 966 may include a reference indicating that a portion of the log record 950*d* includes a change to the data associated with the data object, which may be different from data currently associated with the data object and stored in a portion of the object data section 906. For example, the distributed shared memory may use the modified fields table 966 to include references indicating which object fields of the data object have been changed. The modified fields table 966 may include a length 972 (in bytes) to describe the size of the modified fields table 966, as well as bitfield content 974 to represent actual fields modified using an index. In this example, the distributed shared memory may set one or more bits of the bitfield content 974 to indicate that object fields have changed. Each bit in the byte may correspond to an ordered set of object fields. Setting the bit of a corresponding object field in the bitfield content 974 may provide the reference indicating a change to the object field.

According to one example of the present technology, the distributed shared memory may use a translation table 968 to indicate where a change has occurred in the state of the data object. The log record 950d may further include the translation table 968, which provides an inner virtual table that contains a length 976 (in bytes) to describe the size, as well as a table content 978. The distributed shared memory may use the table content 978 as a mapping between offsets that point into a modified data section 970 and the changed object fields, which may also be identified in the modified fields table 966. The distributed shared memory may use the modified data section 970 to store mutations to data objects. The modified data section 970 may include a byte array that represents the changes to the object fields in the log record 950d. According to one example of the present technology, the distributed shared memory may append the log records 950a-d in-memory one after the other or contiguously. In another example, the distributed shared memory may include in the log records 950a-d a previous-record pointer or another type of linked list scheme. The distributed shared memory may use the previous-record pointer to provide gap detection to detect an incomplete log.

According to another example of the present technology, the distributed shared memory may aggregate a plurality of requests to modify data associated with the data object during an epoch or execution interval in the distributed computing system. The distributed shared memory may use the translation table 968 and/or the modified fields table 966 to include references for multiple portions of the data object affected by the plurality of requests. The distributed shared memory may append a single log record for the epoch to the log section 908 of the object representation 900. The single log record may include a plurality of mutations to the data object implemented by the plurality of requests, which are referenced as changes in the translation table 968 and/or the modified fields table 966 as affecting multiple portions of the data object.

According to yet another example of the present technology, the distributed shared memory may aggregate a plurality of requests to modify data associated with the data object during an epoch or execution interval in the distributed computing system when the requests apply to the same portion of the data object. The distributed shared memory may append a single log record for the epoch to the log section 908 of the object representation 900. The single log record may include the latest in series of mutations to the data object implemented by the plurality of requests, which is referenced as a single change in the translation table 968 and/or the modified fields table 966 as affecting the portion of the data object.

According to a further example of the present technology, the distributed shared memory may append a plurality of log records to the log section 908 of the object representation 900 during an epoch or execution interval in the distributed computing system. The distributed shared memory may determine to coalesce the plurality of log records into a single log record (e.g., at the end of an epoch, when a read is made, or at another point in time) in order to save storage space or improve later reading times to determine the current state of the data object. The distributed shared memory may write the single log record to the log section 908 to replace the plurality of log records. The single log record may include a plurality of references indicating that a plurality of mutations to the data object aggregated from the plurality of log records reflect changes to a plurality of portions of the data object.

According to an additional example of the present technology, the distributed shared memory may use the object representation 900 to communicate state changes associated with the data object. The distributed shared memory may receive an instruction to send a current state of the data object to a recipient, such as a processing application, another distributed shared memory, an object data store, and the like. The distributed shared memory may determine whether the recipient includes a prior state of the data object. For example, the distributed shared memory may track whether all or part of the object representation 900 had been previously sent to the recipient. The distributed shared memory may send the recipient one or more of the log records 950 (e.g., all of the log records) in the log section 950 when distributed shared memory determines the recipient includes the prior state of the data object. The distributed shared memory may send the recipient one or more delta log records that represent a difference between the current state of the data object and the prior state held at the recipient. The distributed shared memory may determine that the recipient does not include the prior state of the data object and second either the object representation 900 or the entirety of the log section 908. The distributed shared memory may coalesce the log section 908 into a single log record as discussed above to represent the current state based on storage or network conditions. For example, the distributed shared memory may coalesce the log section 908 into a single log record to reduce storage used by the object representation 900. In another example, the distributed shared memory may coalesce the log section 908 into a single log record to reduce the network bandwidth used for data transfer.

Figure 10:
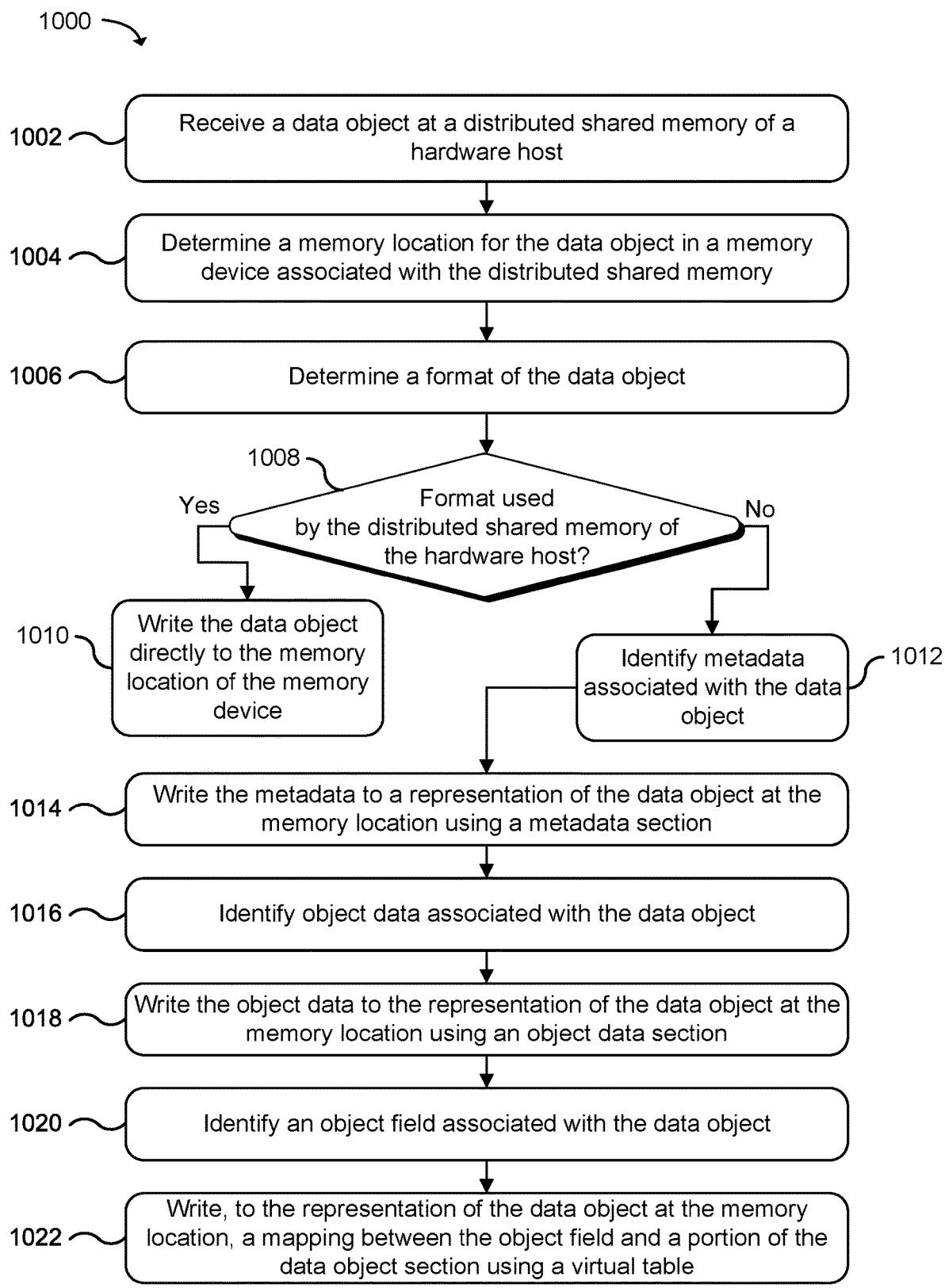
FIG. 10 is a flow diagram that illustrates an example method for managing storage of data objects in a distributed computing system using a serialization format that provides low replication cost and thread-safe reads according to an example of the present technology.

FIG. 10 is a flow diagram that illustrates an example method 1000 performed by a distributed shared memory for managing storage of data objects in a distributed computing system that provides low replication cost and thread-safe reads according to an example of the present technology. The method 1000 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1002, a distributed shared memory of a hardware host may receive a data object associated with an object-based model of a virtual environment hosted by the distributed computing system. The distributed shared memory of the hardware host may retrieve data associated with the data object from an object data store. In another example, the distributed shared memory may receive data associated with the data object from another hardware host, a world manager, a data service, or a client. In operation 1004, the distributed shared memory may determine a memory location for the data object in a memory device associated with the hardware host. The memory device may include volatile and non-volatile storage devices. The distributed shared memory may set aside a portion of memory in the memory device to manage a shared storage space for representations of data objects. The distributed shared memory may allocate memory at the memory location for the data object and share the memory with a processing application on the hardware host and with other distributed shared memories on other hardware hosts in the distributed computing system. In this example, the distributed shared memory may share a portion of random access memory as the shared storage space.

In operation 1006, the distributed shared memory may determine a format of the data object. The format of the data object may include an on-disk format and an in-memory format. The on-disk format may be the same or may be different from the in-memory format. The distributed shared memory may use the same format for file storage and memory storage to reduce the need to perform serialization prior to storage or transfer over a network. If the distributed shared memory determines in operation 1008 that the format of the data object is used by the distributed shared memory, the distributed shared memory may write the data object to the memory location in the memory device in operation 1010. For example, the distributed shared memory may copy data associated with the data object directly to the memory device, irrespective of whether the data was obtained from an object data store, a file, in a network packet, and the like. The distributed shared memory may perform a memcopy to allocate the data object to the shared memory space.

If the distributed shared memory determines in operation 1008 that the format of the data object is not used by the distributed shared memory, the distributed shared memory may identify metadata associated with the data object, as in operation 1012. For example, the distributed shared memory may parse data associated with the data object to determine an object identifier that uniquely identifies the data object and an object version for the data associated with the data object. In operation 1014, the hardware host may write the metadata to an in-memory representation of the data object at the memory location using a metadata section.

In operation 1016, the distributed shared memory may identify object data associated with the data object. The distributed shared memory may parse data associated with the data object to determine numerical data, strings, binary blobs, and the like. The distributed shared memory may apply a number of data transformation rules to the data. In one example, the distributed shared memory may determine a schema for the data object, which identifies one or more object fields and the format of data contained in the object fields. The distributed shared memory may apply the data transformation rules to the data contained in the object fields to convert and prepare the data for storage in the memory device. In operation 1018, the distributed shared memory may write the object data to the representation of the data object at the memory location using an object data section. Continuing the prior example, the distributed shared memory may use the object data section to store the data contained in the object fields associated with the data object in a byte array.

In operation 1020, the distributed shared memory may identify one or more object fields associated with the data object. In one example, the distributed shared memory may identify one or more portions of data associated with the data object to determine one or more object fields and parse the object data into values for the object fields. In another example, the distributed shared memory may detect the schema of the data object and use the schema to identify the object fields and structure of the data object. In operation 1022, the distributed shared memory may write a mapping between an object field and a portion of the data object section that contains the value for the object field using a virtual table. The distributed shared memory may use the virtual table to describe an array of offsets from the start of the object data section. The distributed shared memory may access the memory location in the object data section of the Nth field of a data object by using the offset found in the Nth index of the virtual table.

Figure 11:
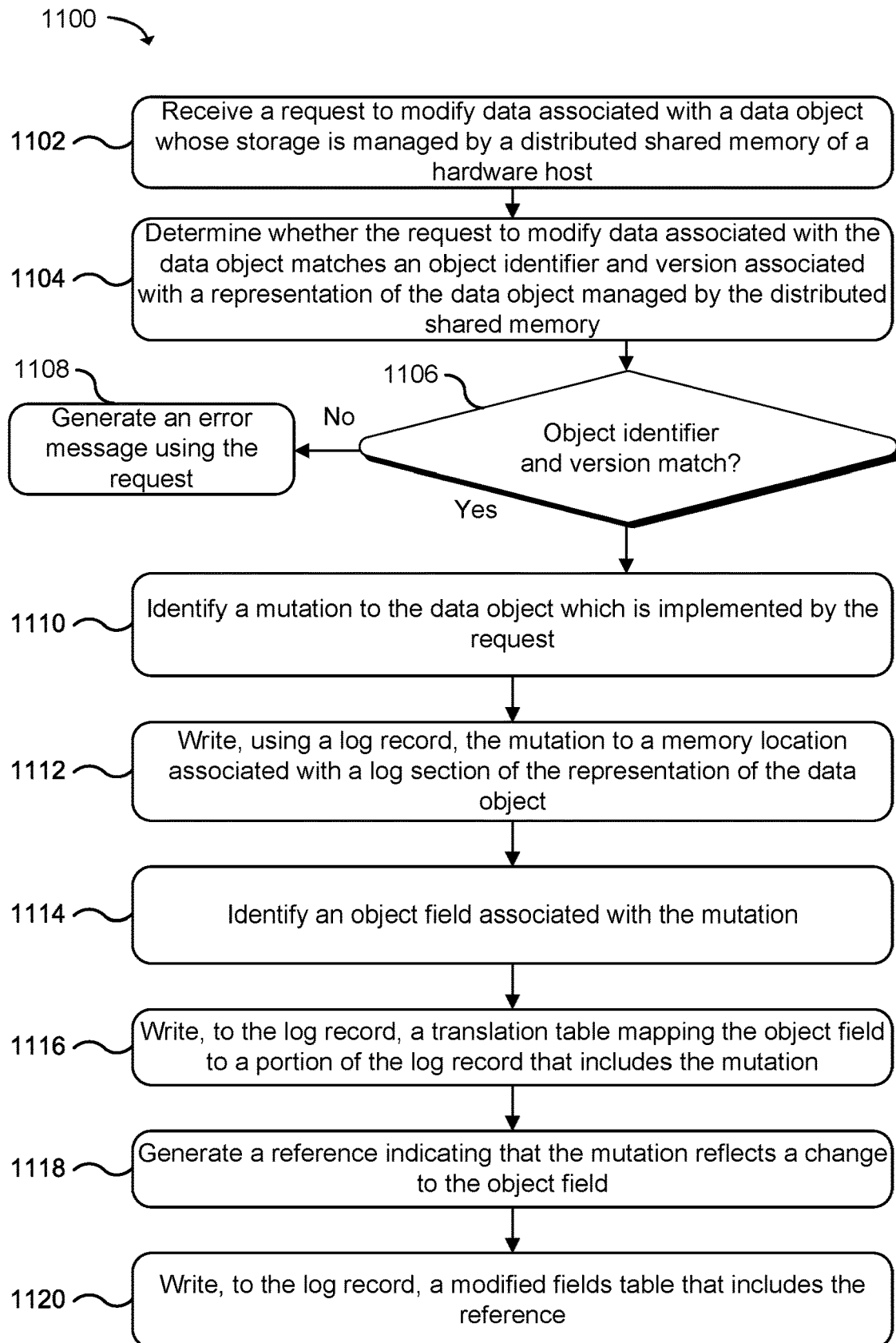
FIG. 11 is a flow diagram that illustrates an example method for capturing changes to data objects in a distributed computing system using an ordered, append-only log-based format to provide versioned snapshots of state according to an example of the present technology.

FIG. 11 is a flow diagram that illustrates an example method 1100 performed by a distributed shared memory for managing the storage of state of data objects in a distributed computing system using an ordered, append-only log-based format to provide versioned snapshots of state according to an example of the present technology. The method 1100 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1102, a distributed shared memory of a hardware host, may receive a request to modify data associated with a data object. The distributed shared memory may receive the request from a processing application configured to process the data object on the hardware host according to an object type of the data object. The distributed shared memory may receive the request in response to the processing application issuing the request via an API used to access data objects whose storage is managed by the distributed shared memory.

In operation 1104, the distributed shared memory may determine whether the request to modify data associated with the data object matches an object identifier and version associated with a representation of the data object whose storage is managed by the distributed shared memory. The distributed shared memory may analyze the request to determine whether the request specifically identifies the data object. The distributed shared memory may further analyze the request to determine whether the request is directed to a version of the data object whose storage is being managed by the distributed shared memory.

If the distributed shared memory determines, in operation 1106, that the request does not match an object identifier and version associated with the representation of the data object, the distributed shared memory may generate an error message using the request in operation 1108. The distributed shared memory may include in the error message details associated with object identifiers and versions referenced by the request. The error message may also include data associated with the processing application, memory contents, stacks, heaps, and other debugging information.

If the distributed shared memory determines, in operation 1106, that the request matches an object identifier and version associated with the representation of the data object, the distributed shared memory may identify a mutation to the data object that is in the request, as in operation 1110. A mutation may include any change to the data object, such as a change in a field identifier, a change in a field value, or any other write to the data object. The distributed shared memory may analyze the request to identify the mutation. The distributed shared memory may interpret the request according to an API used to modify data objects whose storage is managed by the distributed shared memory. In one example, the request may indicate to modify an object field using a supplied value. The distributed shared memory may determine the object field and the supplied value from the request.

In operation 1112, the distributed shared memory may write the mutation to a memory location associated with the representation of the data object using a log record. For example, the distributed shared memory may write the log record to a log section of the representation of the data object whose storage is managed by the distributed shared memory. The distributed shared memory may append the log record to a series of log records in the log section.

In operation 1114, the distributed shared memory may identify an object field associated with the mutation. The distributed shared memory may analyze the request to identify the object field in the request. Using a prior example, the request may indicate one or more object fields to be modified and new corresponding values for the object fields, and the distributed shared memory may track which object fields are being modified. In operation 1116, the distributed shared memory may write, to the log record, a translation table mapping the object field to a portion of the log record that includes the mutation.

In operation 1118, the distributed shared memory may generate a reference indicating that the mutation reflects a change to the object field. The reference may include: a bit, byte, flag, resource identifier, or other data that identifies the object field. In operation 1120, the distributed shared memory may write, to the log record, a modified fields table that includes the reference. As discussed above, the distributed shared memory may use the modified fields table to indicate which portions of the data object have a change in state. For example, the hardware host may set one or more bits of a byte or group of bytes to indicate that object fields corresponding to the bits have changed. Each bit in the byte may be mapped to or associated with an object field in an ordered set of object fields. Setting the bit of a corresponding object field may provide the reference indicating that the mutation reflects a change to the object field. The distributed shared memory may write the byte or group of bytes, with one or more bits set, to the log record as the modified fields table.

According to one example of the present technology, the distributed shared memory may perform the method 1100 with multiple requests to modify data associated with the data object during an epoch or execution interval in the distributed computing system to aggregate or coalesce the requests into a single log record. The distributed shared memory may use the modified fields table to include references for multiple portions of the data object affected by the plurality of requests. The distributed shared memory may append a single log record for the epoch to the log section of the representation of the data object whose storage is managed by the distributed shared memory. According to yet another example of the present technology, the distributed shared memory may aggregate a plurality of requests to modify data associated with the data object during an epoch or execution interval in the distributed computing system when the requests apply to the same portion of the data object. The distributed shared memory may append a single log record for the epoch to the log section of the representation of the data object whose storage is managed by the distributed shared memory. The single log record may include the latest in series of mutations to the data object implemented by the plurality of requests, which is referenced as a single change in the modified fields table.

Figure 12:
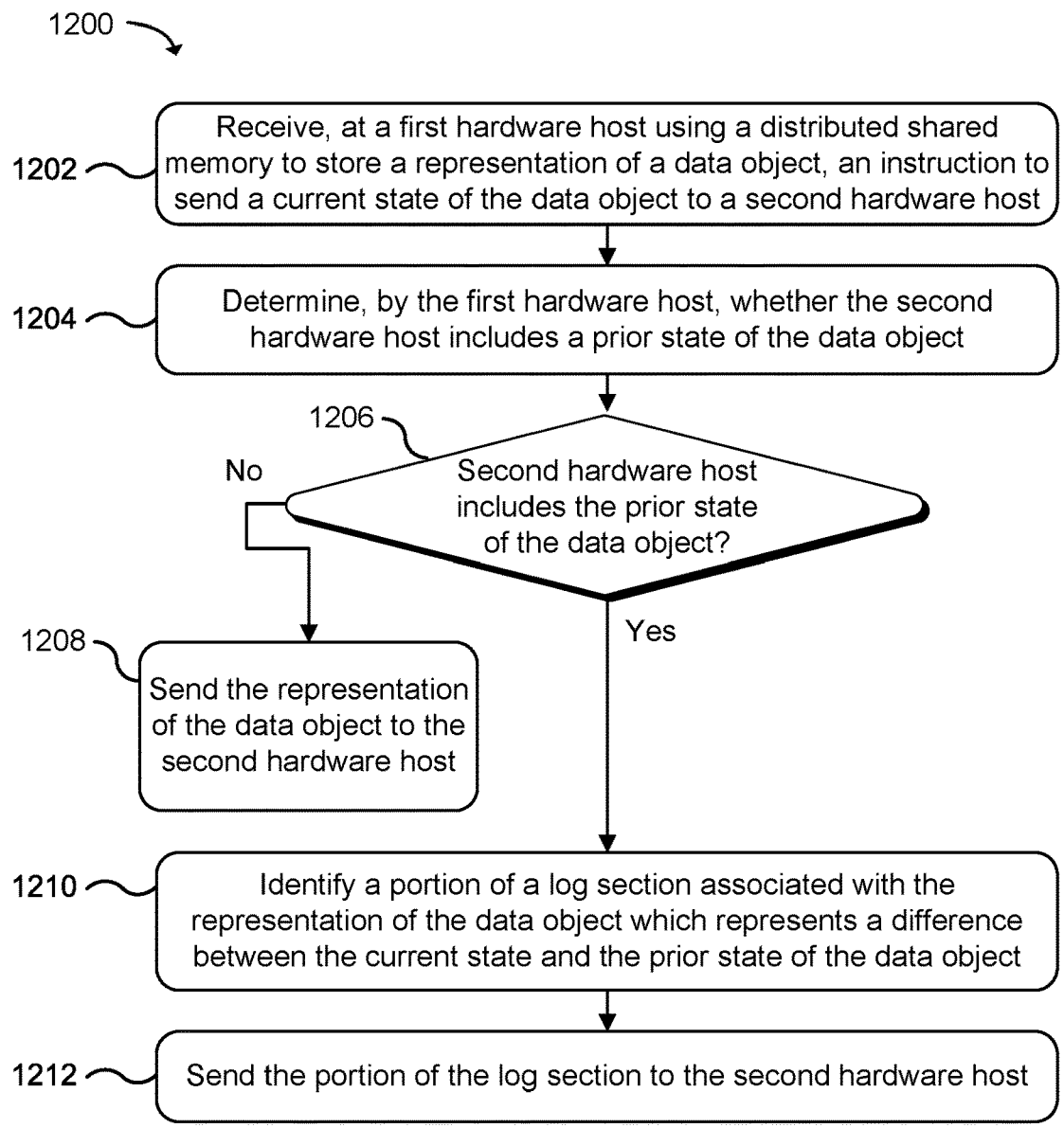
FIG. 12 is a flow diagram that illustrates an example method for exchanging data objects in a distributed computing system between hardware hosts using an ordered, append-only log-based format to provide versioned snapshots of state according to an example of the present technology.

FIG. 12 is a flow diagram that illustrates an example method 1200 performed by a distributed shared memory for exchanging state of data objects in a distributed computing system between hardware hosts according to an example of the present technology. The method 1200 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1202, a first hardware host using a distributed shared memory to store a representation of a data object, may receive an instruction to send a current state of the data object to a second hardware host. The first hardware host may receive the instruction from the second hardware host as a data request. In another example, the first hardware host may receive the instruction in the form of a list of subscribers. The first hardware host may use the list of subscribers to publish changes made to the data object. The list of subscribers may include processing applications on the first hardware host, the second hardware host, and other hardware hosts and services in the distributed computing system. The first hardware host may publish the changes directly to a subscriber or the first hardware host may notify the subscriber that changes are available. The subscriber then may retrieve or request the changes from the first hardware host.

In operation 1204, the first hardware host may determine whether the second hardware host includes a prior state of the data object. For example, the first hardware host may use the distributed shared memory to determine whether data associated with the representation of the data object has previously been sent to or obtained by the second hardware host. The first hardware host may be in communication with the second hardware host to determine whether the second hardware host includes a prior state of the data object. The first hardware host may analyze the instruction for an indication of whether the second hardware host includes a prior state of the data object. In another example, the first hardware host may use the distributed shared memory to track communications sent to the second hardware host indicating whether the second hardware host includes a prior state of the data object.

If the first hardware host determines in operation 1206 that the second hardware host does not include a prior state of the data object, the first hardware host may use the distributed shared memory to send the representation of the data object to the second hardware host in operation 1208. The distributed shared memory of the first hardware host may initiate a memory copy that sends the in-memory representation of the data object to a distributed shared memory of the second hardware host. The distributed shared memory of the first hardware host incurs no serialization costs in sending the in-memory representation of the data object to the distributed shared memory of the second hardware host because the in-memory layout is the same as the storage/wire format according to the present technology. The distributed shared memory of the second hardware host may then load the memory copy directly into a memory device.

If the first hardware host determines in operation 1206 that the second hardware host includes a prior state of the data object, the first hardware host may use the distributed shared memory to identify a portion of a log section associated with the representation of the data object which represents a difference between the current state and the prior state of the data object in operation 1210. The distributed shared memory of the first hardware host may determine that a single log record represents the difference between the current state and the prior state of the data object. In another example, the distributed shared memory of the first hardware host may determine that multiple log records represent the difference between the current state and the prior state of the data object.

In operation 1212, the first hardware host may use the distributed shared memory to send the portion of the log section to the second hardware host. The distributed shared memory of the first hardware host may send a single log record to the second hardware host, which was identified as representing the difference between the current state and the prior state of the data object. In another example, the distributed shared memory of the first hardware host may send multiple log records to the second hardware host, which was identified as representing the difference between the current state and the prior state of the data object.

In yet another example, the distributed shared memory of the first hardware host may merge one or more log records, which are identified as representing the difference between the current state and the prior state of the data object, into a single log record to be sent to the second hardware host. The first hardware host may use the distributed shared memory to send the single log record to the second hardware host to reduce network bandwidth for data transfers.

According to one example of the present technology, the distributed shared memory may use the method 1200 to preserve or archive the current state of the data object in an object data store or in a file. The distributed shared memory may determine to coalesce a plurality of log records that represent the current state into a single log record in order to save storage space or improve later reading times to determine the current state of the data object. The distributed shared memory may write the single log record to the log section to replace the plurality of log records, for example, prior to storage on disk as a file. The single log record may include a plurality of references indicating that a plurality of mutations to the data object aggregated from the plurality of log records reflect changes to a plurality of portions of the data object which represent the current state of the data object.

Figure 13:
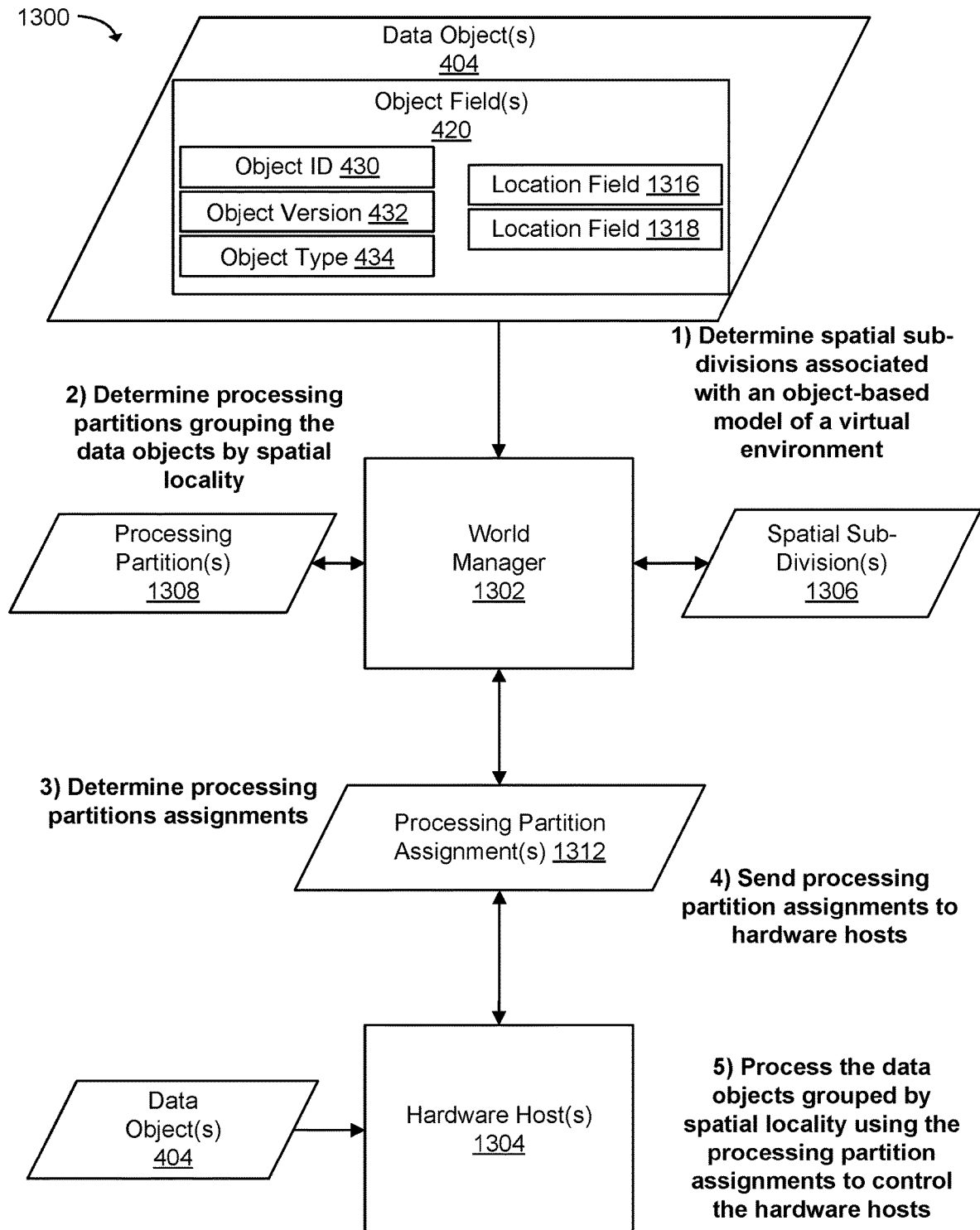
FIG. 13 illustrates a system and related operations for assigning computational units in a distributed computing system using processing partitions with data objects organized by spatial locality according to an example of the present technology.

FIG. 13 illustrates a system 1300 and related operations for assigning computational units in a distributed computing system using processing partitions with data objects organized by spatial locality according to an example of the present technology. The system 1300 may include a world manager 1302 and one or more hardware host(s) 1304. The world manager 1302 may assign the computational units to the hardware host(s) 1304 in the distributed computing system using processing partitions organized by spatial locality according to an example of the present technology.

The world manager 1302 may include one or more server computers configured to manage processing of data objects in the distributed computing system. Some examples of the world manager 1302 may include the cluster manager 130 described with respect to FIG. 1 and the cluster manager module 210 described with respect to FIG. 2. To manage processing, according to one example of the technology, the world manager 1302 may determine one or more spatial sub-division(s) 1306 associated with an object-based model of a virtual environment hosted by the distributed computing system. The spatial sub-division(s) 1306 may include spatial regions that divide a world space into two or more subsets (e.g., disjoint subsets that are non-overlapping). The spatial regions may be arbitrary and/or uniform divisions of the space. The spatial regions may define a spatial unit as square or rectangular, or may define spatial units as: arbitrary points, lines, areas, polytopes (e.g., polygons and polyhedrons), and conic sections such as ellipses, circles, and parabolas. The space may be a 2-dimensional space, a 3-dimensional space, or any multi-dimensional space that may be sub-divided. The spatial sub-division(s) 1306 may be hierarchical, meaning that the space (or a region of the space) may be divided into several spatial regions, and then the spatial regions may be again recursively sub-divided to create additional spatial regions. The spatial sub-division(s) 1306 may also include multiple layers or hierarchies of sub-divisions, which may overlay each other and which may include the different layers or hierarchies providing a different metric, criteria, and granularity for sub-dividing the virtual world.

The spatial sub-division(s) 1306 may be represented using one or more tree structures, for example, as discussed below with respect to FIG. 14. In one example, a world space associated with the virtual environment may be sub-divided using octants and the spatial sub-division(s) 1306 may be represented using an octree, which is a tree structure in which each internal node has eight children. The octree may be used to sub-divide a three-dimensional space associated with the virtual world by recursively subdividing regions into eight octants. In another example, the world space associated with the virtual environment may be sub-divided using quadrants and the spatial sub-division(s) 1306 may be represented using a quadtree, which is a tree structure in which each internal node has four children. The quadtree may be used to partition a two-dimensional space associated with the virtual world by recursively subdividing regions into four quadrants. Other methods may be used to sub-divide the world space associated with the virtual environment and to represent the spatial sub-division(s) 1306 using a data structure in order to provide nodes to represent a particular unit of spatial information and nodes to which data (e.g., data objects) may associated with the particular unit of spatial information. Some additional examples may include: grids, Voronoi diagrams, space filling curves, KD-Trees, bounding volume hierarchies, and the like.

The world manager 1302 may also determine one or more processing partition(s) 1308 associated with the spatial sub-division(s) 1306. For example, the world manager 1302 may create the processing partition(s) 1308 using the spatial sub-division(s) 1306. In one example, a processing partition in the processing partition(s) 1308 may be associated with a single spatial sub-division in the spatial sub-division(s) 1306. In another example, a single processing partition may be associated with multiple spatial sub-divisions in the spatial sub-division(s) 1306. In a further example, multiple processing partitions may be associated with one or more spatial sub-divisions in the spatial sub-division(s) 1306. In addition, multiple processing partitions may be associated with a single spatial sub-division.

The world manager 1302 may determine the processing partition(s) 1308 by mapping the data object(s) 404 to the processing partition(s) 1308 associated with the spatial sub-division(s) 1306. The world manager 1302 may index the data object(s) 404 using spatial location information into the processing partition(s) 1308. In another example, the world manager 1302 may instruct the hardware host(s) 1304 to create the processing partition(s) 1308 using the spatial sub-division(s) 1306. The world manager 1302 may define the world space associated with the virtual environment and instruct the hardware host(s) 1304 to create the processing partition(s) 1308 during processing of the object-based model of the virtual environment. In another example, the hardware host(s) 1304 may be responsible for indexing the data object(s) 404 into the processing partition(s) 1308 using spatial location information. The hardware host(s) 1304 may index the data object(s) 404 upon creation, deletion, and modification of data objects 404 by instances of processing applications on the hardware host(s) 1304. Such operations by the instances of the processing applications may cause additions, deletions, splits, mergers, and other modifications by the hardware host(s) 1304 to the processing partition(s) 1308. The world manager 1302 may monitor the hardware host(s) 1304 to receive additions, deletions, splits, mergers, and other modifications to the processing partition(s) 1308 associated with the spatial sub-division(s) 1306. According to the present technology, the processing partition(s) 1308 may define computational units in the distributed computing system, organized by spatial location information associated with the data object(s) 404, which may be allocated to the hardware host(s) 1304. As discussed previously, the data object(s) 404 may be associated with an object-based model of a virtual environment (e.g., a 3D simulation, 3D game, etc.). The data object(s) 404 may include one or more object field(s) 420. In this example, the data object(s) 404 may include one or more object field(s) 420 to provide the object identifier 430, the object version 432, and the object type 434 as metadata for the data object(s) 404. The object field(s) 420 may further include one or more object properties or attributes defined using field-value or key-value pairs, such as a location field 1316, which may specify a first spatial attribute, and a location field 1318, which may specify a second spatial attribute. The location fields 1316 and 1318 may include: spatial location information, such as a data value, string, an X, Y, Z coordinate, a vector, a boundary, a mesh, a range, etc., which may be referenced by a processing application in order to process the data object(s) 404. Other examples of spatial location information included in the data object(s) 404 may include: position, location, and orientation information associated with points, lines, polytopes (e.g., polygons and polyhedrons), conic sections such as ellipses, circles, parabolas, or other types of data object models.

According to one example of the present technology, the processing partition(s) 1308 may be determined using the object field(s) 420 of the data object(s) 404. As the processing partition(s) 1308 represent groups of data objects organized into computational units to be processed by processing applications, the data object(s) 404 may be organized according to spatial location information in one or more of the object field(s) 420. According to one example of the present technology, this data object management by the world manager 1302 and the hardware host(s) 1304 may include the creation of one or more index structures, known as a spatial index, which map the data object(s) 404 to the processing partition(s) 1308 using spatial location information from the object field(s) 420. The world manager 402 may use the object field(s) 420 to create multiple tiers in the groupings, thereby further organizing the data object(s) 404 by multiple attributes such as object domains as discussed previously.

The processing partition(s) 1308 may be represented by one or more spatial index structures that group the data object(s) 404 at or near spatial units defined by the spatial sub-division(s) 1306 using spatial location information associated with the data object(s) 404. A spatial index element or node may represent a processing partition and include data or metadata identifying the processing partition and a collection or group of data objects organized into the processing partition by a spatial unit (e.g., location or locality) associated with a spatial sub-division. The spatial index representing the processing partition(s) 1308 may include a tree structure representing the spatial sub-division(s) 1306. Nodes of the tree structure representing the spatial sub-division(s) 1306 may map or index the data object(s) 404 to the processing partition(s) 1308 using the spatial location information. The spatial index representing the processing partition(s) 1308 may also contain metadata information about related areas of the spatial sub-division(s) 1306, such as parents, neighbors (special siblings), children, level, and the like.

The world manager 402 may use the processing partition(s) 1308 to determine one or more processing partition assignment(s) 1312. The processing partition assignment(s) 1312 allocate the processing partition(s) 1308 to the hardware host(s) 1304. The processing partition assignment(s) 1312 may be represented by a data structure, such as a list, index, tree, etc. that identifies a hardware host in the hardware host(s) 1304 and the processing partition(s) 1308 assigned to the hardware host. The processing partition assignment(s) 1312 may be made based on a number of spatial sub-divisions in the spatial sub-division(s) 1306, the object type of the data object(s) 404 at a given locality, an application instance that can process the object type, spatial relationships (e.g., between the spatial sub-division(s) 1306 or between the data object(s) 404, data dependencies between the data object(s) 404, and metrics associated with the hardware host(s) 1304, such as the processing load on hardware or software resources (e.g., to avoid overloading, etc.).

The world manager 1302 may send the processing partition assignment(s) 1312 to the hardware host(s) 1304. In one example, the world manager 1302 may send the processing partition assignment(s) 1312 directly to the hardware host(s) 1304. In another example, the world manager 1302 may notify the hardware host(s) 1304 of the processing partition assignment(s) 1312 and the hardware host(s) 1304 may retrieve the processing partition assignment(s) 1312 from another source. The hardware host(s) 1304 may then process the data object(s) 404 using the processing partition assignment(s) 1312. Examples of processing may include: data object movements, data object deletions, data object insertions, data object collisions, rendering, explosions, physics simulations, in-world credit transactions, or other types of processing. The hardware host(s) 1304 may use the processing partition assignment(s) 1312 to identify allocations of the processing partition(s) 1308. The world manager 1302 may send the processing partition(s) 1308 to the hardware host(s) 1304 with the processing partition assignment(s) 1312. In another example, the hardware host(s) 1304 may retrieve allocations of the processing partition(s) 1308 from another source.

Figure 14:
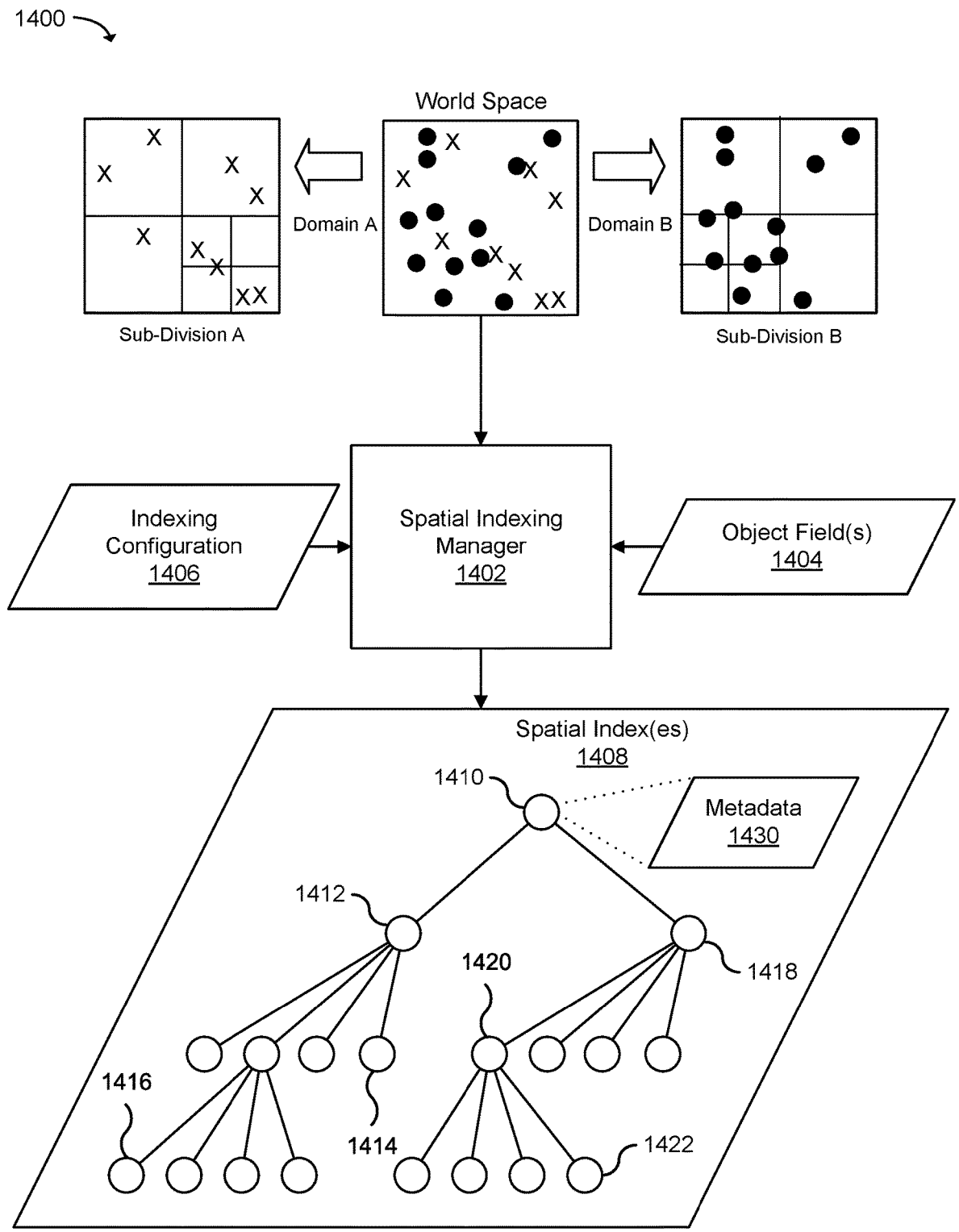
FIG. 14 illustrates a graphical example of creating and assigning processing partitions to hardware hosts in a distributed computing system using spatial location information associated with data objects according to an example of the present technology.

FIG. 14 illustrates a graphical example of organizing computational units to assign to hardware hosts in a distributed computing system 1400 using spatial location information associated with data objects according to an example of the present technology. FIG. 14 illustrates the separation of a world space into more than one group or processing partition, first using object domains (e.g., "Domain A" and "Domain B") as discussed above and then using spatial indexing. If the world space of a virtual environment hosted by the distributed computing system includes the two domains, each of which can have a large number of data objects densely packed into different spaces, the computational units of the two domains may be in different states, as depicted. Accordingly, FIG. 14 illustrates the further separation of the world space into more than one group or processing partition, using a plurality of spatial sub-divisions (e.g., "Sub-Division A" and "Sub-Division B").

The distributed computing system 1400 may include a spatial indexing manager 1402, which may include one or more server computers configured to index data objects in a virtual world hosted by the distributed computing system 1400 into computational units or processing partitions using spatial location information. Some examples of the spatial indexing manager 1402 may include the world manager 1302 and the hardware host(s) 1304 described with respect to FIG. 13. The spatial indexing manager 1402 may determine a plurality of processing partitions associated with the plurality of spatial sub-divisions of the domains of Sub-Division A and Sub-Division B. For example, the spatial indexing manager 1402 may use one or more object field(s) 1404 and an indexing configuration 1406 (as described later) to initially create and manage one or more spatial index(es) 1408.

The spatial indexing manager 1402 may analyze spatial location information associated with the object field(s) 1404 to determine collections of data objects that may be organized into processing partitions by position, proximity, size, shape, spatial relationships, spatial dependencies, spatial causalities, and the like. For example, the spatial indexing manager 1402 may analyze the spatial location information to determine whether a data object can be grouped into a processing partition by position or location. In another example, data objects that are near to each other or are approximately at the same position or location may be grouped into the same processing partition. The spatial indexing manager 1402 may further analyze the spatial location information to determine whether a spatial relationship exists for a data object. For example, a first data object may have a spatial relationship to a second data object by being positioned near the second data object. In another example, the first data object and the second data object may have a spatial relationship with a bounding box by being positioned within a plane or volume associated with the bounding box. The spatial indexing manager 1402 may determine whether some of the data objects satisfy spatial causality by being within a predefined distance of each other. Other examples may include the data objects satisfying a spatial relationship with a gravitational or electromagnetic field, located within a defined geometry, positioned on a defined topology, approaching or intersecting with a set of vertices and edges describing a polygon, mesh, collision box, or other shape, a range, a camera view, and the like.

The spatial indexing manager 1402 may use the indexing configuration 1406 to determine how to represent the processing partitions associated with the spatial index(es) 1408. The spatial indexing manager 1402 may determine a capacity of a processing partition using a number of data objects that may be allocated to the processing partition. The indexing configuration 1406 may specify a number of data objects that may be indexed by the spatial index(es) 1408. The number of data objects that may indexed by the spatial index(es) 1408 may be determined based on the configurations of processing applications and a capacity of the processing applications to process a number of data objects. The number of data objects that may indexed by the spatial index(es) 1408 may also be determined based on a configuration of a virtual world, which may define whether there is a one-to-one, one-to-many, and many-to-one correspondence between processing partitions and the spatial index(es) 1408, the structure of the spatial index(es) 1408, one or more functions used to index the data object(s) 404, the configurations of the hardware and software resources, the number of hardware hosts in the distributed computing systems, and the like. The indexing configuration 1406 may further include index specific configurations that are set as part of a world definition (e.g., to use an octree with a max level and a predefined range).

In this example, the spatial indexing manager 1402 creates, updates, and manages the spatial index(es) 1408 using the object field(s) 1404 and the indexing configuration 1406. As the processing partition represents groups of data objects organized into computational units to be processed by processing applications, the spatial indexing manager 1402 may organize the data objects according to spatial location information in the object field(s) 1404. The spatial indexing manager 1402 may create the spatial index(es) 1408 to map collections of the data objects to the processing partition by spatial location information using the object field(s) 1404. As shown, the spatial index(es) 1408 may use the object field(s) 1404 to create multiple tiers in the groupings, thereby further organizing the data object by multiple attributes such as object domain and spatial locality.

The spatial index(es) 1408 may be represented by a tree structure having nodes 1410, 1412, 1414, 1416, 1418, 1420, and 1422. In this example, the node 1410 may represent a root node and the nodes 1412, 1414, 1416, 1418, 1420, and 1422 may represent child nodes. The root node 1410 may include metadata 1430 that provides information associated with a processing partition represented by the root node 1430 and a collection of the data object(s) 404 organized into the processing partition. Metadata 1430 may also include information about related areas of the spatial index(es) 1408, such as parent nodes, neighbor nodes (special siblings), child nodes, and the like. The metadata 1430 may identify indexing tiers and a first tier used in sub-dividing a space. For example, the metadata 1430 may specify that the first tier for partitioning the world space is the object type and the second tier is the spatial locality. The children nodes 1412, 1414, 1416, 1418, 1420, and 1422 may also include similar metadata (not shown).

As data objects spawn in the world space, the spatial indexing manager 1402 may be responsible for indexing data objects into processing partitions using the spatial index(es) 1408. At initialization of the world space, the spatial indexing manager 1402 may allocate a single node in the spatial index(es) 1408 for a data object based on an object type or spatial sub-division. The spatial indexing manager 1402 may receive an instruction to index a data object, and once positioned within the world space, the spatial indexing manager 1402 may map the data object to a processing partition by reading the object field(s) 1404 and by adding metadata associated with the data object to a node in the spatial index(es) 1408, which is associated with the processing partition. The spatial indexing manager 1402 may maintain an atomic reference to a working copy of the spatial index(es) 1408 and only the spatial indexing manager 1402 can access the working copy. The spatial indexing manager 1402 may index the data object using the working copy and then flip the atomic reference to the spatial index(es) 1408 so other threads (such as a world manager or application manager) can access a current state of the processing partitions.

To determine where to add the data object to the spatial index(es) 1408, the spatial indexing manager 1402 may use a hash code octree implementation to calculate the location of the data object using a normalized range. The spatial indexing manager 1402 may compute a hash for data objects by normalizing spatial location information associated with the data object to the normalized range. The computed hash may identify the node in the spatial index(es) 1408 that corresponds to a spatial sub-division of the world space that encompasses the location of the data object. For example, the spatial indexing manager 1402 may normalize positional dimensions associated with the data object to a floating-point number from 0 to 1. The spatial indexing manager 1402 may then multiply the normalized positions by 2 to a power associated with a number of levels specified for the octree. The spatial indexing manager 1402 may effectively hash the data object into the deepest possible level of the spatial index(es) 1408. The spatial indexing manager 1402 may then use the calculated hash to traverse the spatial index(es) 1408 from the root node 1410 in order to find an internal or child node that encloses the data object. During traversal, the spatial indexing manager 1402 may compare a hash bit or hash bits matching the "next" level to the children of the current node. The spatial indexing manager 1402 may use the hash to determine the index of the next child in the array of children.

During the lifecycle of the data object in the world space, requests to modify data associated with the data object may be issued from instances of processing applications associated with the object type of the data object. The spatial indexing manager 1402 may re-index the data object into the spatial index(es) 1408 using mutations to the data object caused by the requests. For example, during re-indexing, the spatial indexing manager 1402 may determine to update the map between the data object and a processing partition in response to the requests to modify data. The spatial indexing manager 1402 may also determine to update the mapping in response to an instruction from a world manager or another process to re-index the data object. The spatial indexing manager 1402 may re-index the data object using mutations to the data object caused by the requests and update the metadata associated with the data object in the spatial index(es) 1408. Re-indexing may occur when the ownership of a data object is transferred from a first hardware host to a second hardware host. In this case, the spatial indexing manager 1402 may take ownership of the data object and update metadata associated with the data object in the spatial index(es) 1408.

The spatial indexing manager 1402 may also use spatial location information associated with the data object to determine whether to change or maintain the mapping between the data object and the processing partition. The spatial indexing manager 1402 may re-index the data object by adding metadata associated with the data object at a different node in the spatial index(es) 1408, for example, because movement of the data object reflected in the spatial location information causes the data object to be at a position associated with a different spatial sub-division of the world space. The spatial indexing manager 1402 may also re-index the data object to remove the metadata associated with the data object from a node in the spatial index(es) 1408 because the data object is no longer located in the world space (e.g., from de-spawning or being destroyed).

After re-indexing, the spatial indexing manager 1402 may also determine whether to split or merge nodes in the spatial index(es) 1408. The spatial indexing manager 1402 may determine to split a first node into a second node and a third node when a number of data objects mapped into a first processing partition represented by the first node approaches, meets, or exceeds a first defined threshold. The first defined threshold may be determined as a first percentage of the capacity of a processing application to process a number of data objects (e.g., 60%). The spatial indexing manager 1402 may determine to merge a first node and a second node to create a third node when a number of data object mapped into a first and second processing partitions represented by the first and second nodes approaches, meets, or falls blow a second defined threshold. The second defined threshold may be determined as a second percentage of the capacity of a processing application to process a number of data objects (e.g., 10%).

The spatial indexing manager 1402 may read the spatial index(es) 1408 and perform any splits or merges as needed. In one example, the spatial indexing manager 1402 may split and add nodes to the spatial index(es) 1408 (or update metadata of existing nodes to reflect a split) when the first defined threshold, determined as a first percentage of the capacity of a processing application to process a number of data objects (e.g., 60%), is met or exceeded. For example, the world space region associated with the child node 1412 may be sub-divided into four sub-divided regions, which may be associated with the child node 1414 and three siblings. The spatial indexing manager 1402 may allocate some of the data objects indexed by the child node 1412 across one or more of the child nodes 1414 and three siblings, or combinations thereof, when the first threshold is met or exceeded. The spatial indexing manager 1402 may use spatial location information associated with the data objects, which positions the data objects into corresponding sub-divided regions, to index the data objects into the child node 1414 and three siblings.

In some cases, data objects outside of the normalized range that hashes into child nodes of the spatial index(es) 1408 may be mapped to the root node 1410. If there are too many data objects at the root node 1410, an "upwards" split may be performed. An additional node may be added to spatial index(es) 1408 as siblings of the root node 1408 representing an additional quadrant or octant that expands the world space. Each additional quadrant or octant added on the side of the root node 1410 may be considered for the upward split to become the new root node. Alternatively, a completely new root node may be created. To determine a place to expand upwards, data objects at the root 1410 may be classified into super-regions encompassing the existing world space. Using, for example four super-regions, the best super-region to use for expansion upwards may be determined by which split removes the most objects from the root node 1410 and keeps the size of the nodes below the limit. Because of the nature of this change, the object hashes may be recalculated by adding bits to represent the expanded space to the current object hashes. For range changes that are powers of 2 (doubling, quadrupling), the conversion can be done on existing location hashes by bit shifting each dimension. An actual range change may also be performed by re-hashing all the data objects and re-creating the spatial index(es) 1408. A "shadow" octree may be created by the spatial indexing manager 1402 and then published when complete.

If there are too many objects in a node approaching the bottom of a tree, a level addition may be performed. The level addition may include adding a bit to the end of data object hashes. The level addition may occur when a node is created within two levels of the bottom.

In another example, the spatial indexing manager 1402 may merge and remove nodes from the spatial index(es) 1408 (or update metadata of existing nodes to reflect a merge) when the second defined threshold, determined as a second percentage of the capacity of a processing application to process a number of data objects (e.g., 10%), is met or exceeded. For example, the four sub-divided regions that include a world space region associated with the child node 1422 and three siblings may be merged into a world space region associated with the child node 1420. Any child nodes associated with the child node 1422 may also be merged into the world space region associated with the child node 1420. The spatial indexing manager 1402 may combine the data objects indexed by one or more of the child nodes 1422, the three siblings, and any children of the child node 1422 and the three siblings, or combinations thereof, with the child node 1420. To merge nodes together, the spatial indexing manager 1402 may take ownership of a child node 1420 in an Nth level, the child node 1422 in an N+1 level, and the three siblings to the child node 1420 in N+1 level. If the total number of data objects indexed by the child node 1422 and the three siblings approaches a lower threshold or minimum number of data objects, the spatial indexing manager 1402 may merge the child node 1422 at the Nth level and the three siblings at the N+1 level into the node 1420. The spatial indexing manager 1402 may then delete the child node 1422 and the three siblings.

Figure 15A:
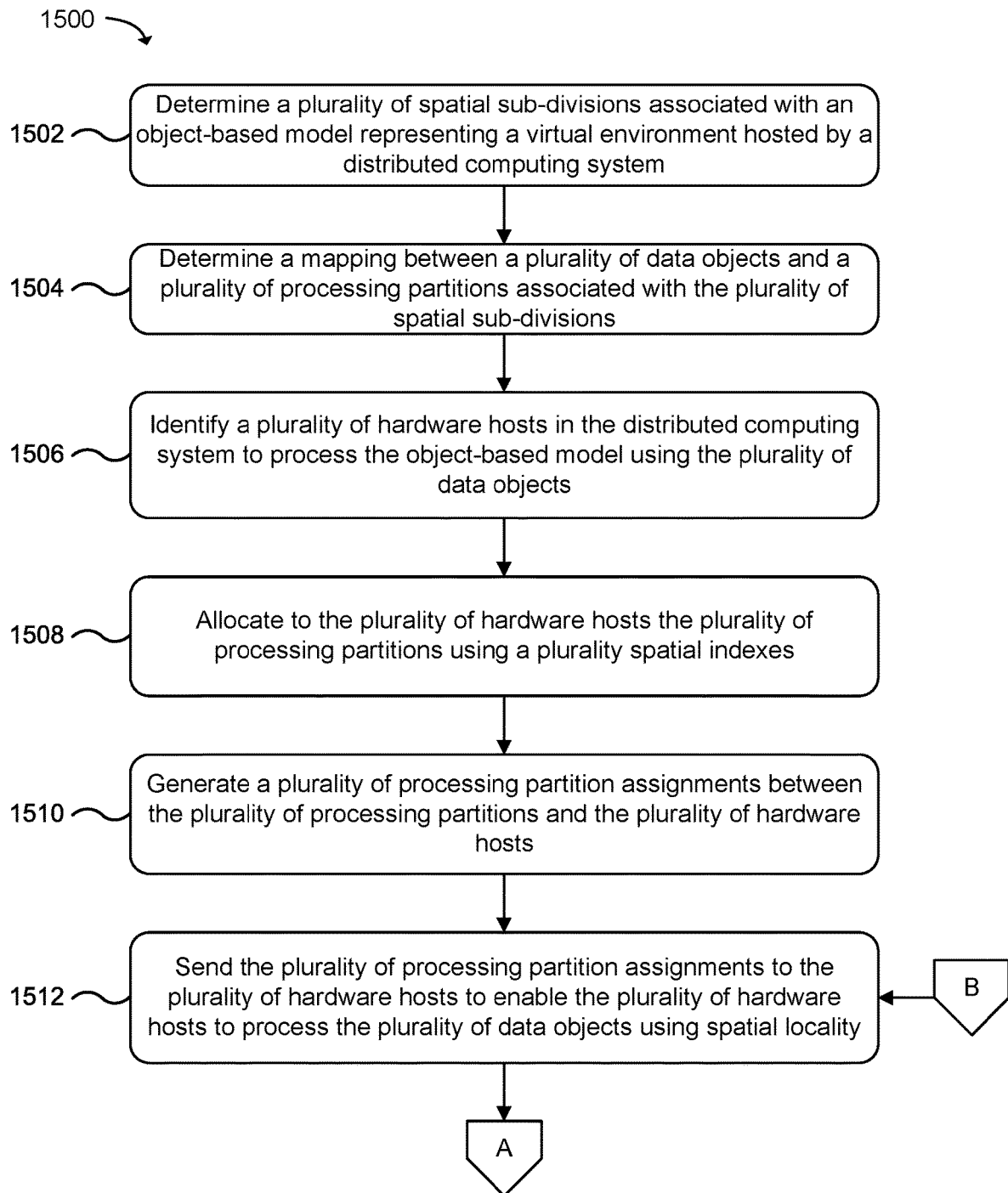
FIGS. 15A-15B are flow diagrams that illustrate example methods for managing hardware hosts in a distributed computing system using processing partitions organized by spatial location information associated with data objects according to examples of the present technology.
Figure 15B:
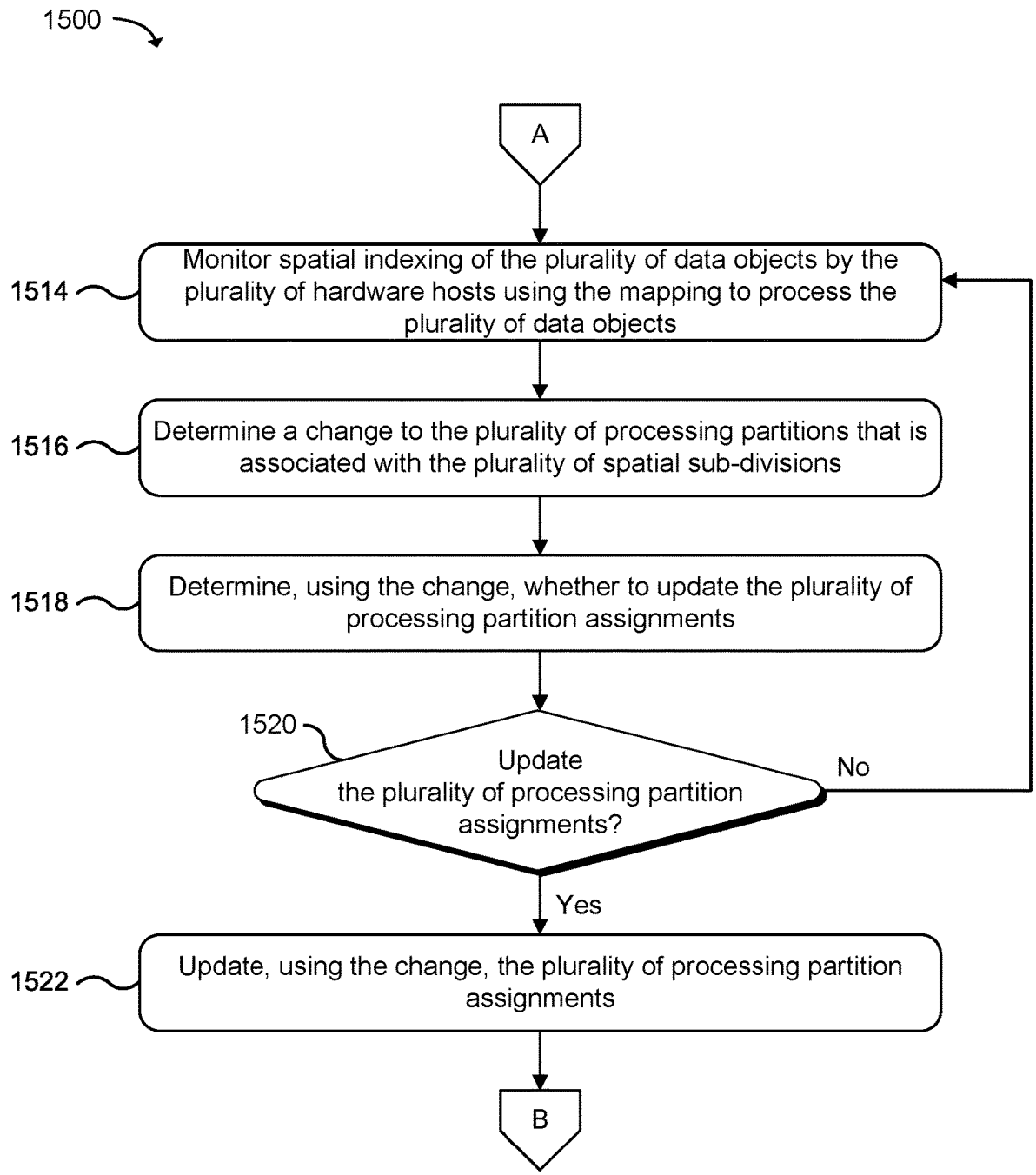

FIGS. 15A-15B are flow diagrams that illustrate an example method 1500 for managing hardware hosts in a distributed computing system using processing partitions organized by spatial location information associated with data objects according to examples of the present technology. The method 1500 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1502, a world manager may determine a plurality of spatial sub-divisions associated with an object-based model representing a virtual environment hosted by a distributed computing system. The world manager may determine the plurality of spatial sub-divisions using a configuration associated with the object-based model representing the virtual environment. The world manager may parse the configuration to determine a size of a world space associated with the virtual environment, a data structure to use to represent the plurality of spatial sub-divisions (e.g., an octree or quadtree), a configuration of the data structure (e.g., a number of levels, a number of nodes within a level, and a size of each node in terms of a minimum or maximum number of data objects that may be indexed by a node).

The world manager may also determine the plurality of spatial sub-divisions using configurations associated with processing applications that process the data objects in the object-based model. The world manager may read the configurations to determine a plurality of object types associated with the data objects processed by the processing applications, application resources used by the processing applications, the type of the data structures that the processing applications use to access the data objects, a minimum and maximum number of data objects that may be processed by the processing application(s), subscription types which specify what additional object types are subscribed to in order to process the data objects, and a subscription strategy for obtaining the additional data. The subscription strategy may identify what additional data object types are used during processing and at what source locations the additional object types may be located.

The subscription strategy of processing applications may be used to determine what additional data objects to synchronize to the hardware hosts on which processing instances of the processing applications are located. In one example, the subscription strategy may specify for a processing application to subscribe to the neighbor nodes in the data structure (e.g., index) that is used to reference the data objects. Using the data structure, a hardware host may find the neighbors of a node into which data objects being processed by the processing application are indexed (e.g., using spatial location information) and the hardware host may subscribe the processing application to the data from those neighbor nodes. In another example, the subscription strategy may specify object tracking, which identifies a data object, and subscribes to the data from the node into which the data object is indexed, the node's neighbors, parents, children, and the like.

The subscription strategy can be used to start subscriptions to data objects from different hardware hosts in the distributed computing system. For example, the processing application may be instantiated on a first hardware host and the neighbor nodes may be allocated to a second hardware host. The first and second hardware hosts may communicate to share changes in state to the data objects indexed into the neighbor nodes. For example, the first hardware host may identify the neighbor nodes as being allocated to the second hardware hosts using processing partition assignments. The first hardware host may send an instruction, message, subscription request, etc. to the second hardware host to subscribe and obtain data associated with data objects mapped to the neighbor nodes (e.g. for dependencies between the first hardware host and second hardware host). The second hardware host may add the first hardware host to a list of subscribers to receive data associated with data object mapped into the neighbor nodes. The second hardware host may determine a change to the data objects mapped to the neighbor nodes and send all or part of the data associated with data object mapped to the neighbor nodes to the first hardware host.

In another example, a processing application may issue a subscription for data associated with all players near an enemy, for use by AI to control enemy units. This may also be useful for processing applications or clients that perform rendering. Additionally, the subscription strategy may specify a maximum latency that application instances can tolerate for obtaining the additional object types from the specified sources.

Referring again to FIG. 15A, the world manager may establish the plurality of spatial sub-divisions as spatial regions that divide a space into two or more subsets. The plurality of spatial sub-divisions may be hierarchical, meaning that the space (or a region of the space) may be divided into several spatial regions, and then the spatial regions may be again recursively sub-divided to create additional spatial regions. The plurality of spatial sub-divisions may also include multiple layers or hierarchies of sub-divisions, which may overlay each other and which may include the different layers or hierarchies providing a different metric, criteria, and granularity for sub-dividing the virtual world.

As discussed above, the plurality of spatial sub-divisions may be represented using one or more tree structures, for example, as discussed above with respect to FIG. 14. A world space associated with the virtual environment hosted by the distributed computing system may be sub-divided using octants and the plurality of spatial sub-divisions may be represented using an octree to sub-divide a three-dimensional space associated with the virtual world. In another example, the virtual world may be sub-divided using quadrants and the plurality of spatial sub-divisions may be represented using a quadtree to partition a two-dimensional space associated with the virtual world. Other methods may be used to sub-divide the virtual world and to represent the plurality of spatial sub-divisions using a data structure in order to provide nodes to represent a particular unit of spatial information and to which data may associated with the particular unit of spatial information.

In operation 1504, the world manager may determine a mapping between a plurality of data objects and a plurality of processing partitions associated with the plurality of spatial sub-divisions. For example, the world manager may initialize a spatial index using an octree associated with the plurality of spatial sub-divisions. The world manager may represent a processing partition with a node in the octree in order to associate the processing partition with a single spatial sub-division in the plurality of spatial sub-divisions. The world manager may also represent multiple processing partitions with a single node in the octree and associate a plurality of processing partitions with a single spatial sub-division. Furthermore, the world manager may represent a processing partition with multiple nodes in the octree and associate a single processing partition with a plurality of spatial sub-divisions.

In operation 1506, the world manager may identify a plurality of hardware hosts in the distributed computing system to process the object-based model using the plurality of data objects. The world manager may identify hardware hosts from a pool of hardware hosts waiting for assignments, or the world manager may identify active hardware hosts that have spare computing capacity, and the like. The active hardware hosts may be executing application instances in a container or in a computing instance that may operate on the processing partitions. In operation 1508, the world manager may allocate the plurality of processing partitions to the plurality of hardware hosts using a plurality of spatial indexes. More specifically, the world manager may assign one or more spatial indexes to a hardware host. The world manager may also assign one or more hardware hosts to a spatial index. The world manager may allocate a processing partition to a hardware host based on: spare computing capacity, the hardware host having specialized hardware (e.g., a GPU), load balancing, collocating data, and the like.

In operation 1510, the world manager may generate a plurality of processing partition assignments between the plurality of processing partitions and the plurality of hardware hosts. This means that processing partitions may be allocated to a hardware host that has an application instance for an application that can process the type of data objects mapped to the processing partitions and organized using spatial locality. For example, the world manager may assign a spatial index to a hardware host having a physics app that modifies data objects using: physics simulations, a collision detection app that determines collisions between data objects, a rendering app that renders the data objects into one or more images or videos, and the like. In operation 1512, the world manager may send the plurality of processing partition assignments to the plurality of hardware hosts to organize the plurality of hardware hosts to process the plurality of data objects using spatial locality.

The method 1500 continues using reference "A" from FIG. 15A onto FIG. 15B. In operation 1514, the world manager may monitor spatial indexing of the plurality of data objects by the plurality of hardware hosts using the mapping to process the plurality of data objects. The world manager may monitor the plurality of hardware hosts to track object changes, to determine whether changes occur to the plurality of processing partitions, and the determine metrics associated with the hardware hosts. A data object may be modified as a result of processing by a processing application, which may change the spatial location information associated with the data object. A processing partition may also be modified as a result of changes in the spatial location information due to the processing of the data object by the processing applications. Changes in spatial location information may introduce re-indexing of data objects by the hardware hosts. Changes in spatial location information may also cause the splitting or merging of processing partitions.

In operation 1516, the world manager may determine a change to the plurality of processing partitions that is associated with the plurality of spatial sub-divisions. An update to a processing partition with the change may include mapping a newly created data object to the processing partition, modifying a data object mapped to the processing partition, or removing the mapping between a data object and the processing partition. An update to a processing partition with the change may include splitting a first processing partition into a second processing partition and a third processing partition, which allocates the data objects indexed into the first processing partition to the second and third processing partitions. In another example, an update to a processing partition with the change may include merging a first processing partition and a second processing partition into a third processing partition, which allocates the data objects indexed into the first and second processing partitions to the third processing partition.

In operation 1518, the world manager may determine, using the change, whether to update the plurality of processing partition assignments. The world manager may determine to update the plurality of processing partitions to manage or optimize performance of the hardware hosts. The world manager may load balance processing of data objects across the plurality of hardware hosts. In addition, the world manager may redistribute processing partitions due to changes to the data objects or the hardware hosts. If the world manager determines, using the change, not to update the plurality of processing partition assignments in step 1520, the method 1500 continues in operation 1514 where the world manager returns to monitoring the plurality of hardware hosts.

If the world manager determines, using the change, to update the plurality of processing partition assignments in step 1520, the method 1500 continues in operation 1522 where the world manager updates the plurality of processing partitions using updates from the hardware hosts. The world manager may update the plurality of processing partitions, for example, to change a processing partition assignment of a first hardware host and allocate spatial indexes owned by the first hardware host to a second hardware host. The world manager may thereby migrate the processing partition from the first hardware host to the second hardware host. The method 1500 continues using reference "B" from FIG. 15B and returns back to FIG. 15A where in operation 1512 the world manager may send the plurality of processing partition assignments to the plurality of hardware hosts.

Figure 16:
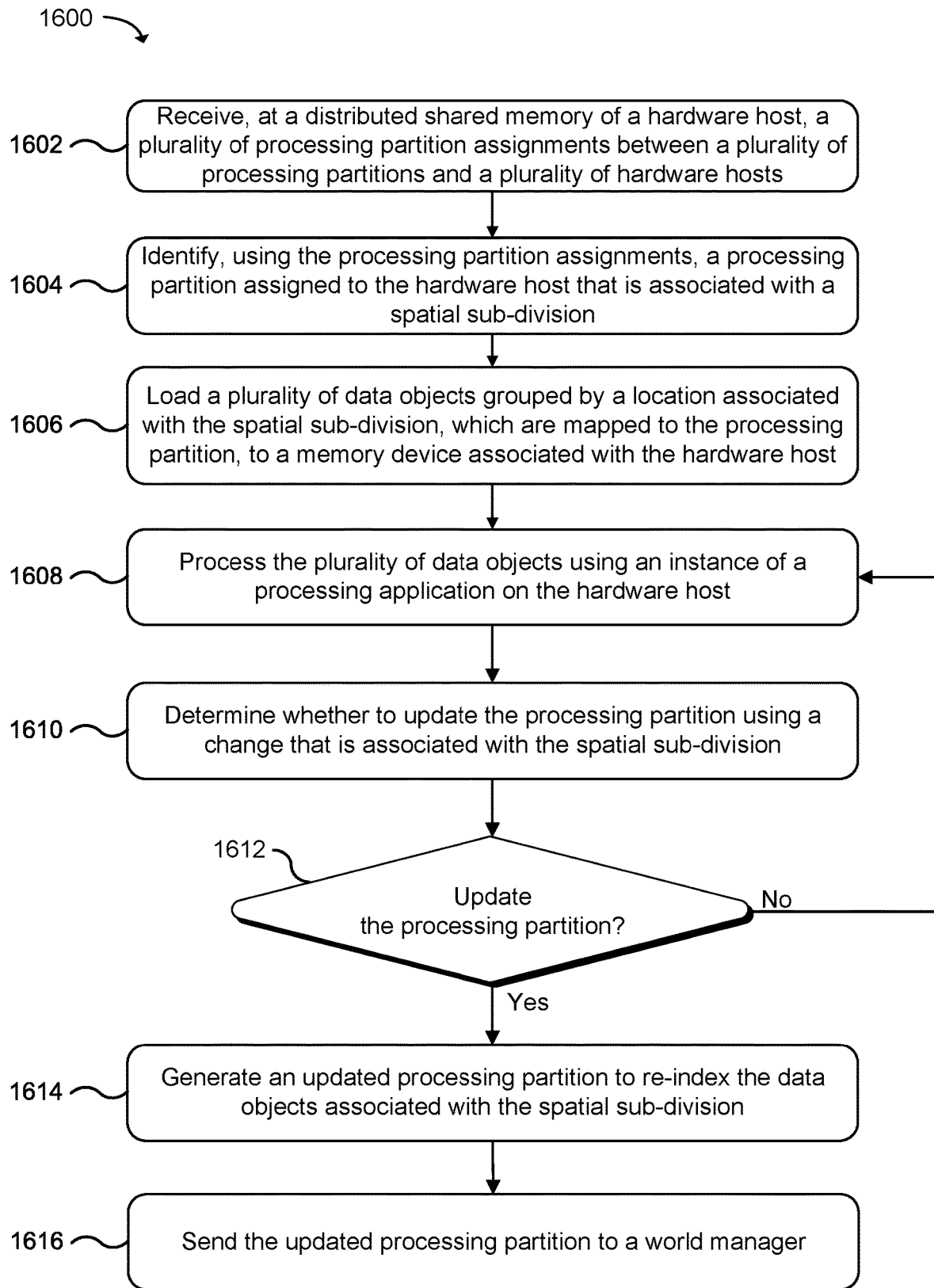
FIG. 16 is a flow diagram that illustrates an example method for processing data objects assigned to a hardware host using processing partitions organized by spatial location information associated with the data objects according to examples of the present technology.

FIG. 16 is a flow diagram that illustrates an example method 1600 for processing data objects assigned to a hardware host using processing partitions organized by spatial location information associated with the data objects according to examples of the present technology. The method 1600 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1602, a distributed shared memory associated with a hardware host in a distributed computing system may receive a plurality of processing partition assignments representing assignments between a plurality of processing partitions and a plurality of hardware hosts. The distributed shared memory may receive the plurality of processing partition assignments from a cluster or world manager associated with the distributed computing system. The plurality of processing partition assignments may identify the plurality of hardware hosts in the distributed computing system and nodes of a tree structure assigned to the plurality of hardware hosts. A node may include a spatial index structure that represents a set of data objects grouped or indexed by spatial location information. The set of data objects may additionally be organized by object type. Therefore, the node may represent a collection of data objects of the same object type and that satisfy a spatial dependency.

In operation 1604, the distributed shared memory may identify, using the plurality of processing partition assignments, a processing partition assigned to the hardware host that is associated with a spatial sub-division. The distributed shared memory may analyze a list providing the plurality of processing partition assignments between the plurality of hardware hosts and the plurality of processing partitions to find allocations to the hardware host. The hardware host may filter the list to identify the processing partitions assigned to the hardware host.

In operation 1606, the distributed shared memory may load a plurality of data objects grouped by a location associated with the spatial sub-division, which are mapped to the processing partition, to a memory device associated with the hardware host. For example, the distributed shared memory may read a node of the tree structure corresponding to the processing partition to obtain metadata about the data objects mapped to the processing partition. The distributed shared memory may retrieve the data objects from a file, an object data store, across a network, from another distributed shared memory, and the like.

In operation 1608, the hardware host may process the plurality of data objects using an instance of a processing application on the hardware host. The hardware host may determine an object type of the data objects to identify a processing application configured to execute code on data objects of the object type. The hardware host may also determine locations of the data objects to identify a processing application configured to execute code on data objects according to location. The hardware host may create an instance of the processing application as a containerized app to process the data objects.

In operation 1610, the hardware host may determine whether to update the processing partition using a change associated with the spatial sub-division. The hardware host may determine to update the processing partition in response to the processing of the data objects in operation 1608, which causes changes in the spatial location information associated with the data objects. For example, the processing application may create a new data object located within the virtual environment, move a data object, change data associated with an existing data object, and remove a data object from the virtual environment. Creation, deletion, and update operations may add or remove the spatial dependencies between the data objects used to organize the data objects into the processing partition.

In a specific example, a new data object may be created at the given location and trigger a spatial dependency with one or more of the data objects. The hardware host may determine to update the processing partition to add the new data object to the processing partition because the data object satisfies the spatial dependency. In another example, new data objects introduced to the given location which trigger the spatial dependency may cause the number of data objects to be handled by the processing application to increase and approach a set upper threshold value. As the number of data objects to be handled by the processing application approaches the threshold value, the hardware host may determine to split a first processing partition into two processing partitions, thereby allocating some of the data objects to remain mapped to the first processing partition and allocating some of the data objects to be mapped to a new second processing partition. The hardware host may also create a second instance of the processing application to handle the data objects mapped to the second processing partition.

In a further example, some of the data objects may move during processing to a different location than the remaining data objects and remove a spatial dependency with the rest of the data objects. In yet another example, some of the data objects may be destroyed in the virtual during processing. The hardware host may determine to update the processing partition to remove the data objects from the processing partition that no longer satisfy the spatial dependency or that no longer exist in the virtual environment. The removal of data objects from the given location may cause the number of data objects to be handled by the processing application to decrease. As discussed above, the number of data objects handled by the processing application may approach or exceed a defined threshold value. As the number of data objects handled by the processing application approaches the defined threshold value, the hardware host may determine to merge a first processing partition with a second processing partition, thereby combining the data objects mapped to the second processing position with the data objects mapped to the first processing partition.

Returning to FIG. 16, if the hardware host determines not to update the processing partition in operation 1612, the hardware host may continue to process the plurality of data objects using the instance of the processing application in operation 1608. If the hardware host determines to update the processing partition in operation 1612, the hardware host may generate an updated processing partition to re-index the data objects associated with the spatial sub-division, in operation 1614. As discussed above, creation, deletion, and update operations may add or remove the spatial dependencies used to organize the data objects into the processing partition associated with the spatial sub-division. The hardware host may generate the updated processing partition by re-indexing the data objects and including any additional data objects that satisfy spatial relationships with the spatial sub-division.

As discussed above, updating the processing partition may additionally be used to notify the cluster or world manager associated with the distributed computing system about utilization of hardware and software resources associated with the hardware host. Adding new data objects may increase resource utilization because the number of data objects to be handled by the processing application has increased. In order to load balance processing of data objects in the distributed computing system, the cluster or world manager may evaluate whether the hardware host has sufficient resources to process the additional data objects. Removing data objects from a processing partition may decrease resource utilization because the number of data objects to be handled by the processing application has decreased. The cluster or world manager may then evaluate whether the hardware host can process additional data objects. Accordingly, in operation 1616, the hardware host may send the updated processing partition to the world manager.

Figure 17:
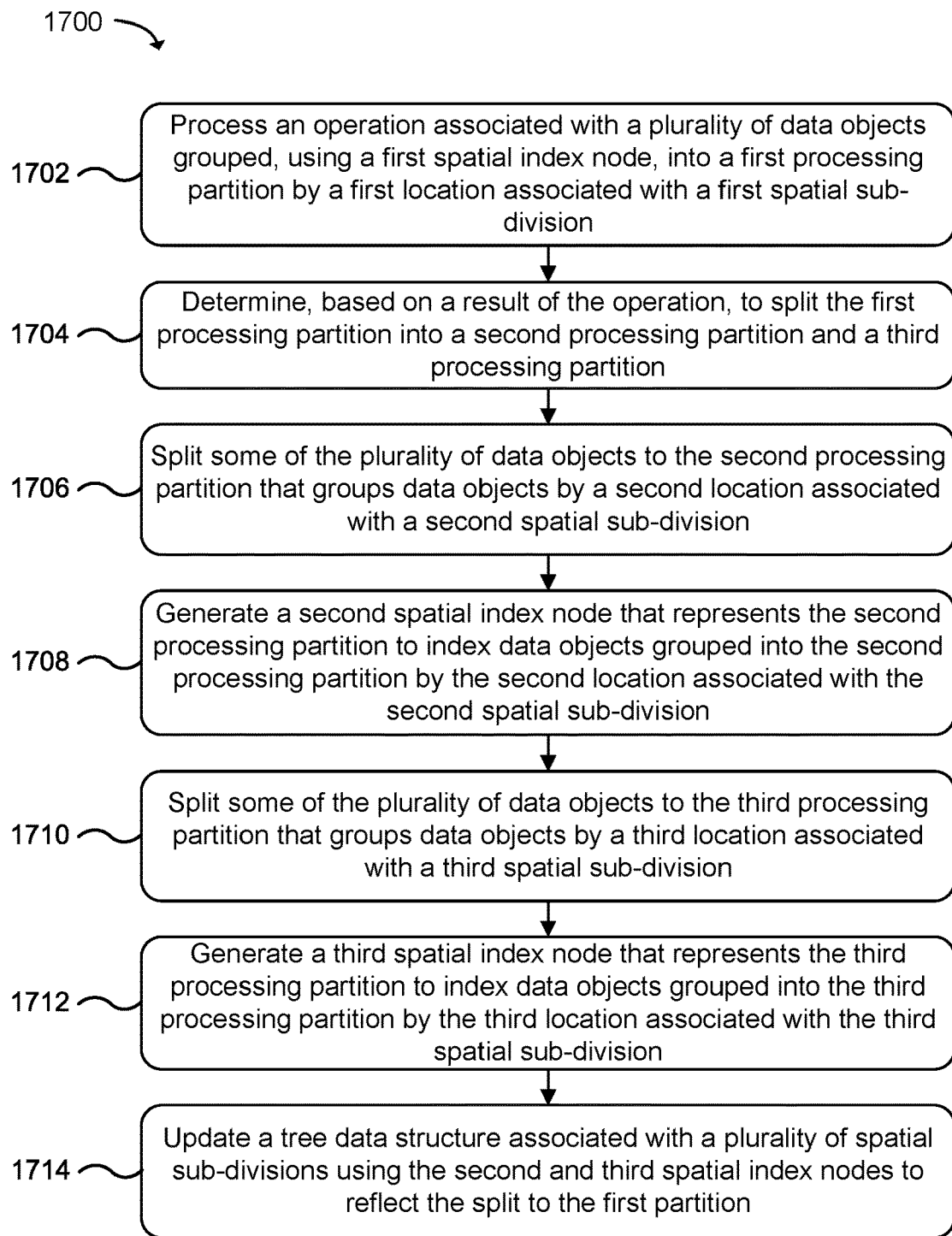
FIG. 17 is a flow diagram that illustrates an example method for splitting processing partitions organized by spatial location information according to examples of the present technology.

FIG. 17 is a flow diagram that illustrates an example method 1700 for splitting processing partitions organized by spatial location information according to examples of the present technology. The method 1700 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1702, a hardware host in a distributed computing system may process an operation associated with a plurality of data objects. The data objects may be grouped, using a first spatial index node, into a first processing partition for a first location associated with a first spatial sub-division. The operation may include a create, read, update, and delete (CRUD) operation processed by a distributed shared memory on the hardware host. In operation 1704, the hardware host may determine, based on a result of the operation, to split the first processing partition into a second processing partition and a third processing partition. The hardware host may determine to split the first processing partition into the second and third processing partitions because the number of data objects handled by an instance of a processing application associated with the first processing partition approaches, equals, or exceeds a threshold specified for the processing application. The hardware host may determine the threshold to use when splitting the first processing partition as a percentage of a capacity defined by the processing application to process a number of data objects. For example, the hardware host may trigger the splitting of the first processing partition into the second and third processing partitions when the number of data objects handled by the instance of the processing application meets or exceeds 60% of the capacity defined for the processing application.

The hardware host may determine that the number of data objects handled by the instance of the processing application may have increased, for example, when a new data object is created in a virtual environment and the new data object is mapped to the first processing partition. The hardware host may determine that the number of data objects handled by the instance of the processing application may have been increased when a data object moves from a first location to a second location associated with the first spatial sub-division. The hardware host may also determine that motion of a first data object may have triggered a spatial dependency with a second data object that is mapped to the first processing partition.

In operation 1706, the hardware host may split some of the plurality of data objects to a second processing partition that groups data objects by a second location associated with a second spatial sub-division. The hardware host may determine that the spatial location information associated with the data objects can be used to group the data objects into the second processing partition by the second location. In another example, the hardware host may determine that some of the data objects satisfy a spatial relationship with the second location or have a data dependency with other objects at or near the second location. The hardware host may then allocate the data objects to the second processing partition. In operation 1708, the hardware host may generate, determine, or identify a second node that represents the second processing partition in order to index data objects grouped into the second processing partition based on a second spatial sub-division. The hardware host may generate the second spatial index node using metadata that maps some of the data objects to the second processing partition.

In operation 1710, the hardware host may split some of the plurality of data objects to the third processing partition that groups data objects by a third location associated with a third spatial sub-division. Accordingly, the hardware host may allocate the data objects to the third processing partition. In operation 1712, the distributed shared memory may determine, or identify a third spatial index node that represents the third processing partition to index data objects associated with the third spatial sub-division.

In operation 1714, the hardware host may update a tree structure associated with a plurality of spatial sub-divisions using the second and third spatial index nodes to reflect the split of the first processing partition. The hardware host may, for the first processing partition, update the tree structure to remove metadata, if present, for the data objects now mapped to the second and third processing partitions from the first spatial index node. The hardware host may update the tree structure using the second spatial index node to include metadata for the data objects now mapped to the second processing partition. The hardware host may further update the tree structure using the third spatial index node to include metadata for the data objects now mapped to the third processing partition. The hardware host may generate the second and third spatial index nodes in the tree structure by updating existing spatial index nodes or adding additional spatial index nodes (e.g., child or sibling spatial index nodes of the first spatial index node associated with the first processing partition).

Splitting the first processing partition into the second and third processing partitions may additionally be used to notify the cluster or world manager associated with the distributed computing system about utilization of hardware and software resources associated with a hardware host to which the second and third processing partitions are currently assigned. As discussed above, the second and third processing partitions may increase resource utilization on the hardware host because the number of data objects to be handled by an instance of a processing application has increased or another instance of the processing application is to be launched. In order to load balance processing of data objects in the distributed computing system, the cluster or world manager may evaluate whether the hardware host has sufficient resources to process the data objects being allocated to the second and third processing partitions.

Figure 18:
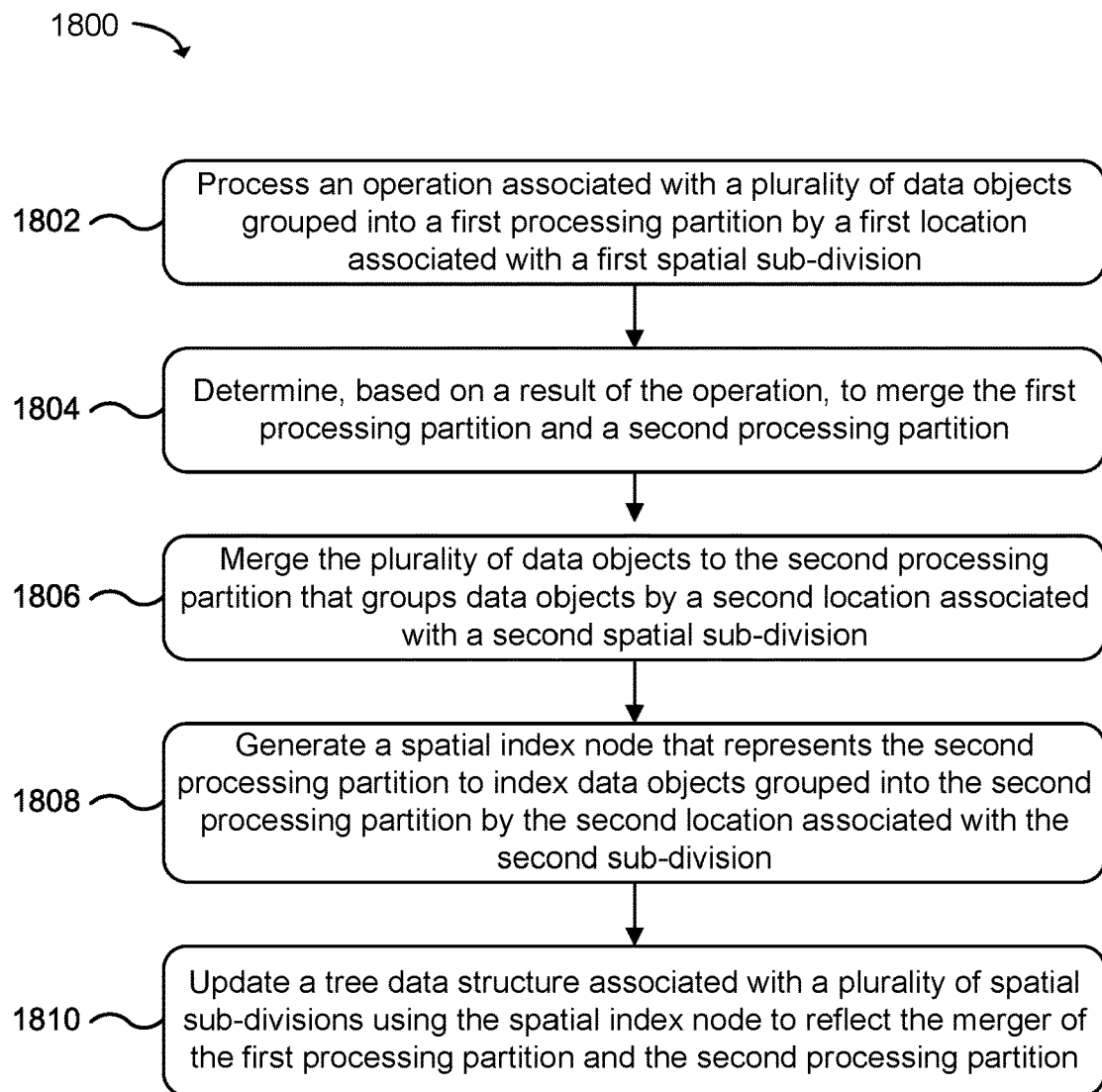
FIG. 18 is a flow diagram that illustrates an example method for merging processing partitions organized by spatial location information according to examples of the present technology.

FIG. 18 is a flow diagram that illustrates an example method 1800 for merging processing partitions organized by spatial location information according to examples of the present technology. The method 1800 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1802, a hardware host in a distributed computing system may process an operation associated with a first plurality of data objects grouped into a first processing partition by a first location associated with a first spatial sub-division. In operation 1804, the hardware host may determine, based on a result of the operation, to merge the first processing partition and a second processing partition. The hardware host may determine to merge the first processing partition with the second processing partition as a result of the operation when the number of data objects handled by an instance of a processing application associated with the first processing partition approaches, equals, or exceeds a merge threshold specified for the processing application. The merge threshold may be a percentage of the capacity of the processing application to process a number of data objects. For example, the merge threshold may trigger the merging of the first processing partition with the second processing partition when the number of data objects handled by the instance of the processing application satisfies or falls below 10% of the capacity of the processing application.

As discussed above, the number of data objects handled by the instance of the processing application may decrease, for example, when a data object is moved in a virtual environment and the data object may be mapped to a different processing partition based on the new location of the data object. In another example, number of data objects handled by the instance of the processing application may decrease when a data object is removed or deleted from the virtual environment. Removing and updating data objects in the virtual environment may cause the percentage of data objects previously handled by the instance of the processing application to then satisfy the merge threshold.

In operation 1806, the hardware host may merge the plurality of data objects to the second processing partition that groups data objects by a second location associated with a second spatial sub-division. For example, the hardware host may determine that spatial location information associated with the plurality of data objects can be used to group the data objects from both the first processing partition and the second processing partition into the second processing partition by the second location. In another example, the hardware host may determine that a spatial range defined for the second processing partition using the second location encompasses positions associated with the plurality of data objects in the first and second processing partitions. The hardware host may then move or allocate the plurality of data objects from the first processing partition to the second processing partition.

In operation 1808, the hardware host may generate a spatial index node that represents the second processing partition to index the plurality of data objects grouped into the second processing partition associated with the second spatial-subdivisions. The hardware host may generate the spatial index node using metadata that maps the plurality of data objects to the second processing partition.

In operation 1810, the hardware host may update a tree structure associated with a plurality of spatial sub-divisions using the spatial index node to reflect the merger of the first processing partition and the second processing partition. The hardware host may update the tree structure using the spatial index node to include metadata for the data objects now mapped to the second processing partition. The hardware host may also update the tree structure to remove metadata from a spatial index node associated with the first processing partition. The hardware host may generate the spatial index node in the tree structure by updating existing spatial index nodes (e.g., a parent or sibling of a spatial index node associated with the first processing partition) or adding additional spatial index nodes.

Merging the first processing partition into the second processing partition may additionally be used to notify the cluster or world manager associated with the distributed computing system about underutilization of hardware and software resources associated with a hardware host to which the second processing partition is current assigned. As discussed above, adding new data objects to the second processing partition may increase resource utilization because the number of data objects to be handled by an instance of a processing application has increased. In order to load balance processing of data objects in the distributed computing system, the cluster or world manager may evaluate whether the hardware host has sufficient resources to process the additional data objects being allocated to the second processing partition.

Figure 19:
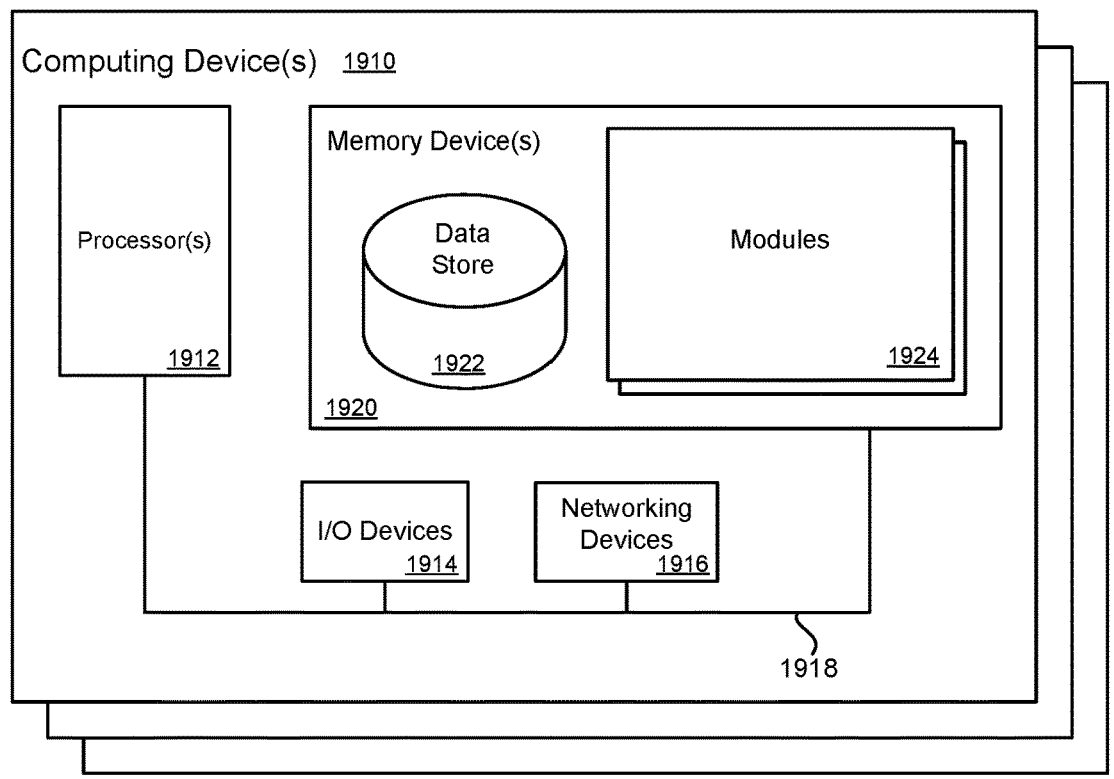
FIG. 19 illustrates an example of physical computer hardware upon which the present technology may execute.

FIG. 19 illustrates a system 1900 and a computing device 1910 on which modules of this technology may execute. A computing device 1910 is illustrated on which a high-level example of the technology may be executed. The computing device 1910 may include one or more processors 1912 that are in communication with memory devices 1920. The computing device 1910 may include a local communication interface 1918 for the components in the computing device. For example, the local communication interface 1918 may be a local data bus and/or any related address or control busses as may be desired.

The memory device 1920 may contain modules 1924 that are executable by the processor(s) 1912 and data for the modules 1924. The modules 1924 may execute the functions described earlier. A data store 1922 may also be located in the memory device 1920 for storing data related to the modules 1924 and other applications along with an operating system that is executable by the processor(s) 1912. Other applications may also be stored in the memory device 1920 and may be executable by the processor(s) 1912. Components or modules discussed in this description that may be implemented in the form of software using high-level programming languages that are compiled, interpreted, or executed using a hybrid of the methods.

The computing device 1910 may also have access to I/O (input/output) devices 1914 that are usable by the computing device 1910. Networking devices 1916 and similar communication devices may be included in the computing device 1910. The networking devices 1916 may be wired or wireless networking devices that connect to the internet, a LAN, WAN, or other computing network.

The components or modules 1924 that are shown as being stored in the memory device 1920 may be executed by the processor(s) 1912. The term "executable" may mean a program file that is in a form that may be executed by a processor 1912. For example, a program in a higher-level language may be compiled into machine code in a format that may be loaded into a random-access portion of the memory device 1920 and executed by the processor 1912, or source code may be loaded by another executable program and interpreted to generate instructions in a random-access portion of the memory to be executed by a processor. The executable program may be stored in any portion or component of the memory device 1920. For example, the memory device 1920 may be random access memory (RAM), read only memory (ROM), flash memory, a solid-state drive, memory card, a hard drive, optical disk, floppy disk, magnetic tape, or any other memory components.

The processor 1912 may represent multiple processors and the memory device 1920 may represent multiple memory units that operate in parallel to the processing circuits. This may provide parallel processing channels for the processes and data in the system. The local interface 1918 may be used as a network to facilitate communication between any of the multiple processors and multiple memories. The local interface 1918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting, or for similar reasons.

Some of the functional units described in this specification have been labeled services, which can be implemented as modules. A module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules, and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method, comprising:
   receiving a data object at a distributed shared memory of a first computing hub;
   writing a representation of the data object to a memory device using the distributed shared memory;
   receiving a request to modify data associated with the data object;
   determining a portion of the representation of the data object associated with a mutation to the data object caused by the request;
   writing, using the mutation to the data object, a log record to the memory device in a log section associated with the representation of the data object, wherein the log record includes a reference indicating that the mutation to the data object reflects a change associated with the portion of the representation of the data object;
   receiving an instruction to send a current state of the data object to a second computing hub:
   sending, using the representation of the data object, the current state of the data object to the second computing hub;
   determining that the second computing hub includes a prior state of the data object; and
   sending, to the second computing hub, a portion of the log section, wherein the portion of the log section represents a difference between a current state of the data object and the prior state.

2. The method of claim 1, further comprising:
receiving a plurality of requests to modify data associated with the data object;
determining to aggregate the plurality of requests using a plurality of mutations to the data object associated with the plurality of requests;
determining a plurality of portions of the representation of the data object associated with the plurality of mutations to the data object; and
appending, using the plurality of mutations to the data object, an additional log record to the log section, wherein the additional log record includes a plurality of references indicating that the plurality of mutations to the data object reflect changes to the plurality of portions of the representation of the data object.

3. The method of claim 1, further comprising:
determining to coalesce a plurality of log records into a single log record based on storage or network conditions; and
writing, using the plurality of log records, an additional log record to the log section to replace the plurality of log records.

4. The method of claim 1, further comprising:
identifying an object field associated with the data object, wherein the object field corresponds to the portion of the representation of the data object being mutated;
writing, to the log record, a translation table mapping the object field to a portion of the log record that includes the mutation to the data object; and
writing, to the log record, a modified fields table that includes the reference indicating that the mutation to the data object reflects a change associated with the portion of the representation of the data object.

5. The method of claim 1, further comprising:
receiving the data object from an object data store to obtain a file;
determining that a format of the file is used by the distributed shared memory; and
writing, to the memory device, the file at a memory location associated with the distributed shared memory.

6. The method of claim 1, further comprising:
receiving the data object from an object data store to obtain retrieved data;
determining that a format of the retrieved data is not used by the distributed shared memory;
determining a plurality of object fields associated with the data object;
writing, to the memory device, the retrieved data in an object data section associated with the representation of the data object; and
writing, to the memory device, a virtual table that includes a plurality of references mapping the plurality of object fields to the data object section.

7. The method of claim 1, further comprising:
determining whether the request to modify data associated with the data object matches an object identifier and version associated with the data object;
writing the log record to the memory device when the request matches the object identifier and version; and
sending an error message when the request fails to match the object identifier and version.

8. A system, comprising:
at least one processor; and
at least one memory device storing instructions that, when executed by the at least one processor, cause the at least one processor to perform operations comprising:
receiving a data object at a distributed shared memory of a first computing hub;
writing a representation of the data object to a memory device using the distributed shared memory;
receiving a request to modify data associated with the data object;
determining a portion of the representation of the data object associated with a mutation to the data object caused by the request;
writing, using the mutation to the data object, a log record to the memory device in a log section associated with the representation of the data object, wherein the log record includes a reference indicating that the mutation to the data object reflects a change associated with the portion of the representation of the data object;
receiving an instruction to send a current state of the data object to a second computing hub;
sending, using the representation of the data object, the current state of the data object to the second computing hub;
determining that the second computing hub includes a prior state of the data object; and
sending, to the second computing hub, a portion of the log section, wherein the portion of the log section represents a difference between a current state of the data object and the prior state.

9. The system of claim 8, wherein the operations further comprise:
receiving a plurality of requests to modify data associated with the data object;
determining to aggregate the plurality of requests using a plurality of mutations to the data object associated with the plurality of requests;
determining a plurality of portions of the representation of the data object associated with the plurality of mutations to the data object; and
appending, using the plurality of mutations to the data object, an additional log record to the log section, wherein the additional log record includes a plurality of references indicating that the plurality of mutations to the data object reflect changes to the plurality of portions of the representation of the data object.

10. The system of claim 8, wherein the operations further comprise:
determining to coalesce a plurality of log records into a single log record based on storage or network conditions; and
writing, using the plurality of log records, an additional log record to the log section to replace the plurality of log records.

11. The system of claim 8, wherein the operations further comprise:
identifying an object field associated with the data object, wherein the object field corresponds to the portion of the representation of the data object being mutated;
writing, to the log record, a translation table mapping the object field to a portion of the log record that includes the mutation to the data object; and
writing, to the log record, a modified fields table that includes the reference indicating that the mutation to the data object reflects a change associated with the portion of the representation of the data object.

12. The system of claim 8, wherein the operations further comprise:
receiving the data object from an object data store to obtain a file;

determining that a format of the file is used by the distributed shared memory; and writing, to the memory device, the file at a memory location associated with the distributed shared memory.

13. The system of claim 8, wherein the operations further comprise:

receiving the data object from an object data store to obtain retrieved data;

determining that a format of the retrieved data is not used by the distributed shared memory;

determining a plurality of object fields associated with the data object;

writing, to the memory device, the retrieved data in an object data section associated with the representation of the data object; and writing, to the memory device, a virtual table that includes a plurality of references mapping the plurality of object fields to the data object section.

14. The system of claim 8, wherein the operations further comprise:

determining whether the request to modify data associated with the data object matches an object identifier and version associated with the data object;

writing the log record to the memory device when the request matches the object identifier and version; and sending an error message when the request fails to match the object identifier and version.

15. One or more non-transitory computer-readable storage media having stored thereon computing instructions that, upon execution by one or more computing devices, cause the one or more computing devices to perform computing operations comprising:

receiving a data object at a distributed shared memory of a first computing hub;

writing a representation of the data object to a memory device using the distributed shared memory;

receiving a request to modify data associated with the data object;

determining a portion of the representation of the data object associated with a mutation to the data object caused by the request;

writing, using the mutation to the data object, a log record to the memory device in a log section associated with the representation of the data object, wherein the log record includes a reference indicating that the mutation to the data object reflects a change associated with the portion of the representation of the data object;

receiving an instruction to send a current state of the data object to a second computing hub;

sending, using the representation of the data object, the current state of the data object to the second computing hub;

determining that the second computing hub includes a prior state of the data object; and sending, to the second computing hub, a portion of the log section, wherein the portion of the log section represents a difference between a current state of the data object and the prior state.

16. The one or more non-transitory computer-readable storage media of claim 15, wherein the operations further comprise:

receiving a plurality of requests to modify data associated with the data object;

determining to aggregate the plurality of requests using a plurality of mutations to the data object associated with the plurality of requests;

determining a plurality of portions of the representation of the data object associated with the plurality of mutations to the data object; and appending, using the plurality of mutations to the data object, an additional log record to the log section, wherein the additional log record includes a plurality of references indicating that the plurality of mutations to the data object reflect changes to the plurality of portions of the representation of the data object.

17. The one or more non-transitory computer-readable storage media of claim 15, wherein the operations further comprise:

determining to coalesce a plurality of log records into a single log record based on storage or network conditions; and writing, using the plurality of log records, an additional log record to the log section to replace the plurality of log records.

18. The one or more non-transitory computer-readable storage media of claim 15, wherein the operations further comprise:

identifying an object field associated with the data object, wherein the object field corresponds to the portion of the representation of the data object being mutated;

writing, to the log record, a translation table mapping the object field to a portion of the log record that includes the mutation to the data object; and writing, to the log record, a modified fields table that includes the reference indicating that the mutation to the data object reflects a change associated with the portion of the representation of the data object.

19. The one or more non-transitory computer-readable storage media of claim 15, wherein the operations further comprise:

receiving the data object from an object data store to obtain a file;

determining that a format of the file is used by the distributed shared memory; and writing, to the memory device, the file at a memory location associated with the distributed shared memory.

20. The one or more non-transitory computer-readable storage media of claim 15, wherein the operations further comprise:

receiving the data object from an object data store to obtain retrieved data;

determining that a format of the retrieved data is not used by the distributed shared memory;

determining a plurality of object fields associated with the data object;

writing, to the memory device, the retrieved data in an object data section associated with the representation of the data object; and writing, to the memory device, a virtual table that includes a plurality of references mapping the plurality of object fields to the data object section.

* * * * *

UNITED STATES PATENT AND TRADEMARK OFFICE
CERTIFICATE OF CORRECTION

| | | |
|---|---|---|
| PATENT NO. | : 11,436,217 B2 | Page 1 of 1 |
| APPLICATION NO. | : 16/368723 | |
| DATED | : September 6, 2022 | |
| INVENTOR(S) | : Hicks et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this
Eleventh Day of February, 2025

Coke Morgan Stewart
*Acting Director of the United States Patent and Trademark Office*